US012318910B2

(12) United States Patent
Connell

(10) Patent No.: US 12,318,910 B2
(45) Date of Patent: Jun. 3, 2025

(54) CREEPER APPARATUS

(71) Applicant: James Cody Connell, Carlsbad, NM (US)

(72) Inventor: James Cody Connell, Carlsbad, NM (US)

( * ) Notice: Subject to any disclaimer, the term of this patent is extended or adjusted under 35 U.S.C. 154(b) by 317 days.

(21) Appl. No.: 18/135,604

(22) Filed: Apr. 17, 2023

(65) Prior Publication Data

US 2023/0330834 A1 Oct. 19, 2023

Related U.S. Application Data

(60) Provisional application No. 63/331,834, filed on Apr. 17, 2022.

(51) Int. Cl.
*B25H 5/00* (2006.01)

(52) U.S. Cl.
CPC .................................... *B25H 5/00* (2013.01)

(58) Field of Classification Search
CPC ........................................................ B25H 5/00
See application file for complete search history.

(56) References Cited

U.S. PATENT DOCUMENTS 2,520,047 A * 8/1950 Moody .................... B25H 5/00 280/32.6
2,843,391 A * 7/1958 Pelletier ................... B25H 5/00 280/30
4,741,512 A * 5/1988 Elkuch .................... B66F 7/065 D34/28
RE37,372 E * 9/2001 Smith ...................... B25H 5/00 280/32.6
6,425,590 B1 * 7/2002 Whiteside ................ B25H 5/00 280/32.6
6,641,146 B2 * 11/2003 Reese .................. B66C 23/485 280/32.6
6,702,305 B2 * 3/2004 Miles ....................... B25H 5/00 280/32.6
6,834,868 B1 * 12/2004 Blackburn ............... B25H 5/00 280/32.6

(Continued)

FOREIGN PATENT DOCUMENTS

CN 202858399 U * 4/2013
CN 110153977 A * 8/2019 .............. B25H 5/00

(Continued)

*Primary Examiner* — Steve Clemmons
(74) *Attorney, Agent, or Firm* — Roger A. Jackson

(57) ABSTRACT

A creeper apparatus includes a base with a beam, the base has a first extension extending from the beam and an oppositely positioned second extension extending from the beam, a first caster wheel pivotally attached to the beam, a second caster wheel pivotally attached to the first extension, and a third caster wheel pivotally attached to the second extension, operationally the first, second, and third caster wheels enable the base to omnidirectionally ambulate along a surface. Further, a sleeve that is reciprocally slidably engaged to the beam with a structure for imparting the reciprocating movement in the sleeve, a first link pivotally attached to the first extension, a second link pivotally attached to the beam, a frame pivotally attached to the sleeve, an arm pivotally attached to both the first and second links and the frame, operationally the sleeve reciprocal movement moves the arm and frame in height and angle.

9 Claims, 39 Drawing Sheets

(56) References Cited

U.S. PATENT DOCUMENTS

| | | | | | |
|---|---|---|---|---|---|
| 6,926,365 | B2 * | 8/2005 | Bottoms | A47C 9/025 | 297/488 |
| 7,070,189 | B2 * | 7/2006 | Grauss | B25H 5/00 | 280/32.6 |
| 7,188,843 | B2 * | 3/2007 | Magness | B62B 5/0003 | 280/30 |
| 8,596,651 | B2 * | 12/2013 | Canova | A47C 3/36 | 280/32.6 |
| 8,746,708 | B2 * | 6/2014 | Wang | B25H 5/00 | 280/32.6 |
| 8,777,237 | B2 * | 7/2014 | Brittingham | B25H 5/00 | 280/32.6 |
| 9,193,064 | B2 * | 11/2015 | Dall'Armi | B25H 5/00 | |
| 10,661,431 | B1 * | 5/2020 | Hightower | B25H 5/00 | |
| 10,875,560 | B2 * | 12/2020 | Frolander | B62B 5/08 | |
| 11,097,412 | B2 * | 8/2021 | Dosky | B25H 5/00 | |
| D930,935 | S * | 9/2021 | Sieb | B60B 33/0052 | D34/23 |
| 2007/0241523 | A1 * | 10/2007 | Lewman | B25H 5/00 | 280/32.5 |
| 2011/0049822 | A1 * | 3/2011 | Hinman | B25H 5/00 | 280/32.6 |
| 2016/0039088 | A1 * | 2/2016 | Blasjo | B25H 5/00 | 280/32.6 |
| 2018/0222037 | A1 * | 8/2018 | Hendrickson | A47C 9/027 | |

FOREIGN PATENT DOCUMENTS

| | | | | |
|---|---|---|---|---|
| CN | 112425946 A | * | 3/2021 | |
| GB | 2198994 A | * | 6/1988 | B25H 5/00 |
| WO | WO-8606053 A1 | * | 10/1986 | |

* cited by examiner

CREEPER APPARATUS

RELATED APPLICATION

This application claims the benefit of U.S. provisional patent application Ser. No. 63/331,834 filed on Apr. 17, 2022 by James Cody Connell of Carlsbad, New Mexico, U.S.

FIELD OF THE INVENTION

The present invention is generally relates to a creeper apparatus typically used for supporting a mechanic on their back to be able to ambulate along a surface to perform tasks on a vehicle undercarriage, and more particularly to a convertible creeper apparatus that has additional features of height and angle adjustment for the user's back, neck, head, and buttocks support to further optimize the mechanics comfort level and to lessen fatigue.

BACKGROUND OF THE INVENTION

Basic creeper apparatus are well known in the art which are typically a flat board with a headrest and four caster wheels for movement about a surface with no height or angle adjustment, and while simple and inexpensive, the basic creeper apparatus has limited use for the mechanic as it is uncomfortable and does not facilitate different height undercarriages and restricts the mechanics ability to reach undercarriage components with their arms. Thus, what is termed a "convertible creeper apparatus" is a creeper that has height and angle adjustment, however, there being numerous ways to accomplish the height and angle adjustments of the "bed" of the creeper, wherein some goals would be to accomplish this height and angle adjustment in a simple and reliable manner plus keeping the added weight and added cost within reasonable levels, to better facilitate market adoption of the convertible creeper over the basic creeper.

In looking at the prior art in this area in U.S. Pat. No. 11,097,412 to Dosky, disclosed is a mechanics creeper assembly with user retention straps and height adjustable wheels. Further, in U.S. Pat. No. 8,777,237 to Brittingham, disclosed is a convertible creeper that goes from a horizontal flat configuration up to a seat type configuration, however, Brittingham uses a complex mechanism to cause the rising motion and maintain the orientation of the casters where the present invention simplifies the elevation motion, has to angle upward-which seems to not be convenient to the user while wanting to simply rise up in a horizontal fashion from the surface.

Continuing in the prior art in this area in U.S. Pat. No. 6,641,146 to Reese, discloses a creeper with an elevated platform using a pivot extension and hydraulic arm, it may be able to have a parallel horizontal rise, but appears to have height adjustment that is limited to higher elevations where the present invention approaches ground level. Next, in U.S. Pat. No. 6,926,365 to Bottoms, disclosed is a body support for automotive mechanics having a seat and back adjustment with several discrete height settings where the present invention is infinitely adjustable in height.

Further, in the applicable prior art in U.S. Pat. No. 8,596,651 to Canova, disclosed is a height adjustable work seat using an "X" pivot and in U.S. Pat. No. 8,746,708 to Wang, disclosed is a creeper for car repairing that doubles as a dolly with pivoting wheels and a pivoting heavy object support shelf and continuing in U.S. Pat. No. 10,661,431 to Hightower, discloses an adjustable mechanic creeper with a height adjustment brace with the seat in a lateral track.

Next, in the related prior art in U.S. Pat. No. 10,875,560 to Frolander, discloses a plumber's creeper for under cabinet work having a height adjustable support with a pivoting arm plus head and foot pads that are removable and in United States Patent Application Publication Number US 2007/0241523 to Lewman, discloses a vehicle repair apparatus that is height and angle adjustable with a base similar to a creeper extending upward to a mechanics platform.

Continuing, in the associated prior art in United States Patent Application Publication Number US2011/0049822 to Hinman, discloses a plumbers unibody creeper for under cabinet use that is angle and height adjustable and in United States Patent Application Publication Number US2016/0039088 to Blasjo, discloses a vehicle service platform with a scissor lift and jackscrew with a saw tooth angle lock, and further in U.S. Design Pat. No. D930,935 to Sieb, discloses a mechanics creeper with large caster wheels for easier rolling over uneven surfaces, in addition in U.S. Reissue Pat. No. RE37,372 to Smith discloses a convertible work creeper with a work seat and shelf available having angle adjustment.

What is needed is a convertible creeper apparatus that has height and angle adjustment for the bed, objectives would be a compact mechanism that is controllable by the mechanic while using the creeper, plus having a stable lock of height and angle adjustment, be efficient in power usage, and have casters that can accommodate a rougher or more uneven surface to add utility to the convertible creeper.

SUMMARY OF INVENTION

Broadly, the present invention is a creeper apparatus that includes a base structure that includes a beam having a beam distal end portion and an opposing beam proximal end portion with a longitudinal axis spanning therebetween, further the base structure has a first extension with a first proximal end portion and an opposing first distal end portion with a lengthwise axis spanning therebetween. Wherein the first proximal end portion extends from the beam proximal end portion and a second extension with a second proximal end portion and an opposing second distal end portion with a longwise axis spanning therebetween, wherein the second proximal end portion extends from the beam proximal end portion, wherein positionally the lengthwise axis and the longwise axis are oppositely positioned to one another about the longitudinal axis and the longitudinal, lengthwise, and longwise axes are all positioned within a first plane.

Further included in the creeper apparatus is a first caster wheel having a first pivotal disposition on the beam distal end portion, a second caster wheel having a second pivotal disposition on the first distal end portion, and a third caster wheel having a third pivotal disposition on the second distal end portion, wherein operationally the first, second, and third caster wheels enable the base structure to omnidirectionally manually ambulate along a surface.

Additionally included in the creeper apparatus is a sleeve element that is slidably engaged along the longitudinal axis to the beam between the beam proximal and beam distal end portions, the sleeve element having reciprocating movement as between the beam proximal and beam distal end portions and a means for imparting the reciprocating movement in the sleeve element.

Plus the creeper apparatus includes a first link member having a first link first end portion and an opposing first link second end portion with a first link axis therebetween, wherein the first link second end portion has a fourth pivotal attachment to the first distal end portion, wherein the first link member having a first link pivotal movement in a second plane perpendicular to the first plane and forming a range of acute angles as between the first link axis and the lengthwise axis.

Also included in the creeper apparatus is a frame member having a frame member primary end portion, a frame member mid-portion, and a frame member secondary end portion, with a frame member axis spanning therebetween, wherein the frame member primary end portion has a fifth pivotal attachment to the sleeve element, further the frame member mid-portion has a sixth pivotal attachment to the first link primary link portion. The frame member having a frame member first pivotal movement as between the frame member mid-portion and the frame member secondary end portion in the second plane, further the frame member having a frame member second pivotal movement as between the frame member primary end portion and the frame member mid-portion in the second plane, wherein the frame member first pivotal movement is opposite of the frame member second pivotal movement.

Further included in the creeper apparatus is a second link member having a second link first end portion and an opposing second link second end portion with a second link axis therebetween, wherein the second link second end portion has a seventh pivotal attachment to the first proximal end portion, wherein the second link member having a second link pivotal movement in the second plane perpendicular to the first plane and forming a range of acute angles as between the second link axis and the longitudinal axis.

Continuing, for the creeper apparatus included is an arm having an arm first end portion and an opposing arm second end portion with an arm axis spanning therebetween, wherein the arm first end portion has an eighth pivotal attachment to the second link primary end portion and the arm second end portion has a ninth pivotal attachment to the frame member mid-portion in conjunction with the first link primary end portion, the arm axis stays substantially parallel to the longitudinal axis during the sleeve element reciprocating movement, wherein operationally the creeper apparatus has a fold flat starting operational state when the arm axis and the frame axis is juxtapose to the beam longitudinal axis when the sleeve element is at the beam distal end portion and proceeding to a substantially upright terminal positional state defined by the frame member axis being substantially perpendicular to the longitudinal axis and the arm axis is at a maximum arm distance from the beam longitudinal axis when the sleeve element is at the beam proximal end portion, thus resulting in a range of selectable arm axis distances from the beam longitudinal axis and a selectable range of the frame member axis angles to the beam longitudinal axis as between the fold flat starting operational state and the substantially upright terminal positional state.

These and other objects of the present invention will become more readily appreciated and understood from a consideration of the following detailed description of the exemplary embodiments of the present invention when taken together with the accompanying drawings, in which;

BRIEF DESCRIPTION OF DRAWINGS

FIG. 21 shows cross section cut 21-21 from FIGS. 8 and 12, wherein FIG. 21 is the cross section view of FIG. 20, with FIG. 21 showing the roller slider assembly internally in place with the beam outer surface and beam inner surface with the beam outer surface roller interface of both the upper roller and the lower roller to the beam outer surface, also included is the quarter turn locking spring plunger with the extension in the retracted state over the beam aperture, the top plate, the side plate, the upper slide roller, the lower slide roller, and the dynamic leaf chain anchor, in addition shown in the beam aperture that is aligned with the retracted extension of the quarter turn locking spring plunger, plus the beam slot wherein the inward extension projecting therethrough the beam slot to support the dynamic leaf chain anchor that is affixed to the lower roller slider, plus the reciprocating movement of the roller slider assembly along the beam longitudinal axis;

FIG. 23 shows cross section cut 23-23 from FIGS. 8 and 12, wherein FIG. 23 is the cross section view of FIG. 21, with FIG. 23 showing the quarter turn locking spring plunger with the extension in the extended state disposed therethrough the beam aperture to lock the roller slider assembly along the beam longitudinal axis, also the roller slider assembly internally in place with the beam outer surface and beam inner surface with the beam outer surface roller interface of both the upper roller and the lower roller to the beam outer surface, the top plate, the side plate, the upper slide roller, the lower slide roller, and the dynamic leaf chain anchor, plus the beam slot wherein the inward extension projecting therethrough the beam slot to support the dynamic leaf chain anchor that is affixed to the lower roller slider;

FIG. 27 shows view 27-27 from FIGS. 8, 9, and 10, wherein FIG. 27 shows a bottom view of the first alternative embodiment of the creeper apparatus in the fold flat operational positional state to include the second and third casters and related mounts and first and second extensions, also included is the lift cylinder and lift cylinder rod, the beam and the beam slot are shown;

FIG. 29 shows view 29-29 from FIG. 10, wherein FIG. 29 shows the front side elevation view from the surface level of the first alternative embodiment in the fold flat operational positional state that includes the first caster, the first caster mount, the roller slider assembly, the quarter turn locking spring plunger, the primary end portion of the frame member having the fifth pivotal attachment to the lower roller slider of the roller slider assembly, further shown is the pump cylinder;

FIG. 30 shows view 30-30 from FIGS. 10 and 29, wherein FIG. 30 is a top down view of the first alternative embodiment of the creeper apparatus in the fold flat operational positional state to primarily show the pump cylinder, the pump handle and the pump handle rotational movement, the guide rods that slidably engage the guide frame, plus the extensions and the retainer of the guide frame for connecting to the rod of the pump cylinder to effectuate reciprocating movement of the rod of the pump cylinder, wherein the pump cylinder is disposed within the arm structure, as best shown in FIG. 8;

FIG. 31 shows view 31-31 from FIG. 10, wherein FIG. 31 is a top-down view of the first alternative embodiment of the creeper apparatus in the fold flat operational positional state to primarily show the pump cylinder and rod receiving reciprocating movement from the pivot arm to the yoke to the link to the yoke all originated at the pump handle;

FIG. 32 shows view 32-32 from FIG. 10, wherein FIG. 32 is a bottom up view of the first alternative embodiment of the creeper apparatus in the fold flat operational positional state to show in particular the guide frame, extensions, and the retainer of the rod of the pump cylinder that includes the yoke mounts of the guide frames and further the relation of the movement of the guide frames, extensions, retainer and rod of the pump cylinder;

FIG. 33 shows a side elevation view 33-33 from FIGS. 8 and 31, wherein FIG. 33 shows the detail of the guide frame, the yoke mount, the yoke, and the link all moving in unison to transmit reciprocating motion from the pump handles to the pump cylinder rod;

FIG. 34 shows view 34-34 from FIGS. 10 and 30, with the first caster and roller slider assembly removed for pictorial clarity, wherein FIG. 34 shows the positional arrangement of the guide rod, the pump cylinder, the beam, the arm, and the seat surface, with the first alternative embodiment of the creeper apparatus in the fold flat operational positional state;

FIG. 35 shows a side elevation view 35-35 from FIGS. 8 and 31, wherein FIG. 35 shows the detail of the rotational movement of the pump handle, the pivot arm of the pump handle, the yoke, the link, the yoke, the guide frame, the rod, and the pump cylinder, wherein reciprocating movement is shown for all element except the pump cylinder and first end portion of the arm;

REFERENCE NUMBERS IN DRAWINGS

Figure 1:
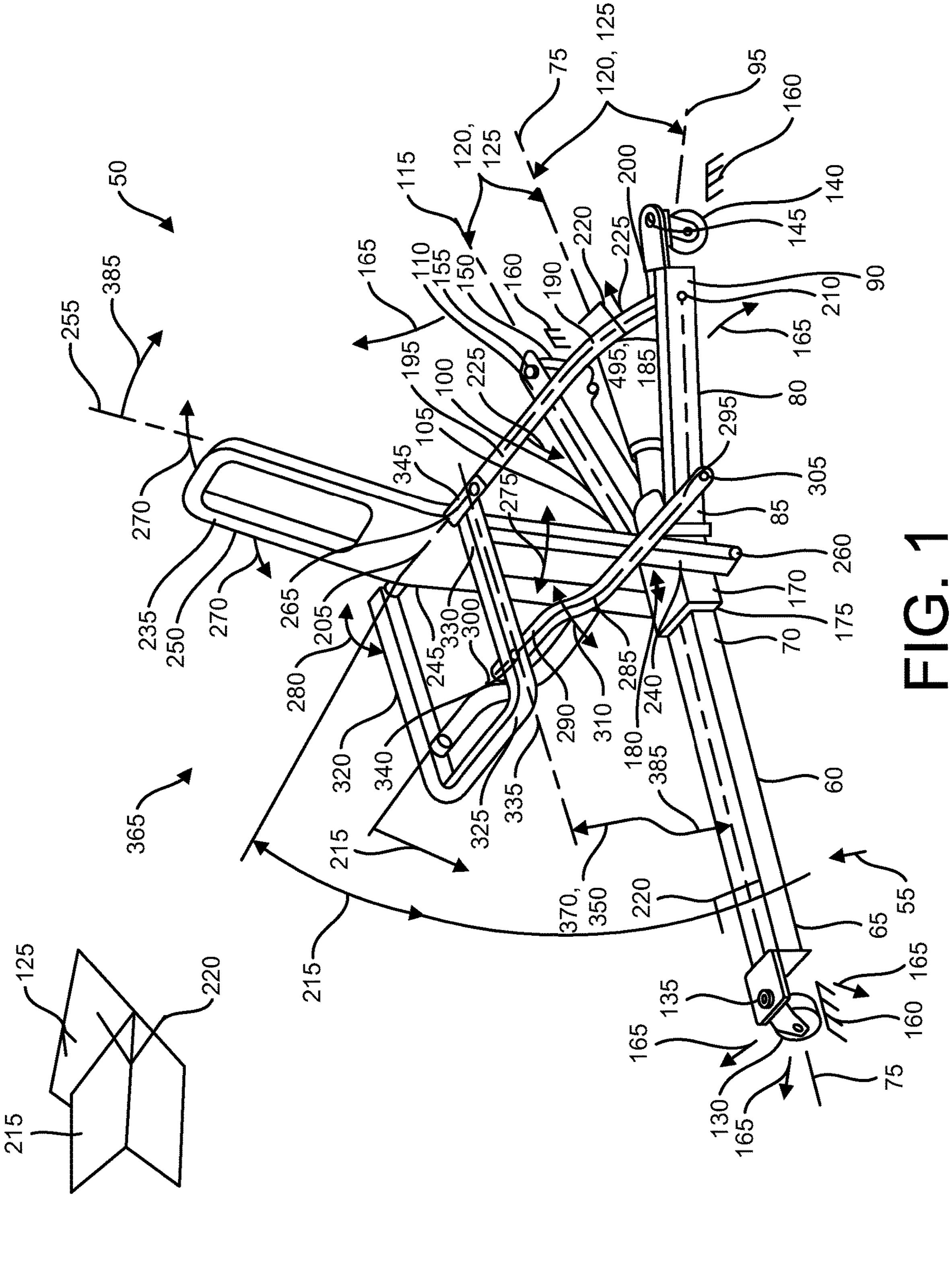
FIG. 1 shows an upper perspective view of the creeper apparatus in the upright terminal position state that includes a base structure with a beam, a first and second extension, a first and second link, an arm, and a frame member, all pivotally linked together and through a sleeve element reciprocally slidably engaged to the beam with a means for imparting the sleeve element reciprocating movement, the arm and frame member have lockable movement in height and angle.

50 Creeper apparatus
55 Base structure of the creeper apparatus 50
60 Beam
61 Aperture of beam 60
65 Distal end portion of the beam 60
70 Proximal end portion of the beam 60
75 Longitudinal axis of the beam 60
80 First extension
85 First proximal end portion of the first extension 80
90 First distal end portion of the first extension 80
95 Lengthwise axis of the first extension 80
100 Second extension
105 Second proximal end portion of the second extension 100
110 Second distal end portion of the second extension 100
115 Longwise axis of the second extension 100
120 Opposite position of the lengthwise 95 and longwise 115 axes to one another about the longitudinal axis 75
125 First plane that includes the longitudinal 75, lengthwise 95, and longwise 115 axes
130 First caster wheel
135 First pivotally disposed mount nature associated with the first caster wheel 130
140 Second caster wheel
145 Second pivotally disposed mount nature associated with the second caster wheel 140
150 Third caster wheel
155 Third pivotally disposed mount nature associated with the third caster wheel 150
160 Surface
165 Base structure 55, 505 able to omnidirectionally ambulate along the surface 160
170 Sleeve element
175 Slidably engaged nature of the sleeve element 170 to the beam 60
180 Reciprocating movement of the sleeve element 170 or roller slider assembly 510 both along the longitudinal axis 75, also including the reciprocating movement 180 of the rod 521, the leaf chain 555, the dynamic leaf chain anchor 560, and the clevis 520
181 Locked state of the roller slider assembly 510 along the longitudinal axis 75
185 Means for imparting the reciprocating movement 180 in the sleeve element 170
190 First link member
195 First end portion of the first link member 190
200 Second end portion of the first link member 190
205 First link axis of the first link member 190
210 Fourth pivotal attachment of the second end portion 200 of the first link member 190 to the first distal end portion 90 of the first extension 80
215 Second plane nominally including movement of the; first link 190 axis 205, the arm 320 axis 335, and the second link 285 axis 300, wherein the seventh pivotal attachment 305 and the fourth pivotal attachment 210 are attached to the first extension 80 to the first proximal end portion 85 and the first distal end portion 90 respectively and the ninth pivotal attachment 345 as between the arm 320 and the first link member 190
220 Perpendicular position of the second plane 215 to the first plane 125
225 First link pivotal movement in the second plane 215
230 Range of acute angles between the first link axis 205 and the lengthwise axis 95
235 Frame member
240 Primary end portion of the frame member 235
245 Mid-portion of the frame member 235
250 Secondary end portion of the frame member 235
255 Frame member axis
260 Fifth pivotal attachment of the frame member 235 primary end portion 240 to the sleeve element 170 or the roller slider assembly 510
265 Sixth pivotal attachment of the frame member 235 mid-portion 245 to the first link 190 first end portion 195
270 First pivotal movement of the frame member 235 as between the frame member mid-portion 245 and the frame member 235 secondary end portion 250 in the second plane 215
275 Second pivotal movement of the frame member 235 as between the frame member primary end portion 240 and the frame member mid-portion 245 in the second plane 215
280 Opposing pivotal movement as between the first 270 and second 275 pivotal movement of the frame member 235
285 Second link member
290 First end portion of the second link member 285
295 Second end portion of the second link member 285
300 Second link axis of the second link member 285
305 Seventh pivotal attachment of the second end portion 295 of the second link member 285 to the first proximal end portion 85 of the first extension 80
310 Pivotal movement of the second link 285 in the second plane 215
315 Range of acute angles between the second link axis 300 and the longitudinal axis 75
320 Arm
325 First end portion of the arm 320
330 Second end portion of the arm 320
335 Arm axis of the arm 320
340 Eighth pivotal attachment between the arm 320 first end portion 325 and the second link 285 first end portion 290
345 Ninth pivotal attachment between the arm 320 second end portion 330 and the frame member 235 mid-portion 245 with the first link 190 first end portion 195
350 Substantially parallel relationship between the arm axis 335 and the longitudinal axis 75 during the sleeve element 170 or the roller slider assembly 510 reciprocating movement 180
355 Fold flat starting operational position state
360 Juxtapose manner of the arm axis 335 and frame member axis 255 to the beam 60 longitudinal axis 75 in the fold flat starting operational state 355 defined as when the sleeve element 170 is at the beam 60 distal end portion 65
365 Substantially upright terminal position state
370 Maximum distance from the arm axis 335 to the beam 60 longitudinal axis 75
375 Substantially perpendicular position of the frame member axis 255 to the longitudinal axis 75
380 Substantially upright terminal positional state defined by the frame member axis 255 being substantially upright and substantially perpendicular 375 to the longitudinal axis 75 and when the arm axis 335 is at a maximum distance 370 from the beam 60 longitudinal axis 75 when the sleeve element 170 or roller slider assembly 510 is at the beam 60 proximal end portion 70
385 Range of selectable arm axis 335 distances from the beam 60 longitudinal axis 75 and frame axis 255 angles to the beam 60 longitudinal axis 75 or alternatively a selected seat surface 675 height above the surface 160
390 Annular cross section of the sleeve element 170
395 Inner surface of the sleeve element 170
400 Outer surface of the beam 60
405 Slidable engagement as between the sleeve element 170 inner surface 395 and the beam 60 outer surface 400
410 Perpendicular position of the annular cross section 390 to the beam 60 longitudinal axis 75
415 Annular cross section of the beam 60
420 Inner surface of the beam 60
425 Void of the beam 60 defined by the beam inner surface 420
430 Beam 60 surrounding sidewall
435 Extended slot therethrough the beam surrounding sidewall 430
440 Parallel position of the extended slot 435 to the beam 60 longitudinal axis 75
445 Inward extension of the sleeve element 170 or the roller slider assembly 510
450 Proceeding into the beam 60 void 425 of the inward extension 445
455 Threaded aperture
460 Thread axial axis of the threaded aperture 455
465 Parallel position of the thread axial axis 460 to the beam 60 longitudinal axis 75
470 Threaded rod
475 Threadable engagement of the threaded rod 470 to the threaded aperture 455
480 Span axis of the threaded rod 470
485 Coincident position of the threaded rod span axis 480 to the thread axial axis 460
490 Reversible rotation of the threaded rod 470 about the threaded rod span axis 480
495 Means for imparting the reversible two way rotation of the threaded rod 470 that can be an electric motor, hydraulic motor, turbine, manual hand crank, or any other suitable equivalent.
500 First alternative embodiment of the creeper apparatus
505 Base structure of the first alternative embodiment of the creeper apparatus 500 and the second alternative embodiment of the creeper apparatus 535
510 Roller slider assembly
515 Slidable rollable engagement of the roller slider assembly 510 and the beam 60 outer surface 400
520 Lift cylinder
521 Rod for lift cylinder 520
525 Pump handle

530 Locking spring plunger quarter turn, alternatives would be suitable that would include the T-Handle portion being replaced with a push button in changing the locking spring plunger 530 in moving the extension 533 back and forth as between the extended state 531 and retracted state 532
531 Extended state of the locking spring plunger 530 extension 533
532 Retracted state of the locking spring plunger 530 extension 533
533 Extension of the locking spring plunger 530
535 Second alternative embodiment of the creeper apparatus
540 Quarter turn rotational movement of the locking spring plunger 530
545 Lower roller slider of the roller slider assembly 510
546 Roller interface of the lower roller slider 545 to the beam 60 outer surface 400
550 Upper roller slider of the roller slider assembly 510
551 Roller interface of the upper roller slider 550 to the beam 60 outer surface 400
555 Leaf chain
556 Pitch of the leaf chain 555
557 Width of the leaf chain 555
558 Thickness of the leaf chain 555
560 Dynamic leaf chain 555 anchor
565 Side plates of the roller slider assembly 510
570 Top plate of the roller slider assembly 510
575 Clevis of the lift cylinder 520
576 Arm of the clevis 575
577 Block end of the clevis 575
580 Roller of the clevis 575
581 Rotational movement of roller 580
582 Diameter of roller 580
585 Pin of roller 580 of the clevis 575
590 Front caster mount assembly
595 Fixed leaf chain 555 anchor
600 Handle of the front caster mount 590
605 Gusset of the front caster mount 590
610 Mount of the first caster wheel 130 of the front caster mount assembly 590
615 Pump cylinder
620 Rod of the pump cylinder 615
625 Retainer of the rod 620 of the pump cylinder 615
630 Extension of the retainer 625
635 Guide frame of the pump cylinder 625 and the extension 630
640 Guide rod of the guide frame 635
645 Reciprocating movement of the rod 620
650 Yoke mount of guide frame 635
655 Rotational movement of the pump handles 525
656 Manual reciprocating movement of pump handle 525
660 Yoke of the guide frame 635
665 Third link of the yoke 660
666 First end of the third link 665
667 Second end of the third link 665
670 Pivot arm of the pump handles 525
675 Seat surface on top of arm 320
680 Tenth pivotal attachment between the yoke mount 650 and the yoke 660
685 Eleventh pivotal attachment between the pivot arm 670 and the yoke 660
690 Twelfth pivotal attachment between the pivot arm 670 and the sixth pivotal attachment 265 and the ninth pivotal attachment 345 all about the common axis 705
695 Remote means for generating fluid pressure for the lift cylinder 520

700 Fluid communication from the pump cylinder 615 to the lift cylinder 520

705 Common axis of the pump handle pivots 525, the sixth pivotal attachment 265, and the ninth pivotal attachment 345

DETAILED DESCRIPTION

With initial reference to FIG. 1 shown is an upper perspective view of the creeper apparatus 50 in the upright terminal position state 365 that includes a base structure 55 with a beam 60, a first 80 and a second 100 extension, a first 190 and second 285 link, an arm 320, and a frame member 235, all pivotally 210, 260, 265, 305, 340, 345 linked together and through a sleeve element 170 reciprocally 180 slidably engaged 175 to the beam 60 with a means 185 for imparting the sleeve element 170 reciprocating movement 180, the arm 320 and frame member 235 have lockable movement 230 (not shown), 270, 275, 280, 310 in height 370, 385 and angle 270, 315 (not shown).

Figure 2:
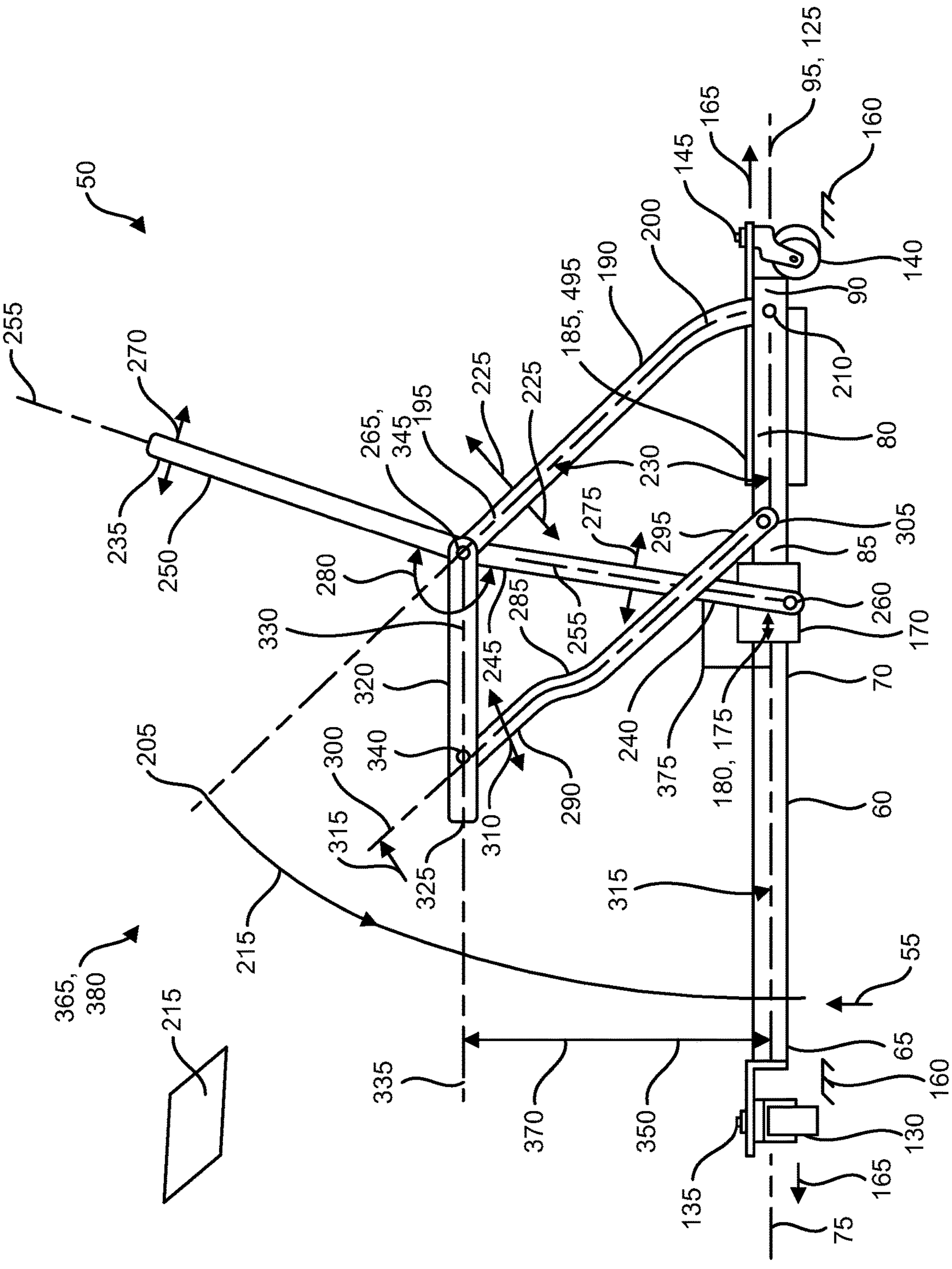
FIG. 2 shows a side elevation view of the creeper apparatus in the upright terminal position state that includes the base structure with the beam, the first and second extensions, the first and second links, the arm, and the frame member, all pivotally linked together and through the sleeve element that is reciprocally slidably engaged to the beam with the means for imparting the sleeve element reciprocating movement, the arm and frame member have lockable movement in height and angle.

Next, FIG. 2 shows a side elevation view of the creeper apparatus 50 in the upright terminal position state 365 that includes the base structure 55 with the beam 60, the first 80 extension, the first 190 and second 285 links, the arm 320, and the frame member 235, all pivotally 210, 260, 265, 305, 340, 345 linked together and through the sleeve element 170 that is reciprocally 180 slidably engaged 175 to the beam 60 with the means 185 for imparting the sleeve element 170 reciprocating movement 180, the arm 320 and frame member 235 have lockable movement 230, 270, 275, 280, 310 in height 370 and angle 270, 315.

Figure 3:
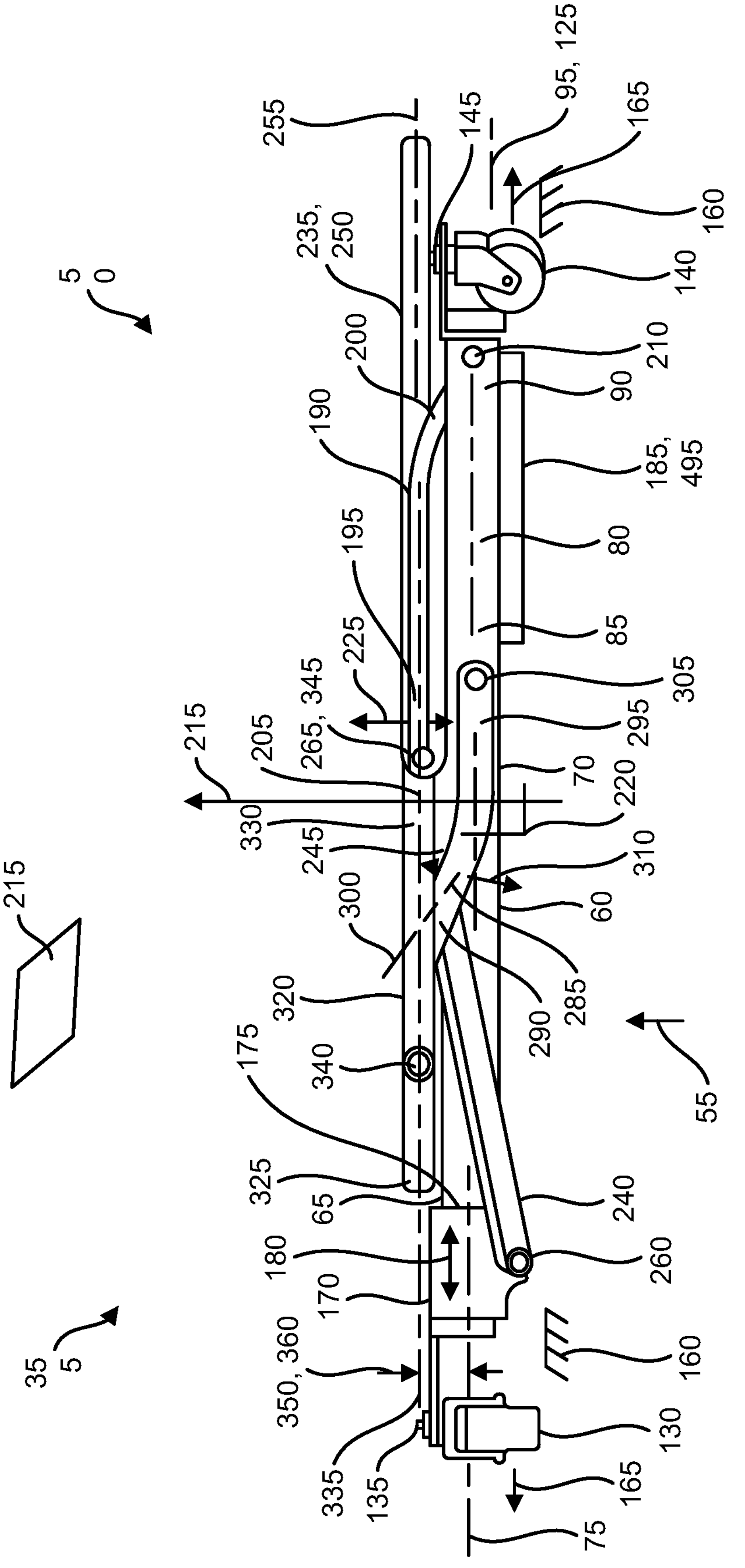
FIG. 3 shows a side elevation view of the creeper apparatus in the fold flat starting operational position state that includes the base structure with the beam, the first and second extensions, the first and second links, the arm, and the frame member, all pivotally linked together and through the sleeve element that is reciprocally slidably engaged to the beam with the means for imparting the sleeve element reciprocating movement, the arm and frame member have lockable movement in height and angle.
Figure 4:
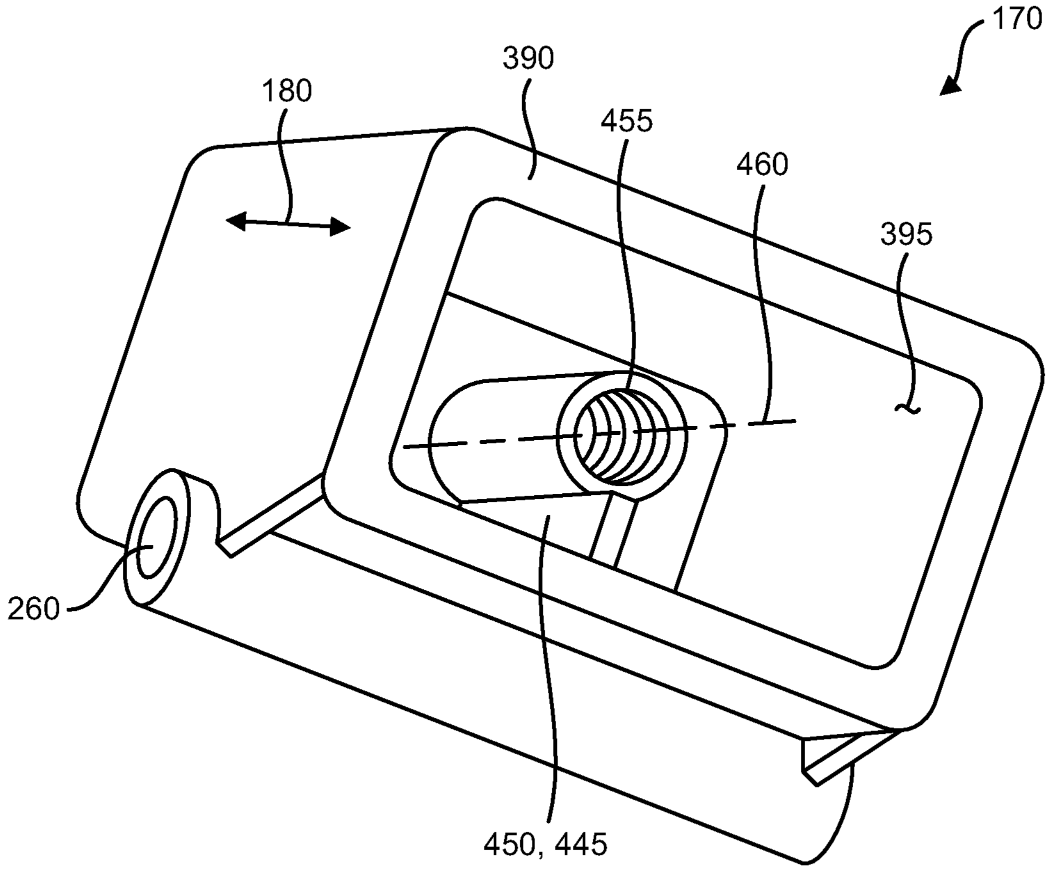
FIG. 4 shows a lower perspective view of the sleeve element that includes an inward extension that terminates into a threaded aperture, also shown is a fifth pivotal attachment.

Continuing, FIG. 3 shows a side elevation view of the creeper apparatus 50 in the fold flat starting operational position state 355 that includes the base structure 55 with the beam 60, the first 80 extension, the first 190 and second 285 links, the arm 320, and the frame member 235, all pivotally 210, 260, 265, 305, 340, 345 linked together and through the sleeve element 170 that is reciprocally 180 slidably engaged 175 to the beam 60 with the means 185 for imparting the sleeve element 170 reciprocating movement 180, the arm 320 and frame member 235;

Further, FIG. 4 shows a lower perspective view of the sleeve element 170 that includes an inward extension 445 that terminates into a threaded aperture 455, also shown is a fifth pivotal attachment 260.

Figure 5:
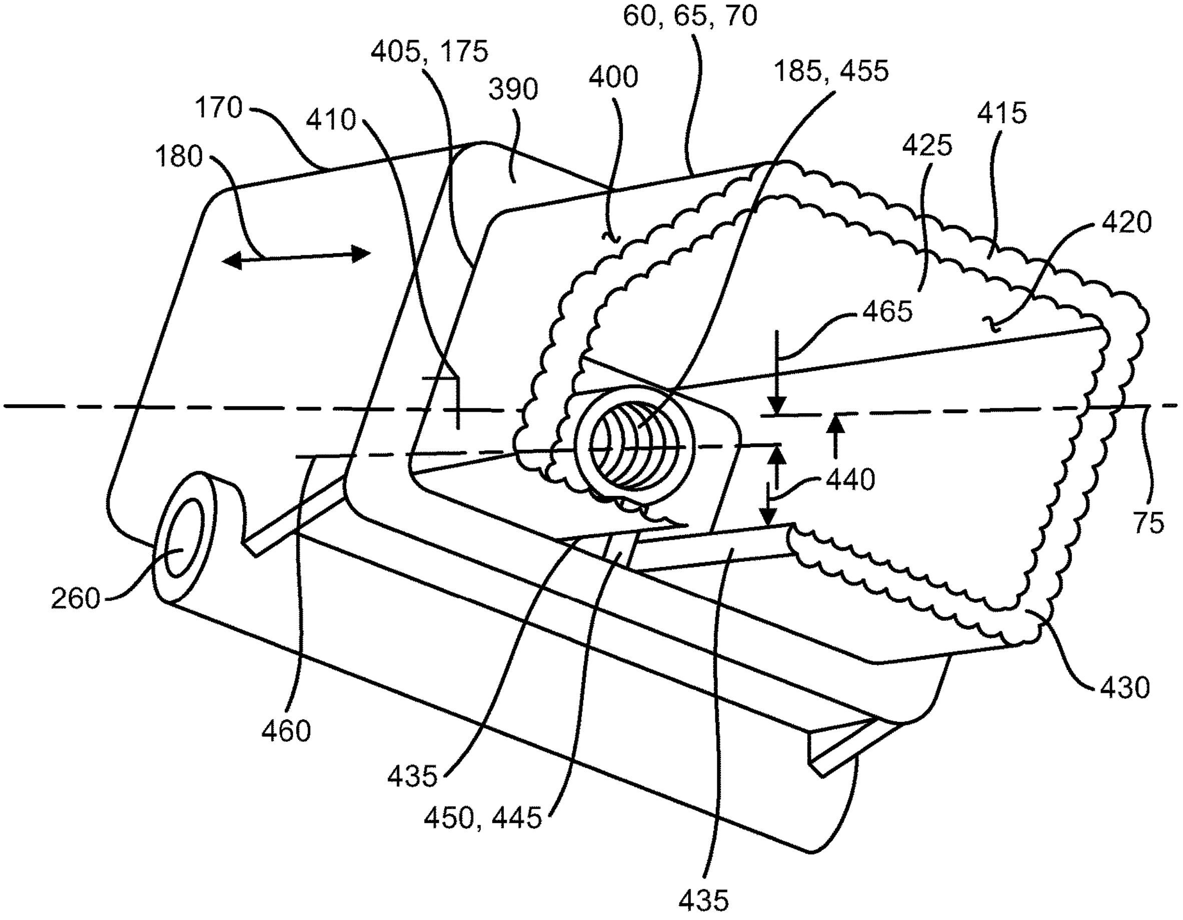
FIG. 5 shows a lower perspective view of the sleeve element that includes the inward extension that terminates into the threaded aperture, also shown is a fifth pivotal attachment, further the sleeve element is shown slidably engaged to the beam noting in particular the extended slot that the inward extension projects therethrough.

Moving onward, FIG. 5 shows a lower perspective view of the sleeve element 170 that includes the inward extension 445 that terminates into the threaded aperture 455, also shown is a fifth pivotal attachment 260, further the sleeve element 170 is shown slidably engaged 175 to the beam 60 noting in particular the extended slot 435 that the inward extension 445 projects and proceeds 450 therethrough.

Figure 6:
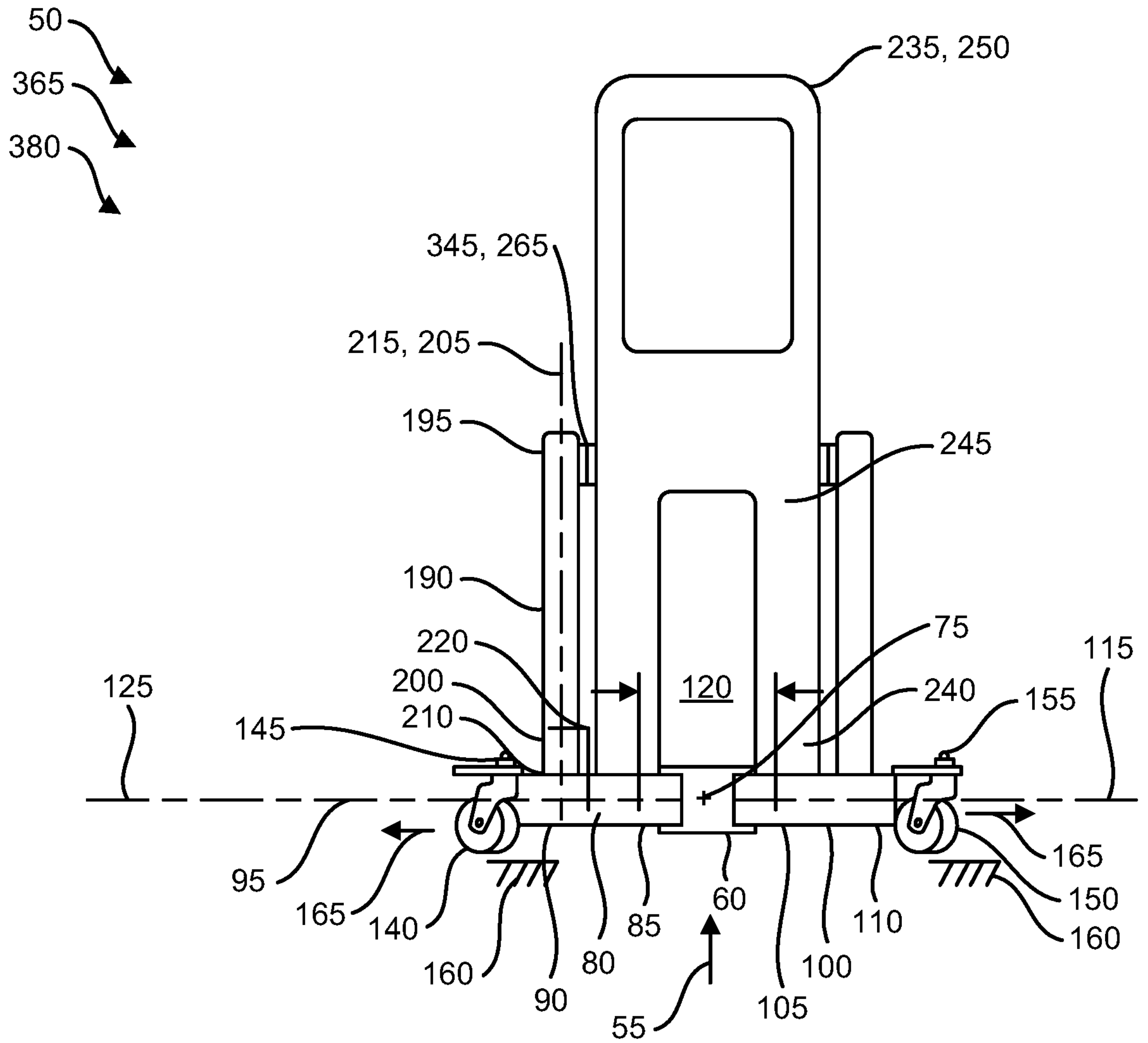
FIG. 6 shows an end elevation view of the creeper apparatus in the upright terminal position state that includes the base structure with the beam, the first and second extensions, the first link, and the frame member, all pivotally linked together and through the sleeve element (not shown) that is reciprocally slidably engaged to the beam with the means for imparting the sleeve element reciprocating movement, the arm and frame member have lockable movement in height and angle.

Continuing, FIG. 6 shows an end elevation view of the creeper apparatus 50 in the upright terminal position state 365 that includes the base structure 55 with the beam 60, the first 80 and second 100 extensions, the first link 190, and the frame member 235, all pivotally 210, 265, 345 linked together and through the sleeve element 170 (not shown).

Figure 7:
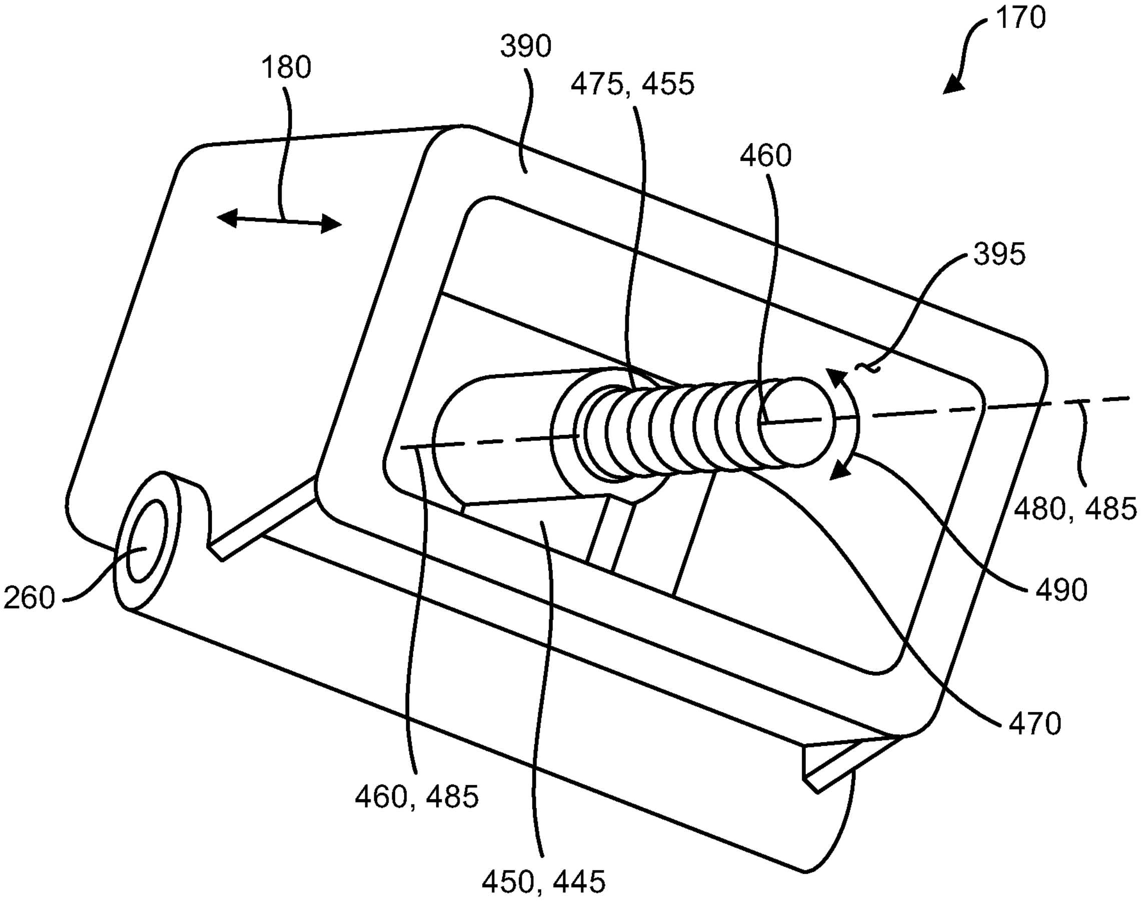
FIG. 7 shows a lower perspective view of the sleeve element that includes the inward extension that terminates into the threaded aperture that shows a threaded rod being threadably engaged to the threaded aperture, also shown is the fifth pivotal attachment.

Next, FIG. 7 shows a lower perspective view of the sleeve element 170 that includes the inward extension 445 that terminates into the threaded aperture 455 that shows a threaded rod 470 being threadably engaged 475 to the threaded aperture 455, also shown is the fifth pivotal attachment 260.

Figure 8:
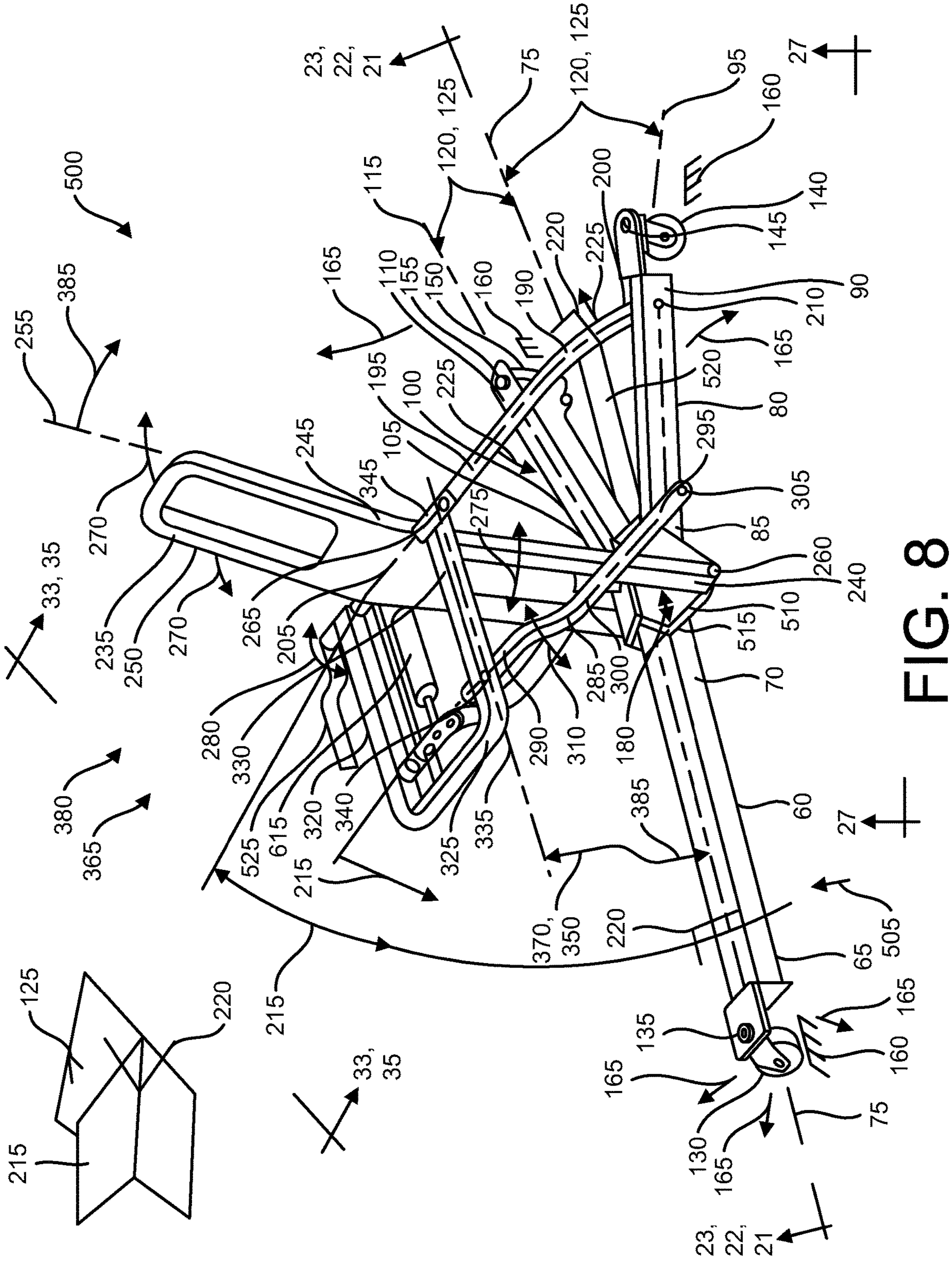
FIG. 8 shows an upper perspective view of the first alternative embodiment of the creeper apparatus in the upright terminal position state that includes a base structure with a beam, a first and second extension, a first and second link, an arm, and a frame member, all pivotally linked together and through a roller slider assembly reciprocally lockably rollably engaged to the beam with a lift cylinder for imparting the roller slider assembly reciprocating movement, the arm and frame member have lockable movement in height and angle from the lockable roller slider assembly.

Further, FIG. 8 shows an upper perspective view of the first alternative embodiment 500 of the creeper apparatus in the upright terminal position state 365, 380 that includes a base structure 505 with a beam 60, a first 80 and a second 100 extension, a first 190 and second 285 link, an arm 320, and a frame member 235, all pivotally 210, 260, 265, 305, 340, 345 linked together and through a roller slider assembly 510 reciprocally lockably rollably engaged 515 to the beam 60 with a lift cylinder 520 for imparting the roller slider assembly 510 reciprocating movement 180, the arm 320 and frame member 235 have lockable movement in height and angle from the lockable 530 roller slider assembly 510.

Figure 9:
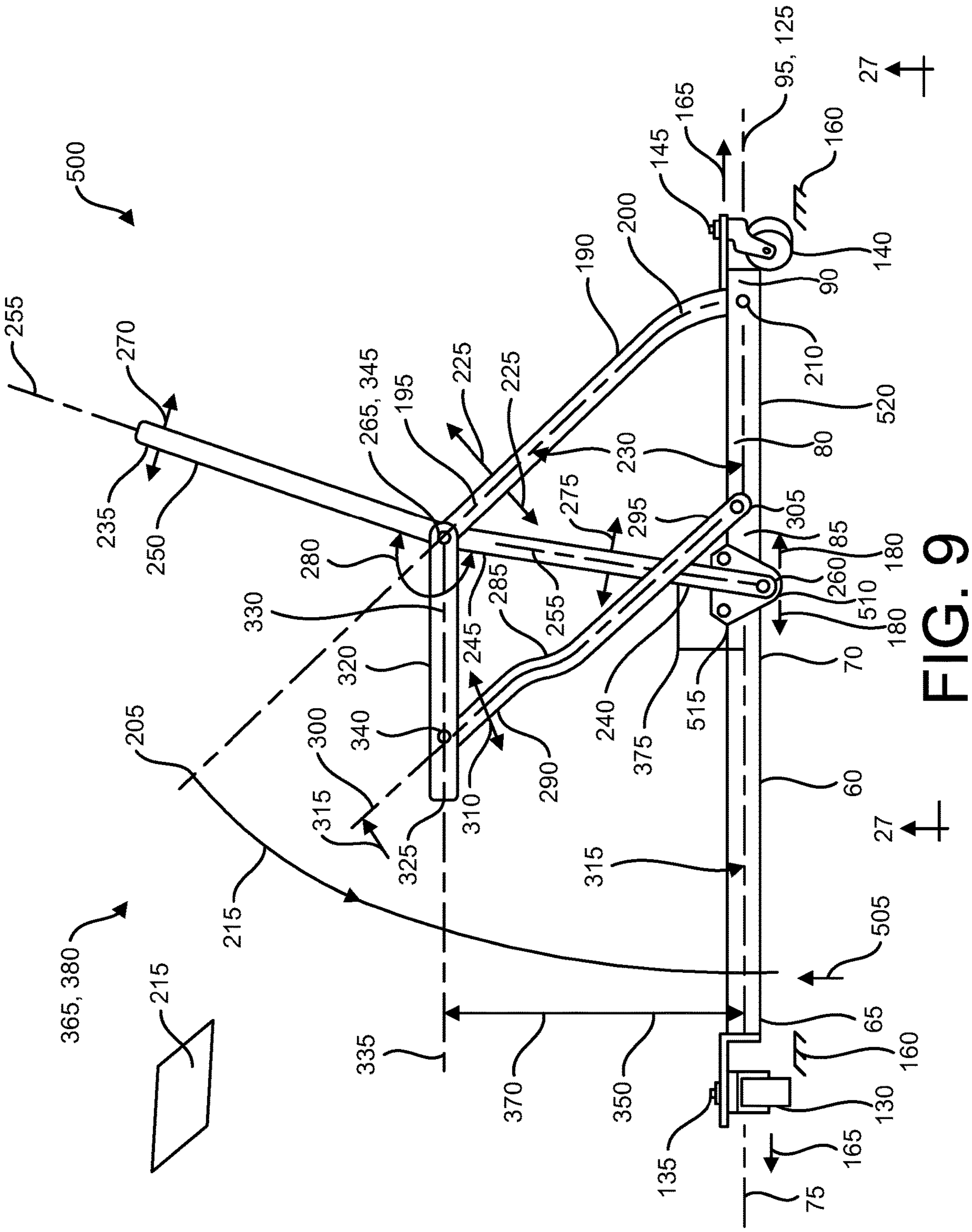
FIG. 9 shows a side elevation view of the first alternative embodiment of the creeper apparatus in the upright terminal position state that includes the base structure with the beam, the first and second extensions, the first and second links, the arm, and the frame member, all pivotally linked together and through the roller slider assembly that is reciprocally lockably rollably engaged to the beam with the lift cylinder for imparting the roller slider assembly reciprocating movement, the arm and frame member have lockable movement in height and angle from the lockable roller slider assembly.

Continuing, FIG. 9 shows a side elevation view of the first alternative embodiment 500 of the creeper apparatus in the upright terminal position state 365, 380 that includes the base structure 505 with the beam 60, the first 80 extension, the first 190, and second 285 links, the arm 320, and the frame member 235, all pivotally 210, 260, 265, 305, 340, 345 linked together and through the roller slider assembly 510 that is reciprocally lockably 530 rollably engaged 515, 546, 551 to the beam 60 with the lift cylinder 520 for imparting the roller slider assembly 510 reciprocating movement 180, the arm 320 and frame member 235 have lockable movement in height and angle from the lockable 530 roller slider assembly 510.

Figure 10:
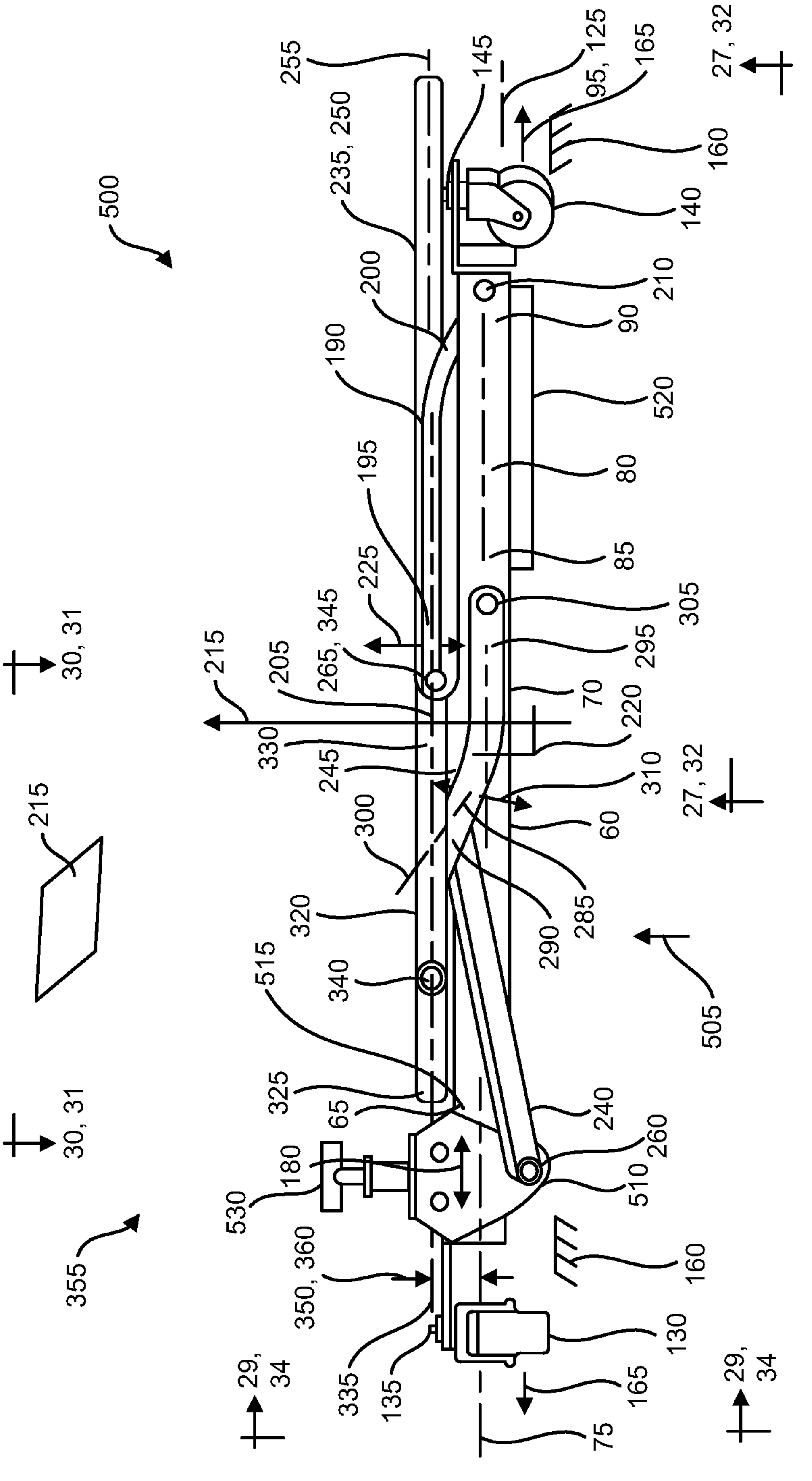
FIG. 10 shows a side elevation view of the first alternative embodiment of the creeper apparatus in the fold flat starting operational position state that includes the base structure with the beam, the first and second extensions, the first and second links, the arm, and the frame member, all pivotally linked together and through the roller slider assembly that is reciprocally lockably rollably engaged to the beam with the lift cylinder for imparting the roller slider assembly reciprocating movement, the arm and frame member have lockable movement in height and angle from the lockable roller slider assembly.

Next, FIG. 10 shows a side elevation view of the first alternative embodiment 500 of the creeper apparatus in the fold flat starting operational position state 355 that includes the base structure 505 with the beam 60, the first 80 extension, the first 190 and second 285 links, the arm 320, and the frame member 235, all pivotally 210, 260, 265, 305, 340, 345 linked together and through the roller slider assembly 510 that is reciprocally lockably 530 rollably engaged 515, 546, 551 to the beam 60 with the lift cylinder 520 for imparting the roller slider assembly 510 reciprocating movement 180, the arm 320 and frame member 235 have lockable movement in height and angle from the lockable 530 roller slider assembly 510.

Figure 11:
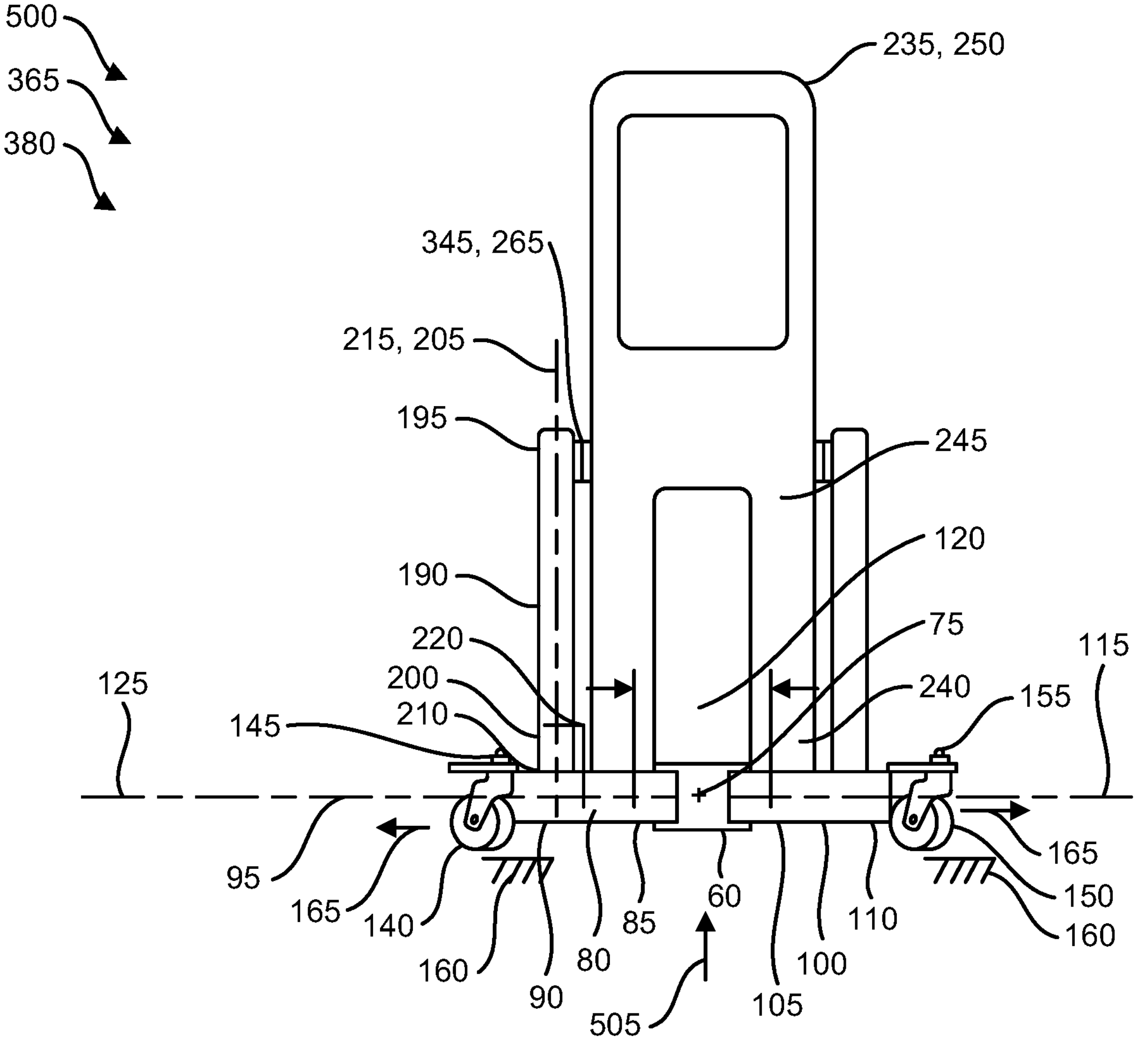
FIG. 11 shows an end elevation view of the first alternative embodiment of the creeper apparatus in the upright terminal position state that includes the base structure with the beam, the first and second extensions, the first link, and the frame member, all pivotally linked together and through the roller slider assembly (not shown) that is reciprocally lockably rollably engaged to the beam with the lift cylinder for imparting the roller slider assembly reciprocating movement, the arm and frame member have lockable movement in height and angle from the lockable roller slider assembly.

Moving onward, FIG. 11 shows an end elevation view of the first alternative embodiment 500 of the creeper apparatus in the upright terminal position state 365, 380 that includes the base structure 505 with the beam 60, the first 80 and second 100 extensions, the first link 190, and the frame member 235.

Figure 12:
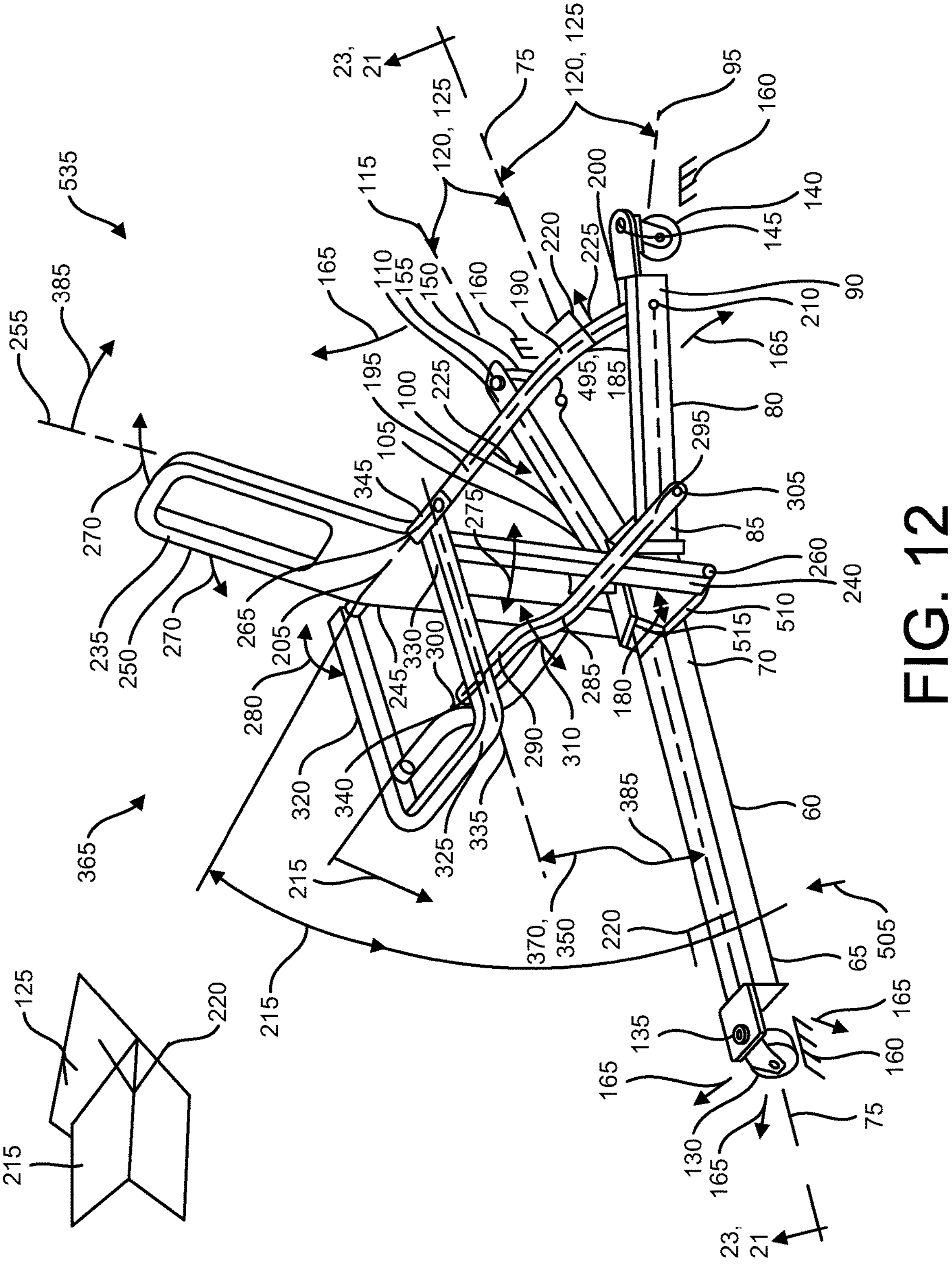
FIG. 12 shows an upper perspective view of the second alternative embodiment of the creeper apparatus in the upright terminal position state that includes a base structure with a beam, a first and second extension, a first and second link, an arm, and a frame member, all pivotally linked together and through a roller slider assembly reciprocally lockably rollably engaged to the beam, the arm and frame member have lockable movement in height and angle from the lockable roller slider assembly.

Continuing, FIG. 12 shows an upper perspective view of the second alternative embodiment 535 of the creeper apparatus in the upright terminal position state 365, 380 that includes a base structure 505 with a beam 60, a first 80 and a second 100 extension, a first 190 and second 285 links, an arm 320, and a frame member 235, all pivotally 210, 260, 265, 305, 340, 345 linked together and through a roller slider assembly 510 reciprocally lockably 530 rollably engaged 515 to the beam 60, the arm 320 and frame member 235 have lockable movement in height and angle from the lockable 530 roller slider assembly 510.

Figure 13:
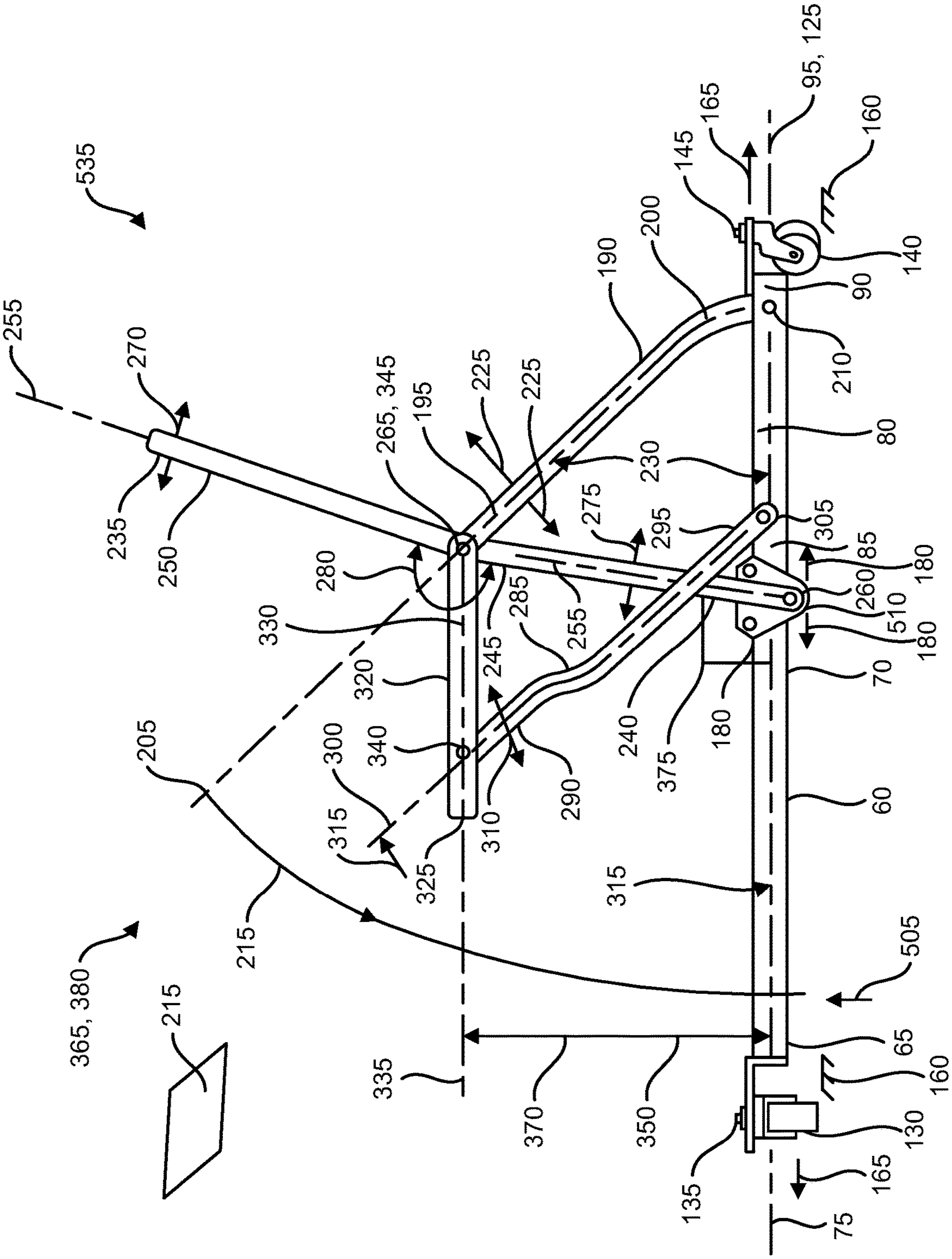
FIG. 13 shows a side elevation view of the second alternative embodiment of the creeper apparatus in the upright terminal position state that includes the base structure with the beam, the first and second extensions, the first and second links, the arm, and the frame member, all pivotally linked together and through the roller slider assembly that is reciprocally lockably rollably engaged to the beam, the arm and frame member have lockable movement in height and angle from the lockable roller slider assembly.

Next, FIG. 13 shows a side elevation view of the second alternative embodiment 535 of the creeper apparatus in the upright terminal position state 365, 380 that includes the base structure 505 with the beam 60, the first 80 extension, the first 190 and second 285 links, the arm 320, and the frame member 235, all pivotally 210, 260, 265, 305, 340, 345 linked together and through the roller slider assembly 510 that is reciprocally lockably 530 rollably engaged 515 to the beam 60, the arm 320 and frame member 235 have lockable movement in height and angle from the lockable 530 roller slider assembly 510.

Figure 14:
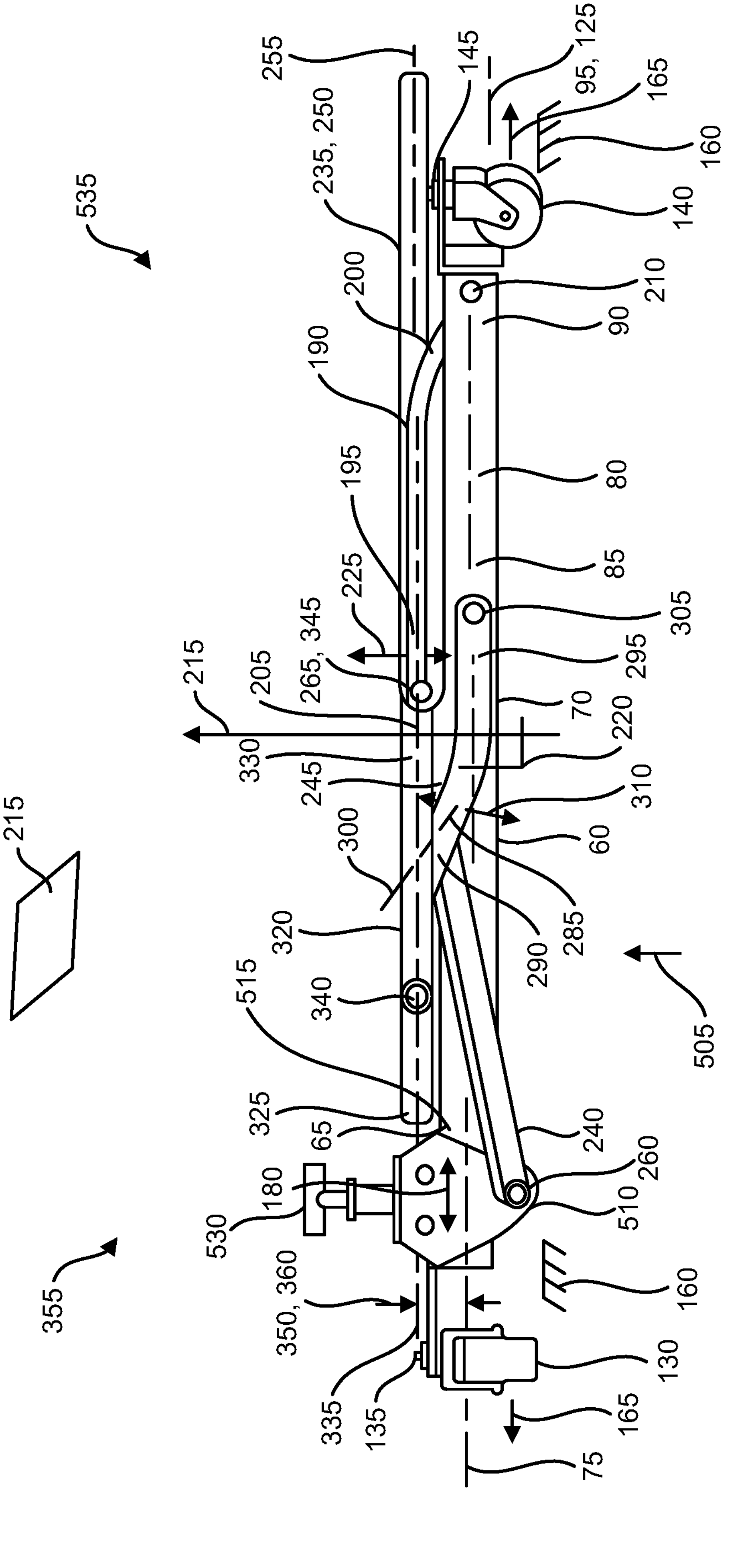
FIG. 14 shows a side elevation view of the second alternative embodiment of the creeper apparatus in the fold flat starting operational position state that includes the base structure with the beam, the first and second extensions, the first and second links, the arm, and the frame member, all pivotally linked together and through the roller slider assembly that is reciprocally lockably rollably engaged to the beam, the arm and frame member have lockable movement in height and angle from the lockable roller slider assembly.

Further, FIG. 14 shows a side elevation view of the second alternative embodiment 535 of the creeper apparatus in the fold flat starting operational position state 355 that includes the base structure 505 with the beam 60, the first 80 extension, the first 190 and second 285 links, the arm 320, and the frame member 235, all pivotally 210, 260, 265, 305, 340, 345 linked together and through the roller slider assembly 510 that is reciprocally lockably 530 rollably engaged to the beam 60, the arm 320 and frame member 235 have lockable movement in height and angle from the lockable 530 roller slider assembly 510.

Figure 15:
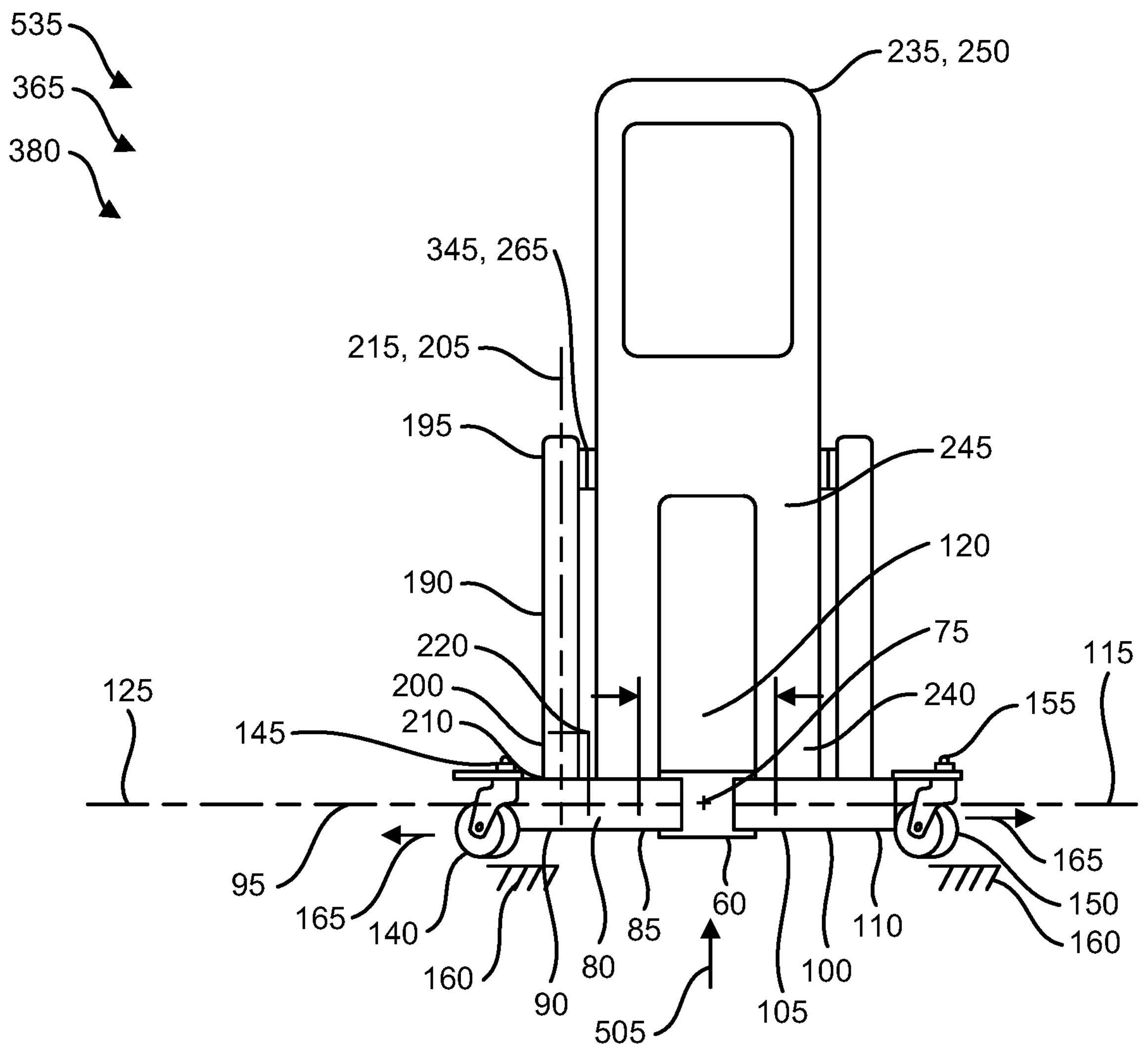
FIG. 15 shows an end elevation view of the second alternative embodiment of the creeper apparatus in the upright terminal position state that includes the base structure with the beam, the first and second extensions, the first link, and the frame member, all pivotally linked together and through the roller slider assembly (not shown) that is reciprocally lockably rollably engaged to the beam, the arm and frame member have lockable movement in height and angle from the lockable roller slider assembly.

Also, FIG. 15 shows an end elevation view of the second alternative embodiment 535 of the creeper apparatus in the upright terminal position state 365, 380 that includes the base structure 505 with the beam 60, the first 80 and second 100 extensions, the first link 190, and the frame member 235.

Figure 16:
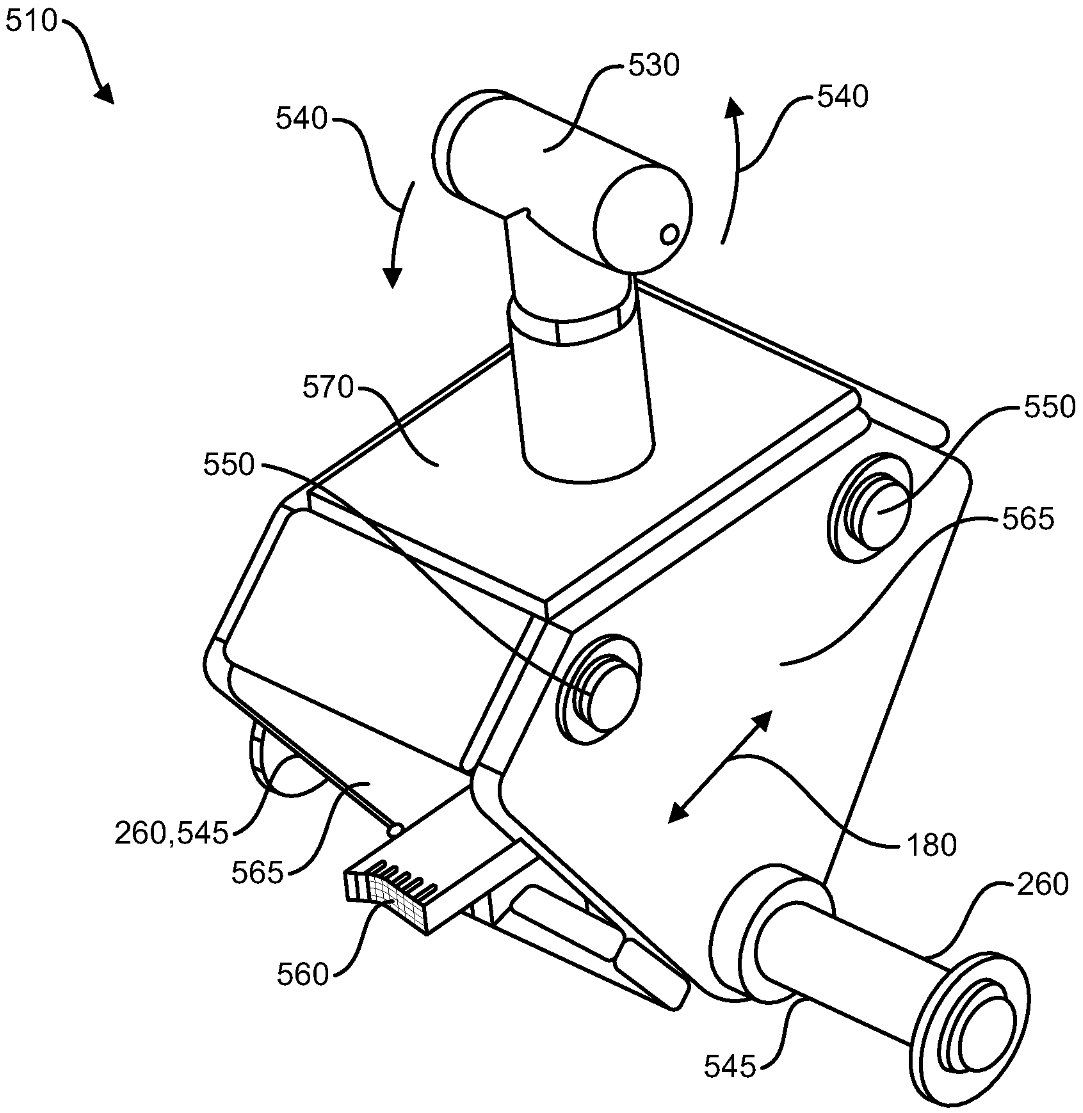
FIG. 16 shows an upper perspective view of the roller slider assembly externally that includes the quarter turn locking spring plunger, the top plate, the side plates, the upper slide roller, the lower slide roller, and the dynamic leaf chain anchor.

Further, FIG. 16 shows an upper perspective view of the roller slider assembly 510 externally that includes the quarter turn locking spring plunger 530, the top plate 570, the side plates 565, the upper slide roller 550, the lower slide roller 545, and the dynamic leaf chain anchor 560.

Figure 17:
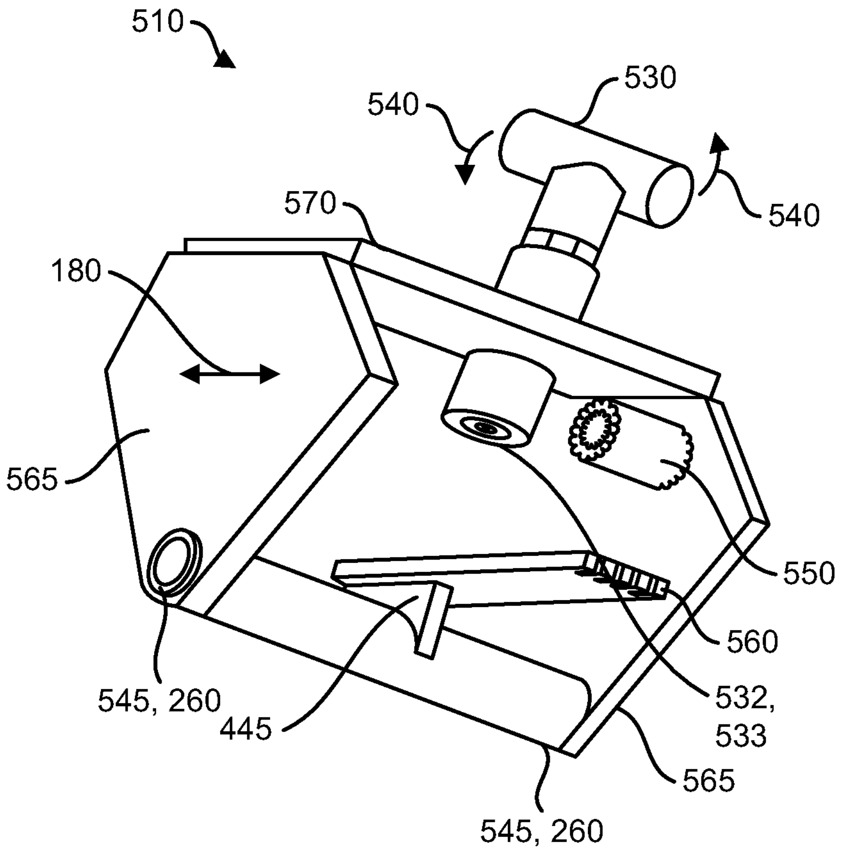
FIG. 17 shows a lower perspective view of the roller slider assembly internally that includes the quarter turn locking spring plunger with the extension in the retracted state, the top plate, the side plates, the upper slide roller, the lower slide roller, and the dynamic leaf chain anchor.

Moving on, FIG. 17 shows a lower perspective view of the roller slider assembly 510 internally that includes the quarter turn locking spring plunger 530 with the extension 533 in the retracted state 532, the top plate 570, the side plates 565, the upper slide roller 550, the lower slide roller 545, and the dynamic leaf chain anchor 560.

Figure 18:
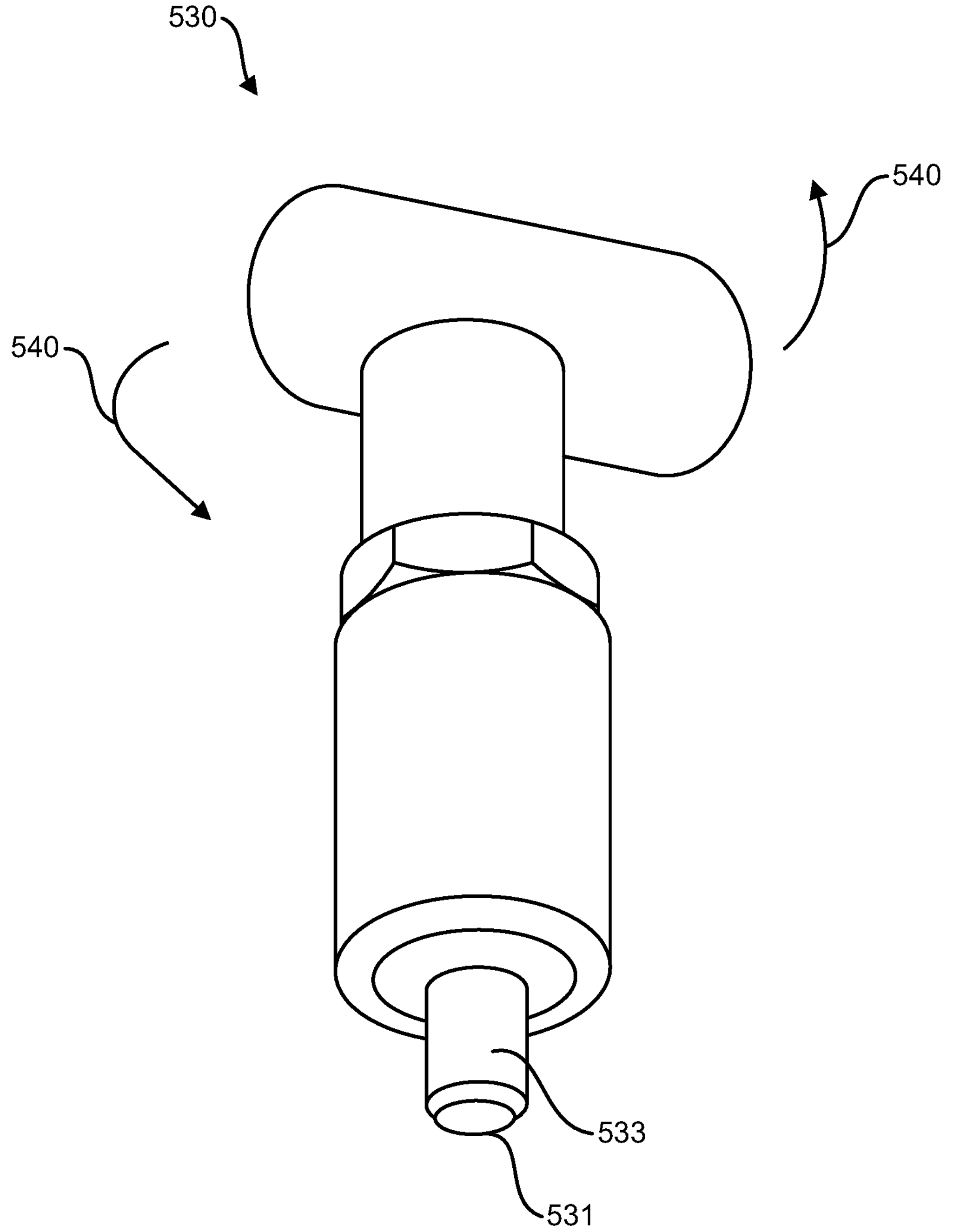
FIG. 18 shows a lower perspective view of the quarter turn locking spring plunger with the extension in the extended state.

Next, FIG. 18 shows a lower perspective view of the quarter turn locking spring plunger 530 with the extension 533 in the extended state 531, with the quarter turn movement 540 shown that facilitates movement of the extension 533 from the extended 531 to retracted 532 states and vice versa.

Figure 19:
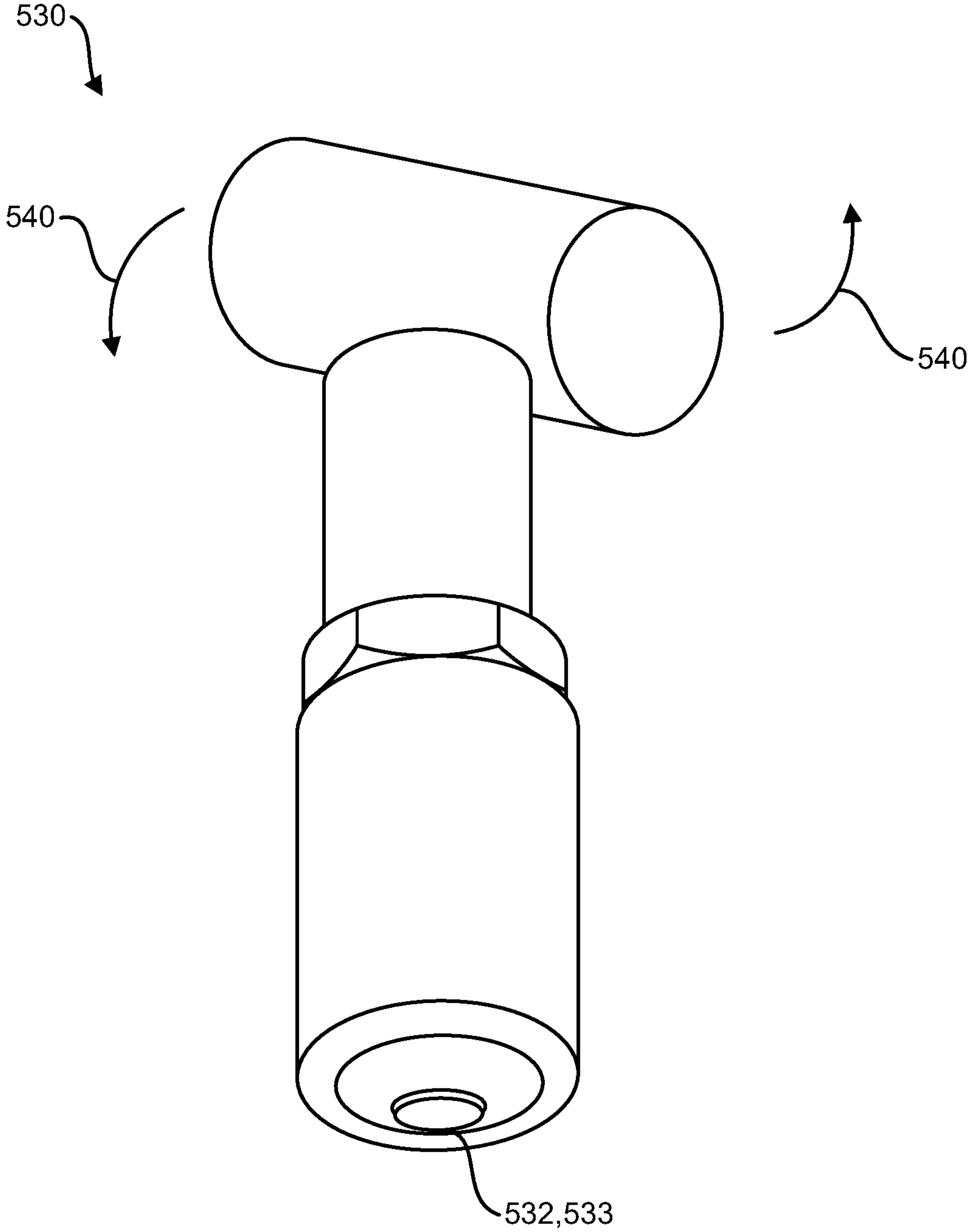
FIG. 19 shows a lower perspective view of the quarter turn locking spring plunger with the extension in the retracted state.

Also, FIG. 19 shows a lower perspective view of the quarter turn locking spring plunger 530 with the extension 533 in the retracted state 532, with the quarter turn movement 540 shown that facilitates movement of the extension 533 from the extended 531 to retracted 532 states and vice versa.

Figure 20:
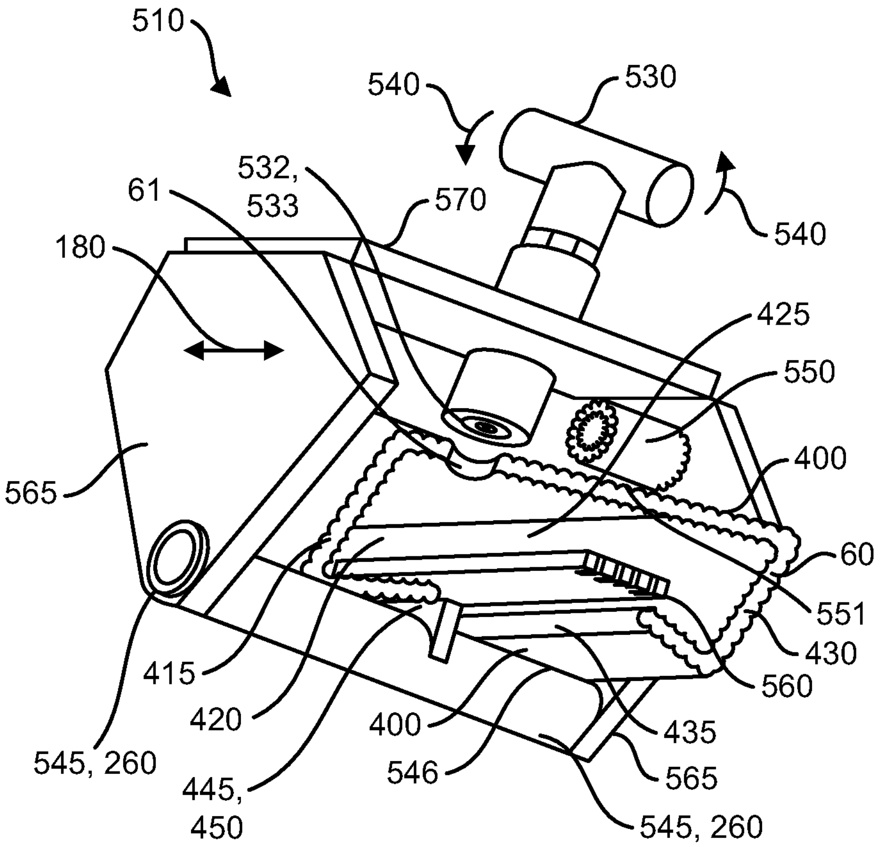
FIG. 20 shows a lower perspective view of the roller slider assembly internally in place with the beam outer surface and beam inner surface with the beam outer surface roller interface of both the upper roller and the lower roller to the beam outer surface, also included is the quarter turn locking spring plunger with the extension in the retracted state, the top plate, the side plates, the upper slide roller, the lower slide roller, and the dynamic leaf chain anchor, in addition shown in the beam aperture that is aligned with the extension of the quarter turn locking spring plunger, plus the beam slot wherein the inward extension projecting therethrough the beam slot to support the dynamic leak chain anchor that is affixed to the lower roller slider.

Continuing, FIG. 20 shows a lower perspective view of the roller slider assembly 510 internally in place with the beam 60 outer surface 400 and beam 60 inner surface 420 with the beam 60 outer surface 400 roller interface 515 of both the upper roller 551 and the lower roller 546 to the beam 60 outer surface 400, also included is the quarter turn locking spring plunger 530 with the extension 533 in the retracted state 532, the top plate 570, the side plates 565, the upper slide roller 550, the lower slide roller 545, and the dynamic leaf chain anchor 560, in addition shown in the beam 60 aperture 61 that is aligned with the extension 533 of the quarter turn locking spring plunger 530, plus the beam 60 slot 435 wherein the inward extension 445 projecting 450 therethrough the beam 60 slot 435 to support the dynamic leaf chain anchor 560 that is affixed to the lower roller slider 545.

Figure 21:
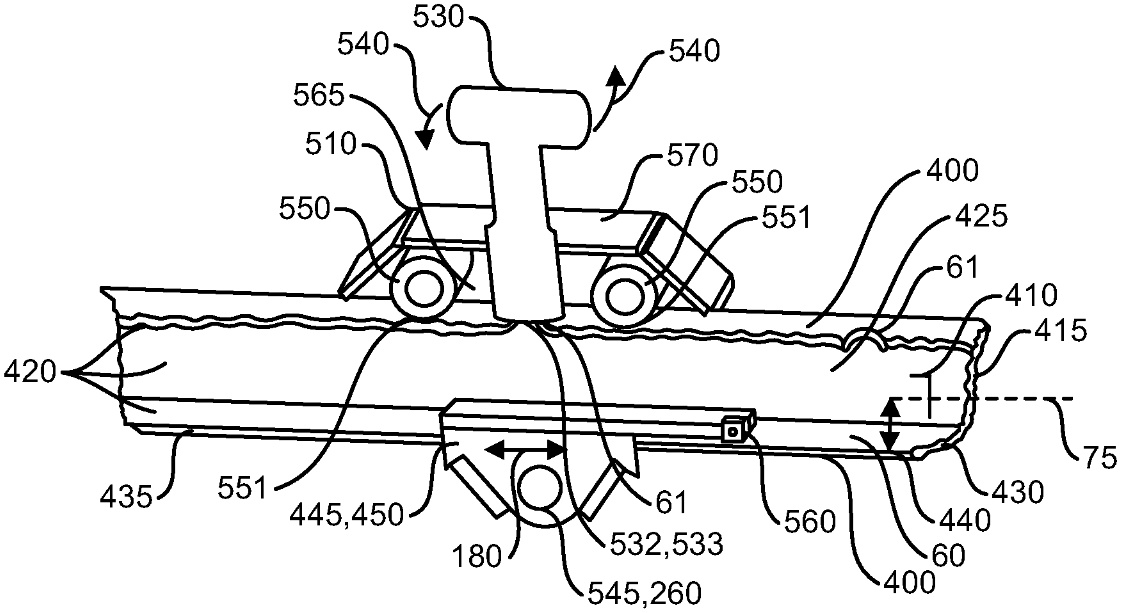

In addition, FIG. 21 shows cross section cut 21-21 from FIGS. 8 and 12, wherein FIG. 21 is the cross section view of FIG. 20, with FIG. 21 showing the roller slider assembly 510 internally in place with the beam 60 outer surface 400 and beam 60 inner surface 420 with the beam 60 outer surface 400 roller interface 515 of both the upper roller 551 and the lower roller 546 to the beam 60 outer surface 400, also included is the quarter turn locking spring plunger 530 with the extension 533 in the retracted state 532 over the beam 60 aperture 61, the top plate 570, the side plate 565, the upper slide roller 550, the lower slide roller 545, and the dynamic leaf chain anchor 560, in addition shown in the beam 60 aperture 61 that is aligned with the retracted 532 extension 533 of the quarter turn locking spring plunger 430, plus the beam 60 slot 435 wherein the inward extension 445 projecting 450 therethrough the beam 60 slot 435 to support the dynamic leaf chain anchor 560 that is affixed to the lower roller slider 545, plus the reciprocating movement 180 of the roller slider assembly 510 along the beam 60 longitudinal axis 75.

Figure 22:
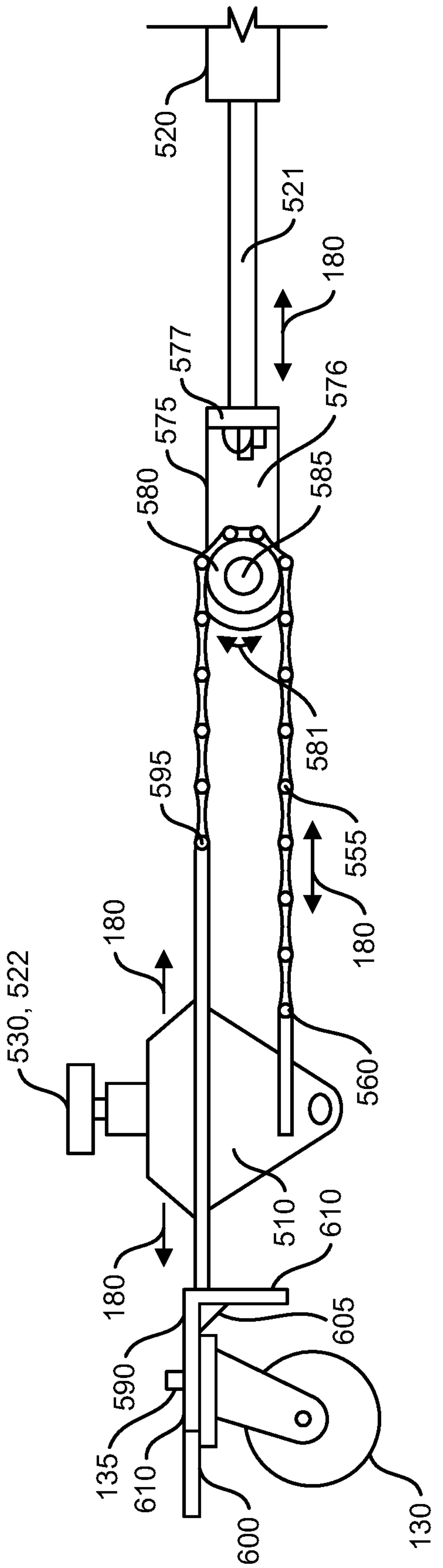
FIG. 22 shows cross section view 22-22 from FIG. 8, however, with the beam stripped away for clarity to more clearly show the roller slider assembly snatch block arrangement as between the fixed and dynamic leaf chain anchors, the lift cylinder and rod, the clevis and roller of the lift cylinder rod along with the front caster mount all to effectuate reciprocal movement of the roller slider assembly from lift cylinder rod movement.

Next, FIG. 22 shows cross section view 22-22 from FIG. 8, however, with the beam stripped away for clarity to more clearly show the roller slider assembly 510 snatch block arrangement defined as between the fixed 595 and dynamic 560 leaf chain 555 anchors, the lift cylinder 520 and rod 521, the clevis 575 and roller 580 of the lift cylinder 520 rod 521 along with the front caster 130 mount 590 all to effectuate reciprocal movement 180 of the roller slider assembly 510 from lift cylinder 520 rod 521 movement 180.

Figure 23:
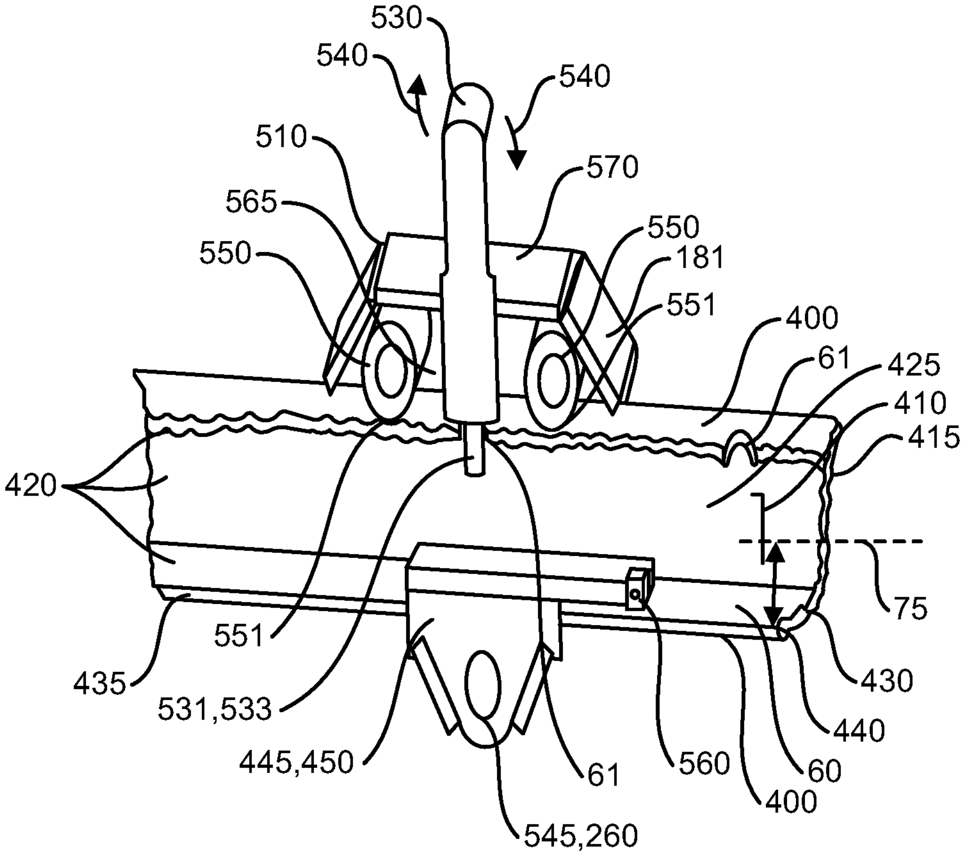

Also, FIG. 23 shows cross section cut 23-23 from FIGS. 8 and 12, wherein FIG. 23 is the cross section view of FIG. 21, with FIG. 23 showing the quarter turn locking spring plunger 530 with the extension 533 in the extended state 531 disposed therethrough the beam 660 aperture 61 to lock the roller slider assembly 510 along the beam 60 longitudinal axis 75, also the roller slider assembly 510 internally in place with the beam 60 outer surface 400 and beam 60 inner surface 420 with the beam 60 outer surface 400 roller interface 515 of both the upper roller 550 and the lower roller 545 to the beam 60 outer surface 400, the top plate 570, the side plate 565, the upper slide roller 550, the lower slide roller 545, and the dynamic leaf chain anchor 560, plus the beam 60 slot 435 wherein the inward extension 533 projecting 450 therethrough the beam 60 slot 435 to support the dynamic leaf chain anchor 560 that is affixed to the lower roller slider 545.

Figure 24:
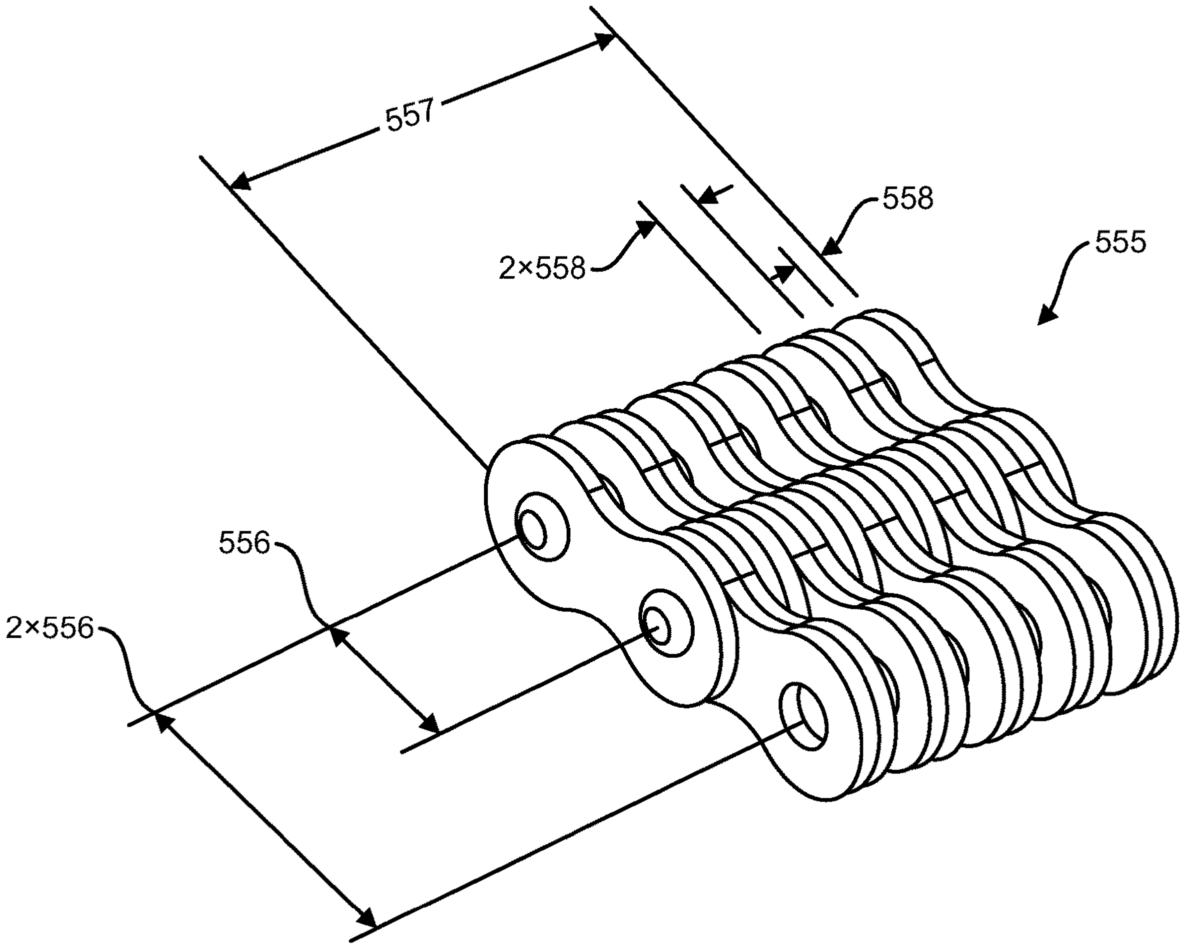
FIG. 24 shows an upper perspective view of a segment of the leaf chain that including showing the pitch and the thickness of the leaf and the thickness of the leaf chain.

Further, FIG. 24 shows an upper perspective view of a segment of the leaf chain 555 that including showing the pitch 556 and the thickness 558 of the leaf and the thickness of the leaf chain assembly 557.

Figure 25:
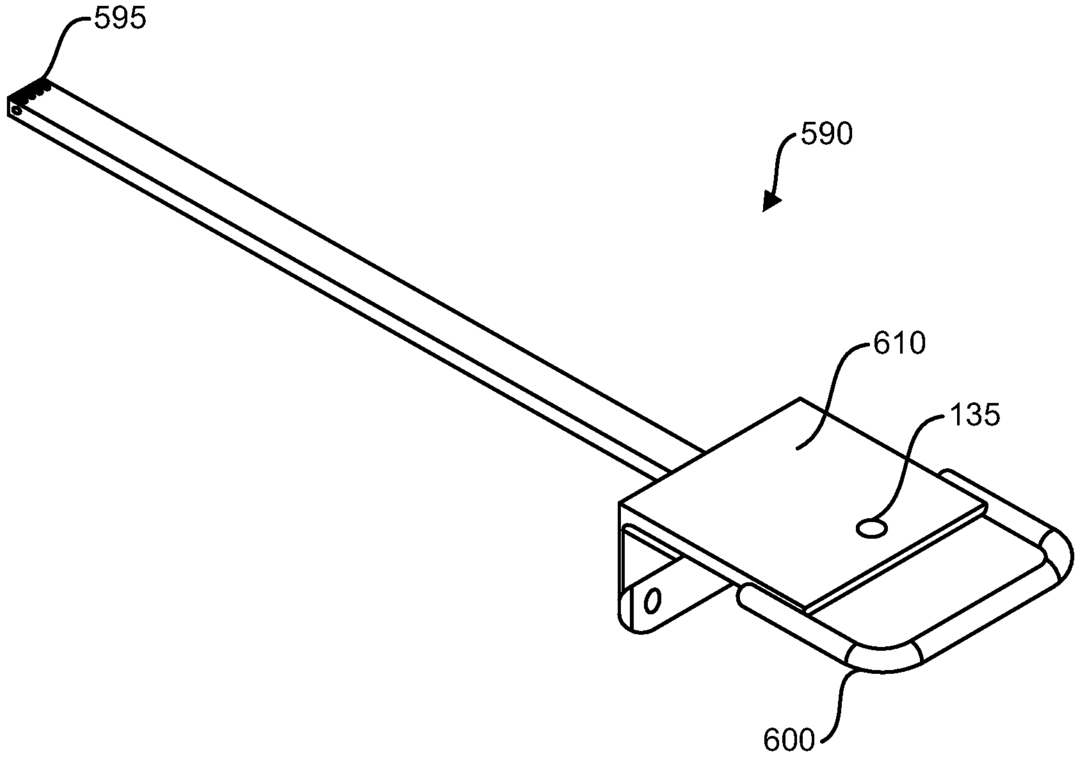
FIG. 25 shows an upper perspective view of the front caster mount with the fixed leaf chain anchor, the handle, and the first caster wheel pivotal mount.

Further, FIG. 25 shows an upper perspective view of the front caster mount 590 with the fixed leaf chain anchor 595, the handle 600, and the first caster wheel pivotal mount 135.

Figure 26:
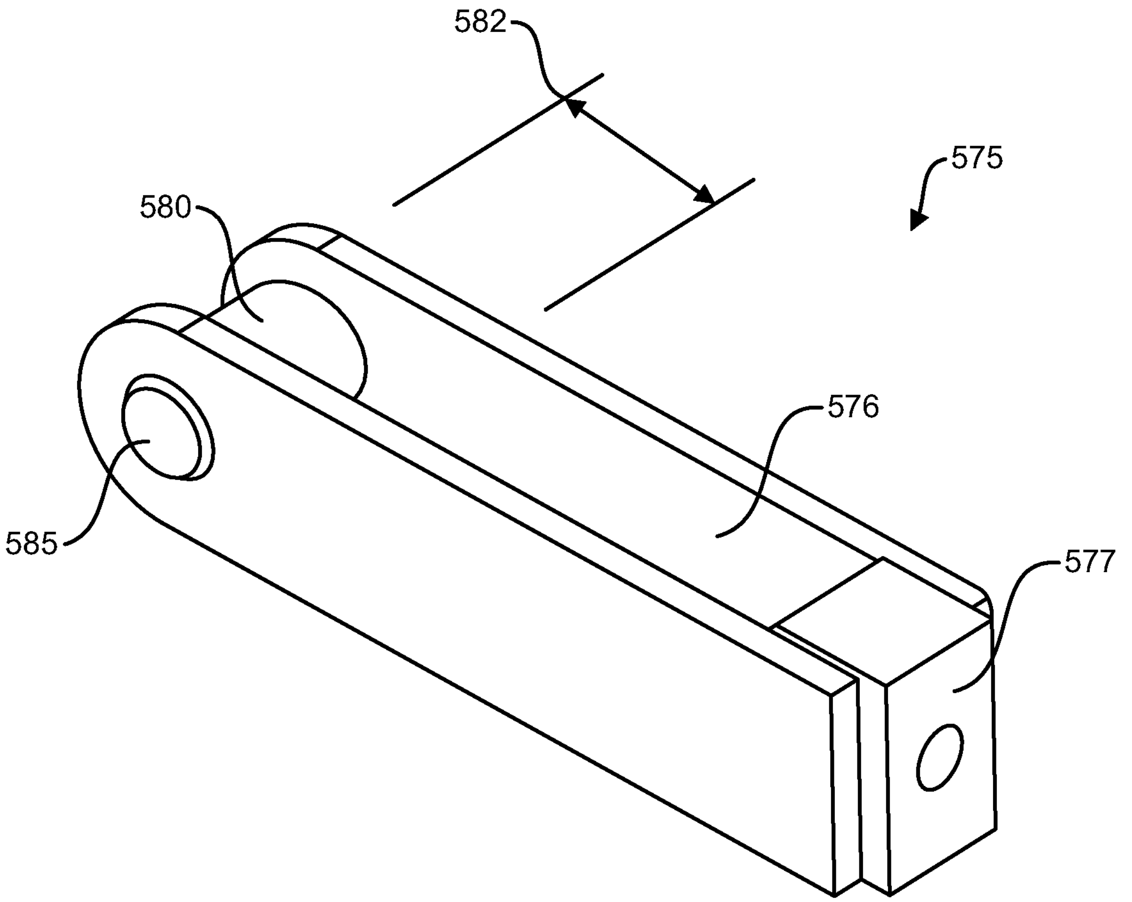
FIG. 26 shows an upper perspective view of the clevis of the lift cylinder, wherein the clevis includes the roller and pin plus the opposing arm and block end of the clevis.

Additionally, FIG. 26 shows an upper perspective view of the clevis 575 of the lift cylinder 520 (not shown), wherein the clevis 575 includes the roller 580 and pin 585 plus the opposing arm 576 and block end 577 of the clevis 575.

Figure 27:
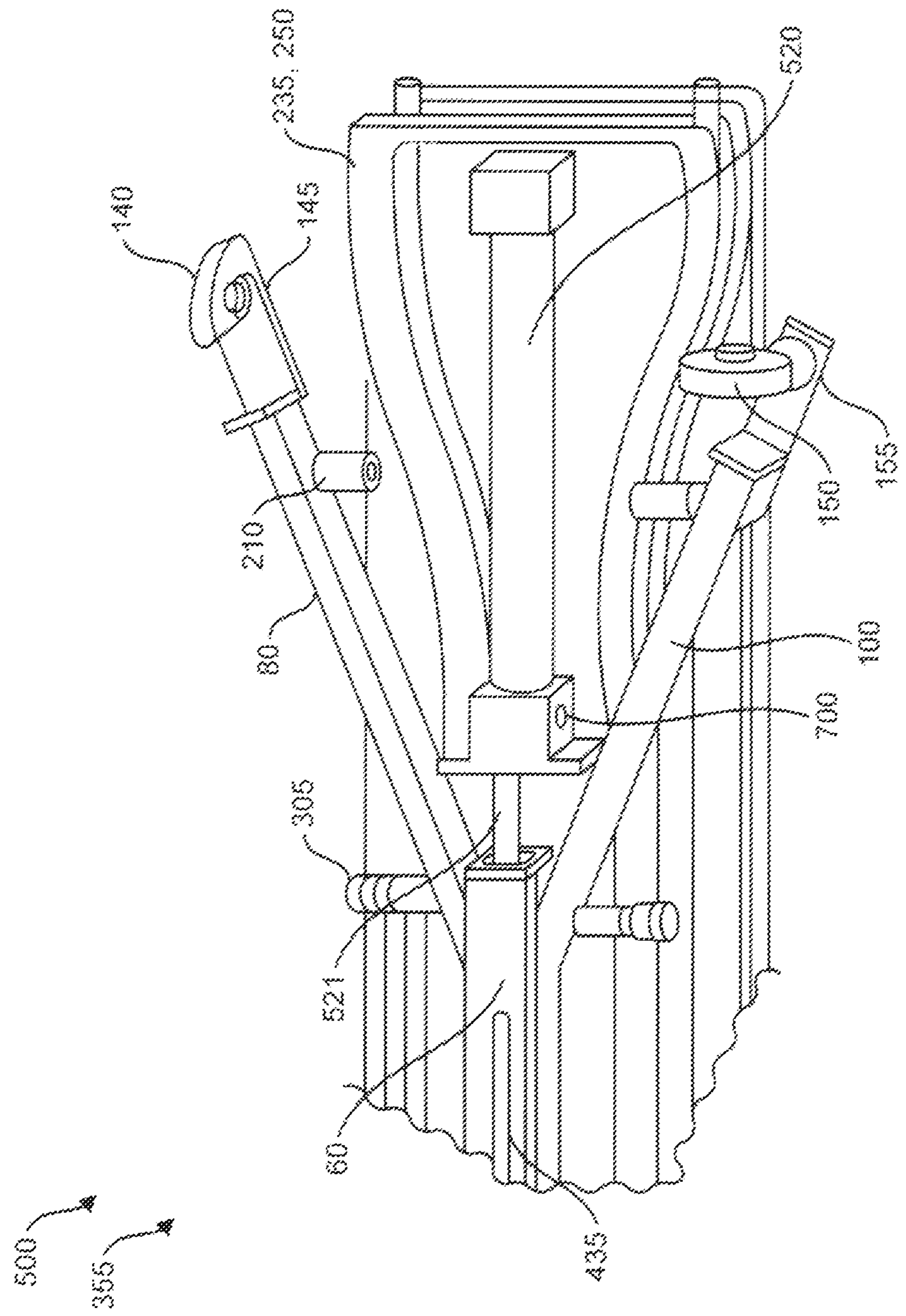

Continuing, FIG. 27 shows view 27-27 from FIGS. 8, 9, and 10, wherein FIG. 27 shows a bottom view of the first alternative embodiment 500 of the creeper apparatus in the fold flat operational positional state 355 to include the second 140 and third 150 casters and related mounts 145, 155 and first 80 and second 100 extensions, also included is the lift cylinder 520 and lift cylinder rod 521, the beam 60 and the beam 60 slot 435 are shown.

Figure 28:
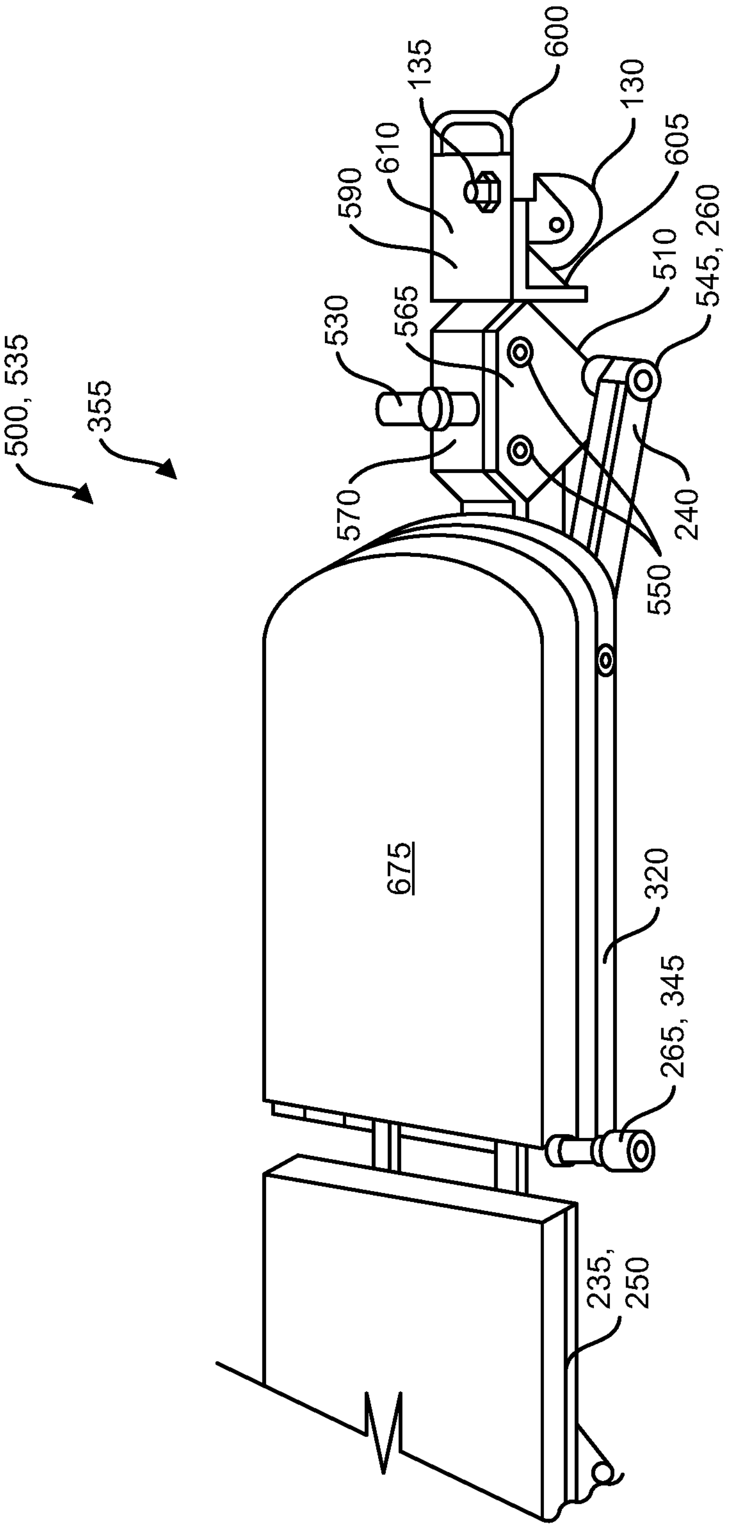
FIG. 28 shows an upper perspective view of both the first and second alternative embodiments of the creeper apparatus in the fold flat operational positional state from the left hand side of both FIGS. 10 and 14, further shown is the first caster mount with the first caster wheel, the roller slider assembly, the primary end portion of the frame member having the fifth pivotal attachment to the lower roller slider of the roller slider assembly.

Moving ahead, FIG. 28 shows an upper perspective view of both the first 500 and second 535 alternative embodiments of the creeper apparatus in the fold flat operational positional state 355 from the left hand side of both FIGS. 10 and 14, further shown is the first caster mount 135 with the first caster wheel 130, the roller slider assembly 510, the primary end portion 240 of the frame member 235 having the fifth pivotal attachment 260 to the lower roller slider 545 of the roller slider assembly 510.

Figure 29:
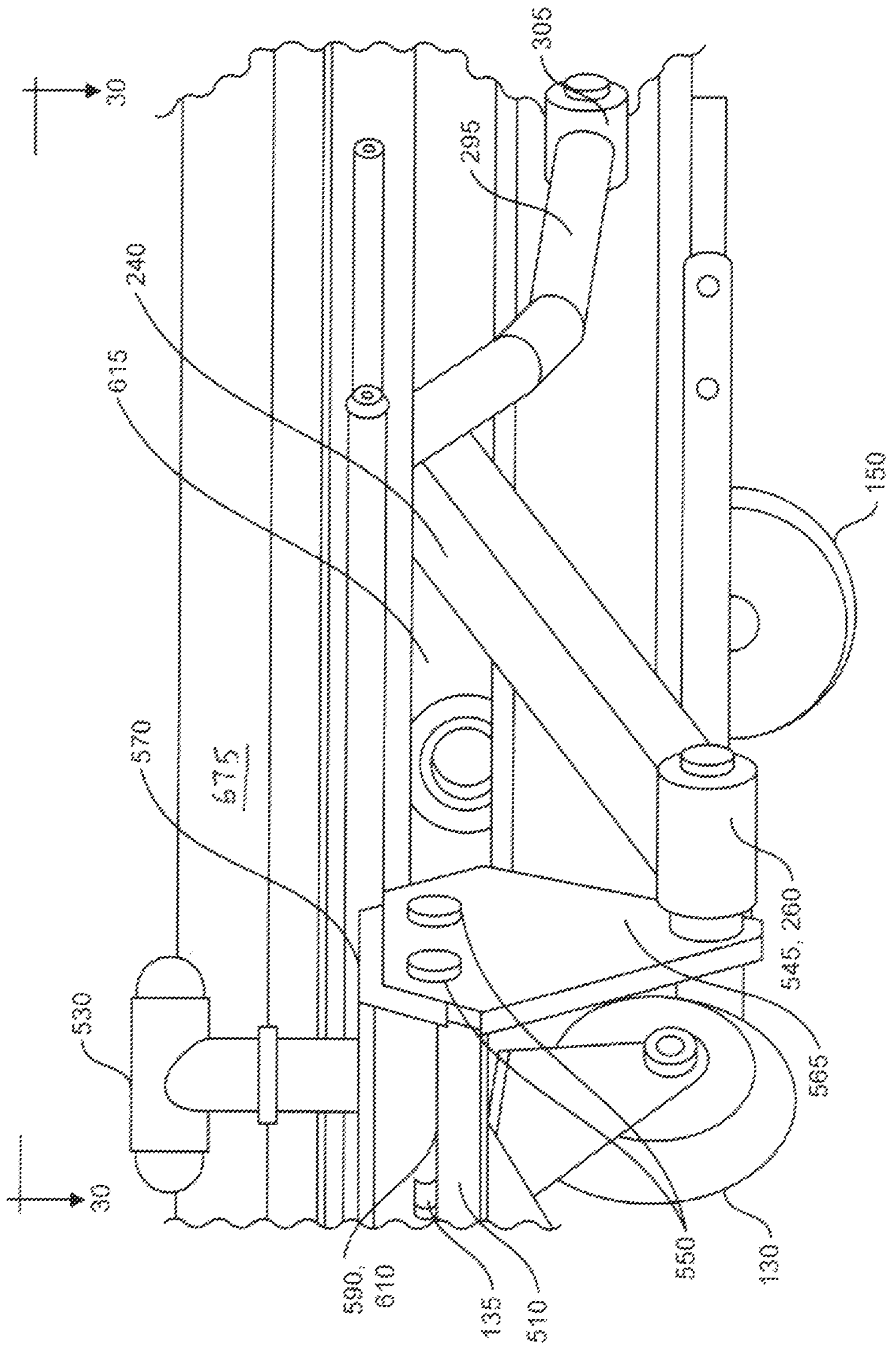

Continuing, FIG. 29 shows view 29-29 from FIG. 10, wherein FIG. 29 shows the front side elevation view from the surface level 160 of the first alternative embodiment 500 in the fold flat operational positional state 355 that includes the first caster 130, the first caster mount 135, the roller slider assembly 510, the quarter turn locking spring plunger 530, the primary end portion 240 of the frame member 235 having the fifth pivotal attachment 260 to the lower roller slider 545 of the roller slider assembly 510, further shown is the pump cylinder 615.

Figure 30:
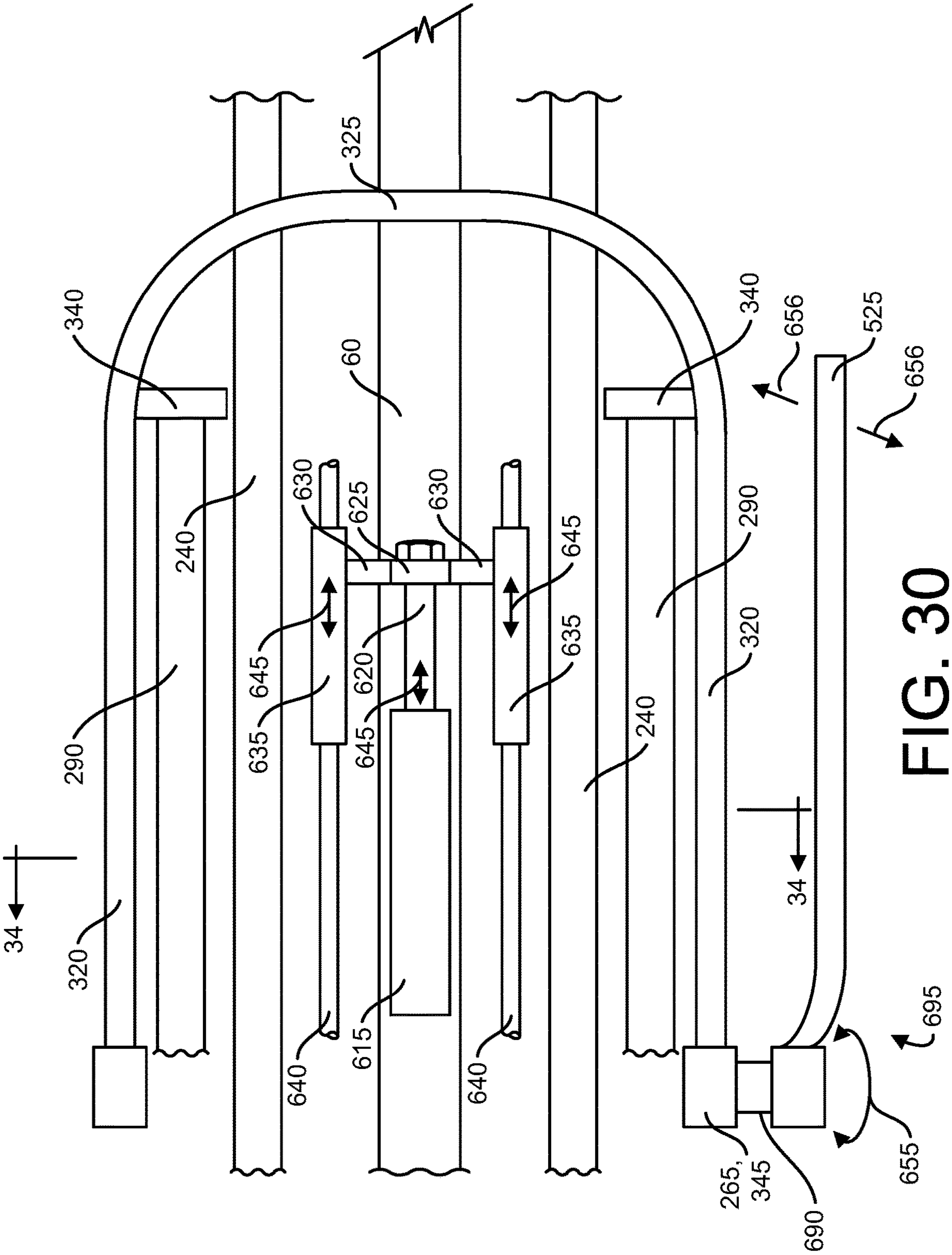

Further, FIG. 30 shows view 30-30 from FIGS. 10 and 29, wherein FIG. 30 is a top down view of the first alternative embodiment 500 of the creeper apparatus in the fold flat operational positional state 355 to primarily show the pump cylinder 615, the pump handle 525 and the pump handle 525 rotational movement 655, the guide rods 640 that slidably engage the guide frame 635, plus the extensions 630 and the retainer 625 of the guide frame 635 for connecting to the rod 620 of the pump cylinder 615 to effectuate reciprocating movement 645 of the rod 620 of the pump cylinder 615, wherein the pump cylinder 615 is disposed within the arm 320 structure, as best shown in FIG. 8.

Figure 31:
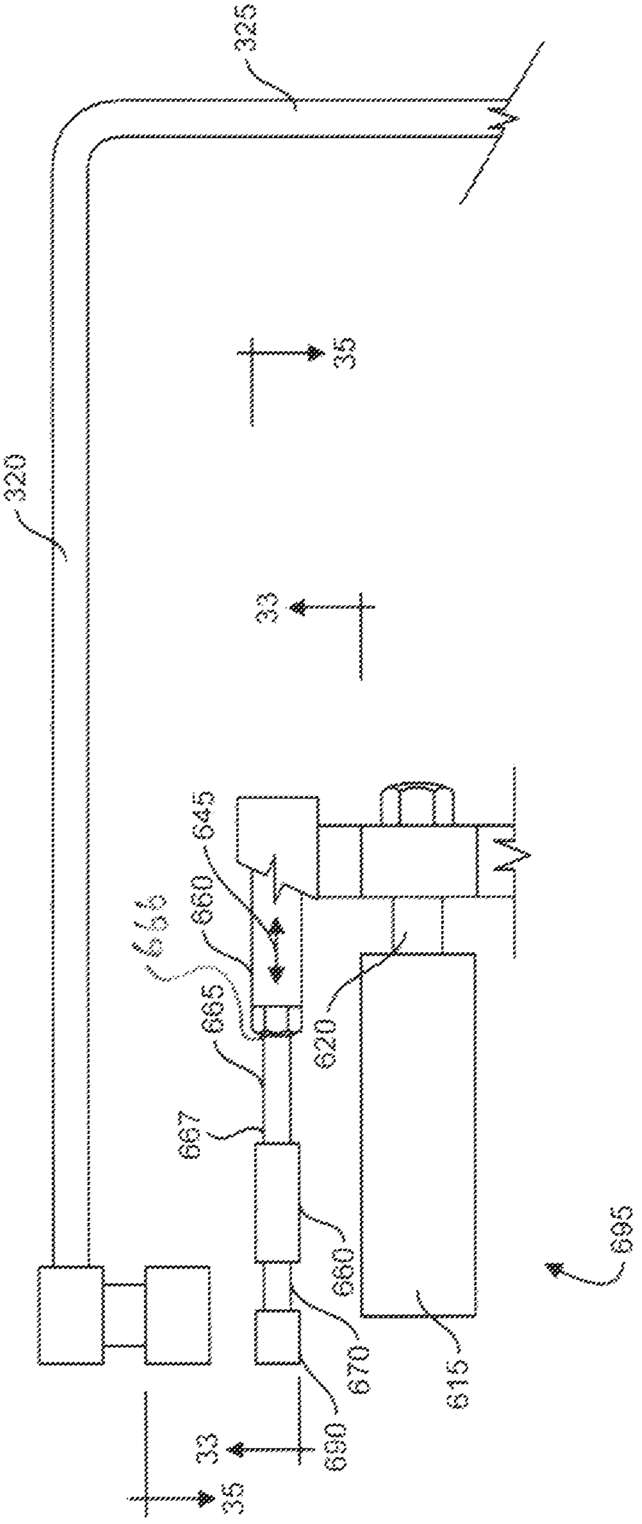
Figure 35:
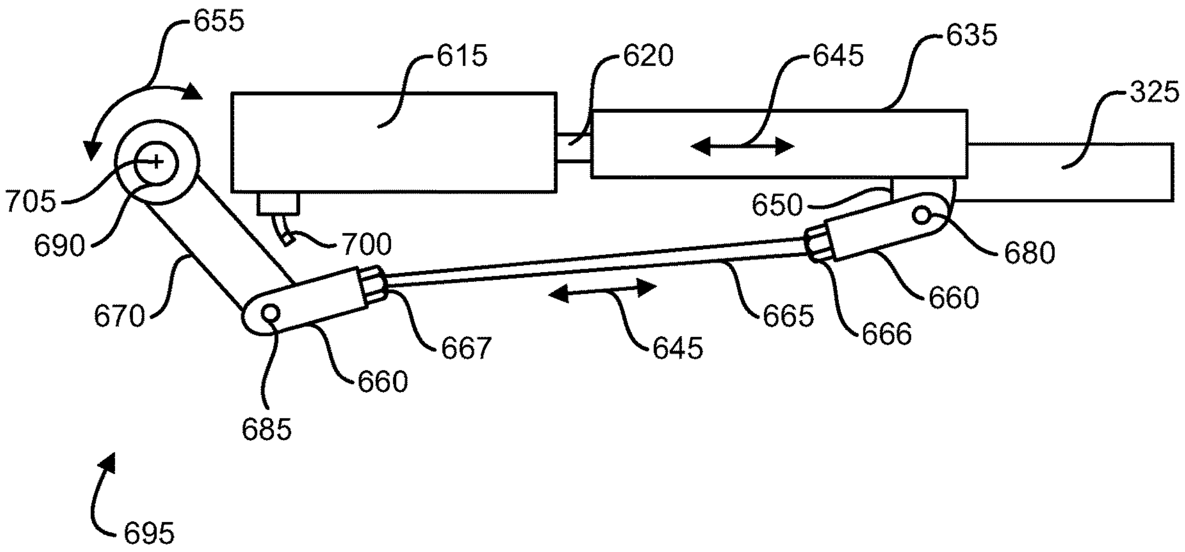

FIG. 31 shows view 31-31 from FIG. 10, wherein FIG. 31 is a top down view of the first alternative embodiment 500 of the creeper apparatus in the fold flat operational positional state 355 to primarily show the pump cylinder 615 and rod 620 receiving reciprocating movement 645 from the pivot arm 670 to the yoke 660 to the link 665 to the yoke 660 all originated at the pump handle 525, see also FIGS. 30 and 35.

Figure 32:
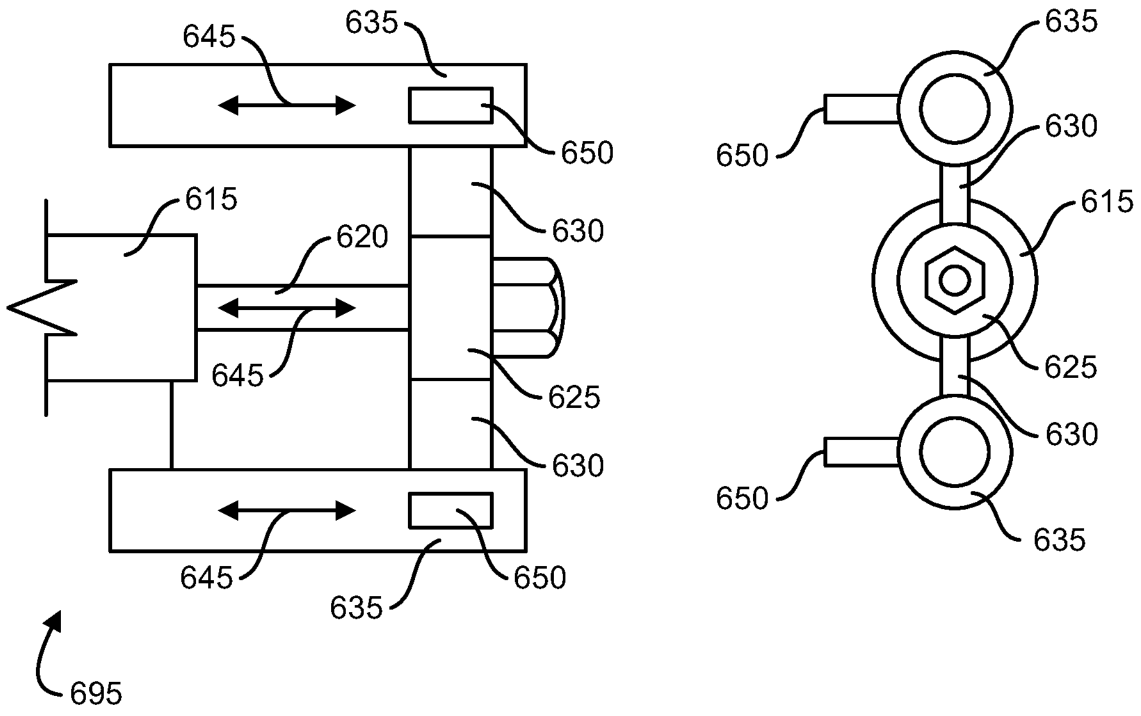

Further, FIG. 32 shows view 32-32 from FIG. 10, wherein FIG. 32 is a bottom up view of the first alternative embodiment 500 of the creeper apparatus in the fold flat operational positional state 355 (not shown) to show in particular including a top and end elevation view, the guide frame 635, extensions 630, and the retainer 625 of the rod 620 of the pump cylinder 615 that includes the yoke mounts 650 of the guide frames 635 and further the relation of the movement 645 of the guide frames 635, extensions 630, retainer 625 and rod 620 of the pump cylinder 615.

Figure 33:
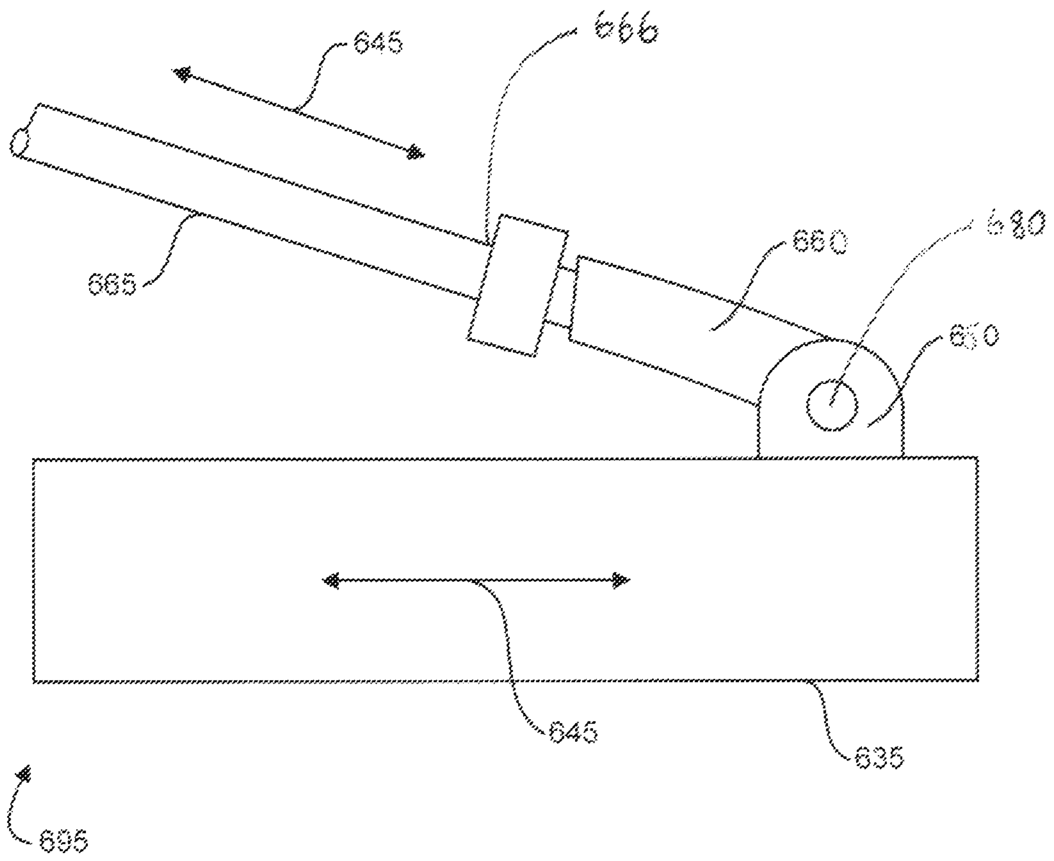
Figure 34:
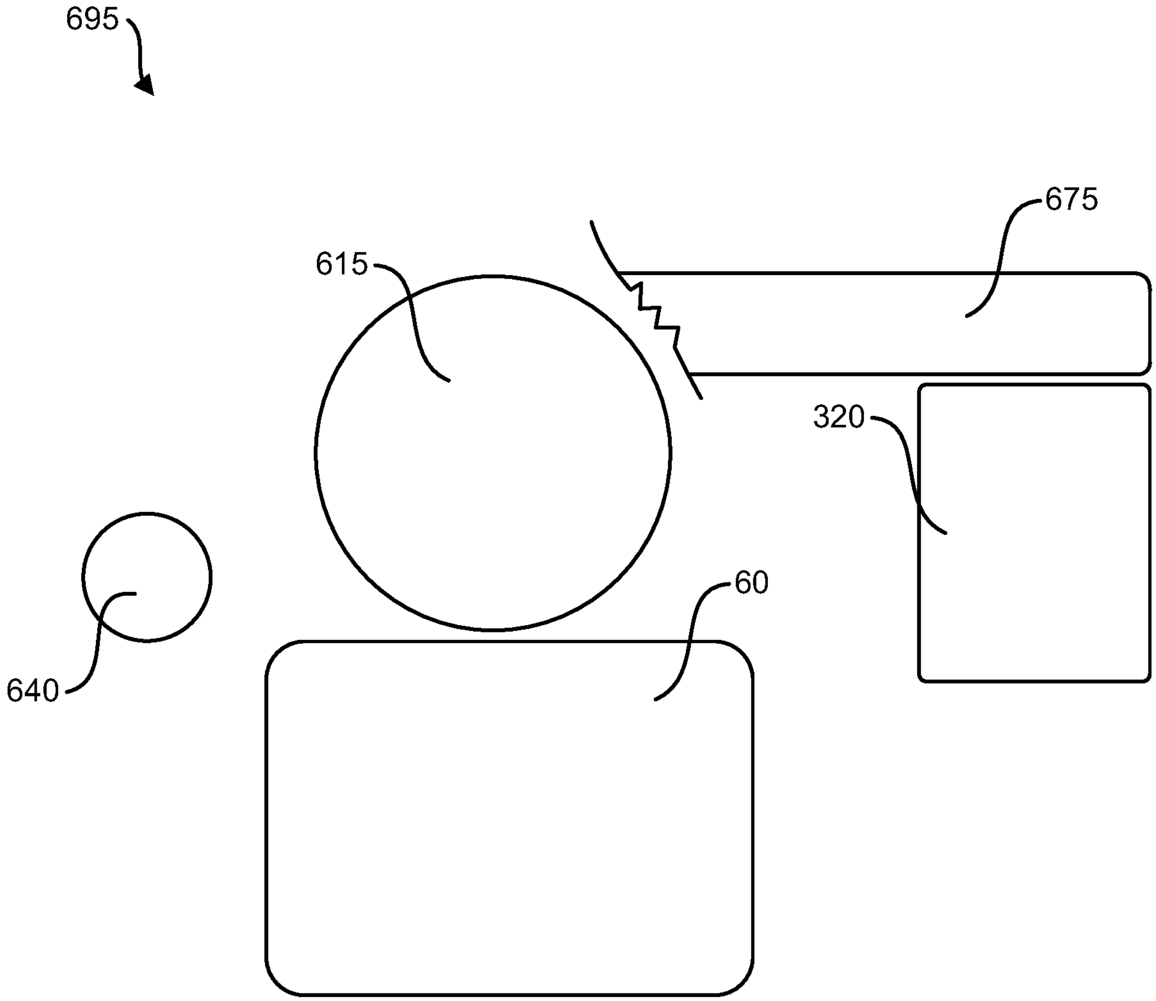

Also, FIG. 33 shows a side elevation view 33-33 from FIGS. 8 and 31, wherein FIG. 33 shows the detail of the guide frame 635, the yoke mount 650, the yoke 660, and the link 665 all moving 645 in unison to transmit reciprocating motion 645 from the pump handles 525 to the pump 615 (not shown) cylinder rod 620 (not shown);

Additionally, FIG. 34 shows view 34-34 from FIGS. 10 and 30, with the first caster 130 and roller slider assembly 510 removed for pictorial clarity, wherein FIG. 34 shows the positional arrangement of the guide rod 640, the pump cylinder 615, the beam 60, the arm 320, and the seat surface 675, with the first alternative embodiment 500 of the creeper apparatus in the fold flat operational positional state 355.

Continuing, FIG. 35 shows a side elevation view 35-35 from FIGS. 8 and 31, wherein FIG. 35 shows the detail of the rotational movement 655 of the pump handle 525, the pivot arm 670 of the pump handle 525, the yoke 660, the link 665, the yoke 660, the guide frame 635, the rod 620, and the pump cylinder 615, wherein reciprocating movement 645 is shown for all elements except the pump cylinder 615 and first end portion 325 of the arm 320.

Figure 36:
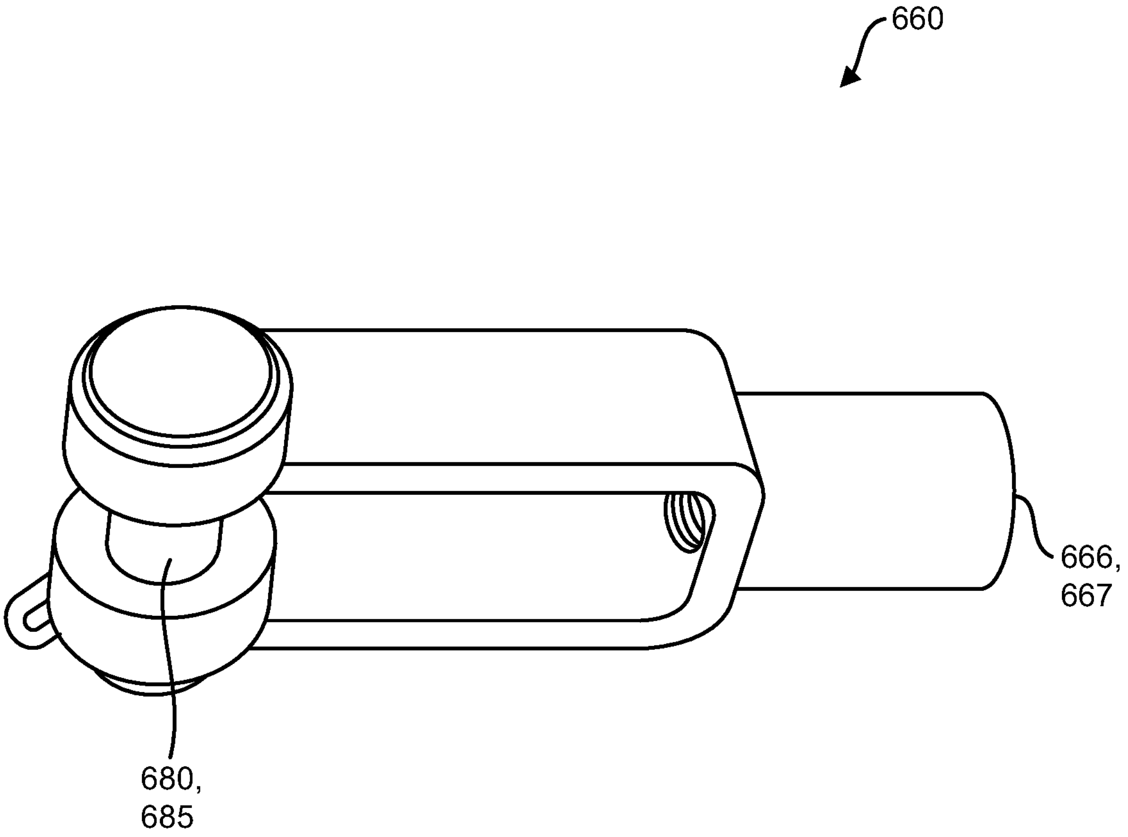
FIG. 36 shows an upper perspective view of the yoke for the guide frame (not shown)

Further, FIG. 36 shows an upper perspective view of the yoke 660 for the guide frame 635 (not shown).

Figure 37:
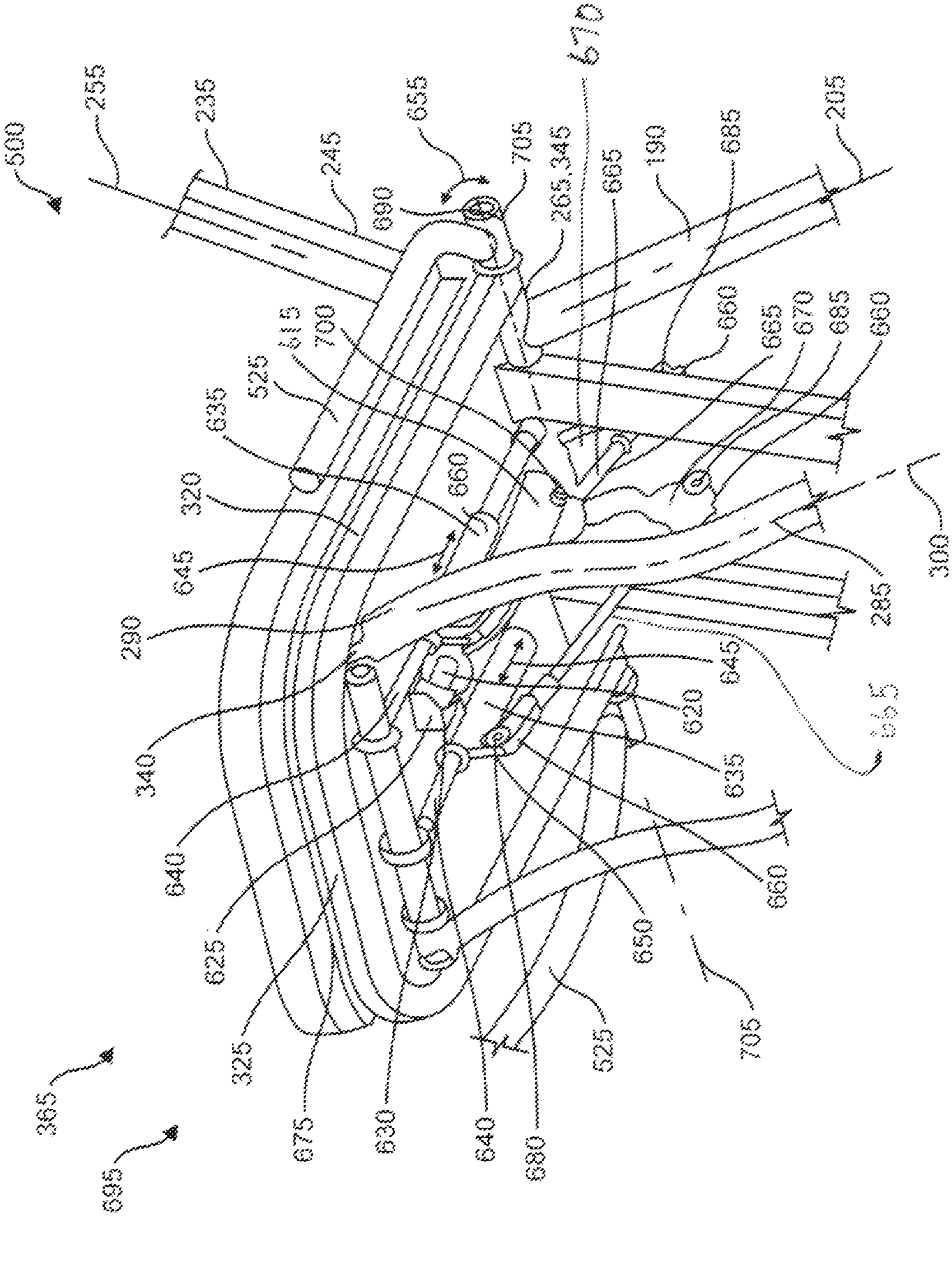
FIG. 37 shows a lower perspective view primarily of the remote means for generating fluid pressure as preferably mounted under the seat and arm of the first alternative embodiment of the creeper apparatus, further wherein positionally the twelfth pivotal attachment shares a common axis with the ninth pivotal attachment and the sixth pivotal attachment, the remote means for generating fluid pressure for the hydraulic lift cylinder is preferably constructed of a pump cylinder with a pump cylinder rod that is affixed to a retainer that has a pair of opposing extensions that each terminate into a separate guide frame, wherein each guide frame is slidably engaged to a guide rod forming a pair of guide rods, such that operationally the pump cylinder rod, the retainer, the extensions, and the guide frames all move in unison in reciprocating motion along the pair of fixed guide rods, each guide frame includes a yoke mount that has a tenth pivotal attachment to a yoke that is connected to a third link on a first end of the third link, wherein the third link has a second end that is connected to another yoke that has an eleventh pivotal attachment to a pivot arm, wherein the pivot arm has a twelfth pivotal attachment that extends to a pump handle, wherein operationally manual reciprocating movement of the pump handle translates to rotational movement at the twelfth pivotal attachment that further translates into the reciprocating motion to the pump cylinder rod to cause pumping in the pump cylinder that is in fluid communication with the lift cylinder (not shown) to ultimately facilitate the pump handle to manually control the lift cylinder (not shown)

Next, FIG. 37 shows a lower perspective view primarily of the remote means for generating fluid pressure 695 as preferably mounted under the seat 675 and arm 320 of the first alternative embodiment of the creeper apparatus 500, further wherein positionally the twelfth pivotal attachment 690 shares a common axis 705 with the ninth pivotal attachment 345 and the sixth pivotal attachment 265, the remote means for generating fluid pressure 695 for the hydraulic lift cylinder 520 is preferably constructed of a pump cylinder 615 with a pump cylinder rod 620 that is affixed to the retainer 625 that has the pair of opposing extensions 630 that each terminate into the separate guide frame 635, wherein each guide frame 635 is slidably engaged to the guide rod 640 forming the pair of guide rods 640, such that operationally the pump cylinder rod 620, the retainer 625, the extensions 630, and the guide frames 635 all move 645 in unison in reciprocating motion 645 along the pair of fixed guide rods 640. Each guide frame includes a yoke mount 650 that has a tenth pivotal attachment 680 to a yoke 660 that is connected to the third link 665 on a first end 666 of the third link 665, wherein the third link 665 has the second end 667 that is connected to another yoke 660 that has an eleventh pivotal attachment 685 to the pivot arm 670, wherein the pivot arm 670 has a twelfth pivotal attachment 690 that extends to the pump handle 525. Wherein operationally manual reciprocating movement of the pump handle 525 translates to rotational movement 655 at the twelfth pivotal attachment 690 that further translates into the reciprocating motion 645 to the pump cylinder 615 rod 620 to cause pumping in the pump cylinder 615 that is in fluid communication 700 with the lift cylinder 520 (not shown) to ultimately facilitate the pump handle 525 to manually control the lift cylinder 520 (not shown).

Figure 38:
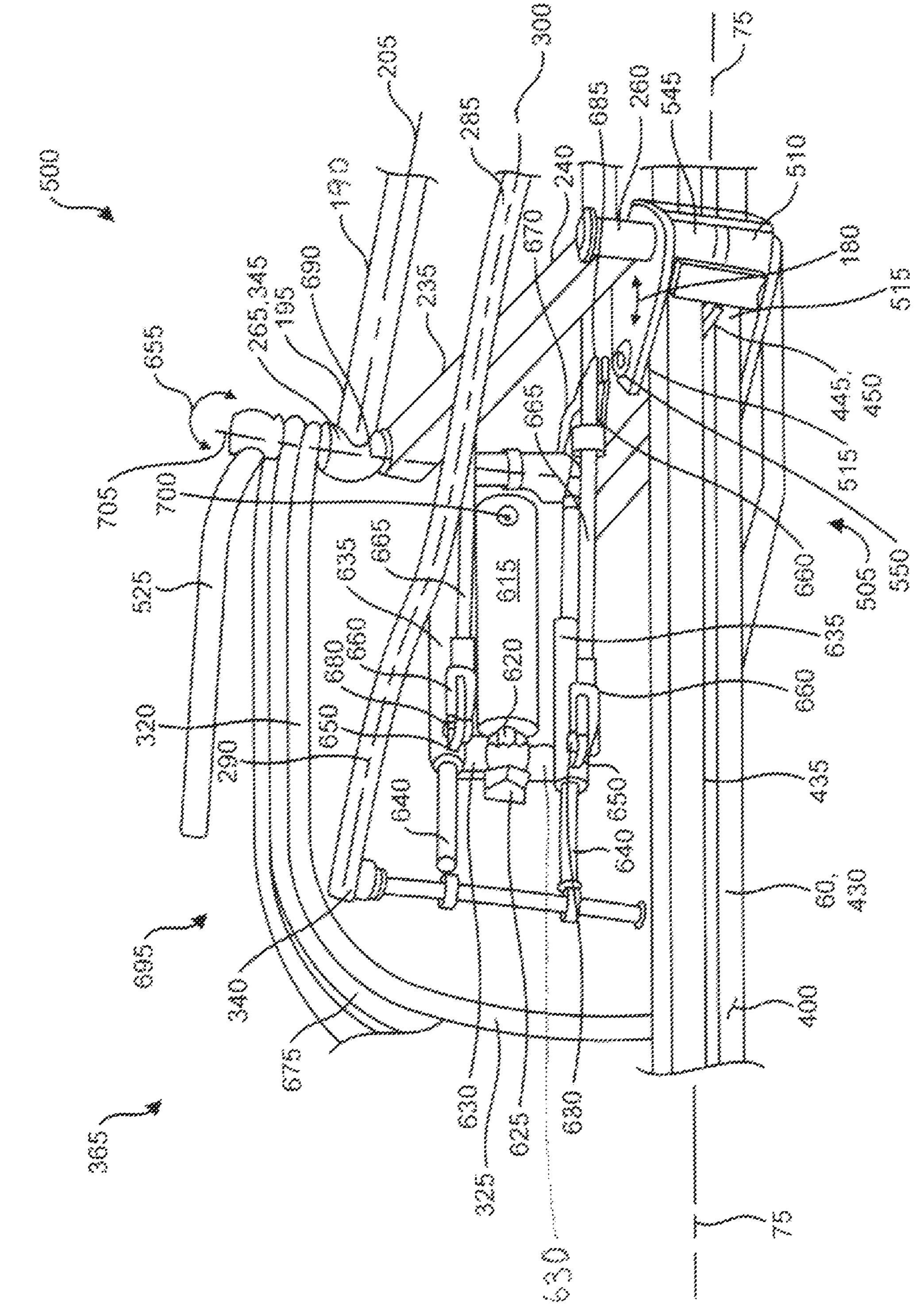
FIG. 38 shows a bottom perspective view primarily of the remote means for generating fluid pressure as preferably mounted under the seat and arm of the first alternative embodiment of the creeper apparatus, further wherein positionally the twelfth pivotal attachment shares a common axis with the ninth pivotal attachment and the sixth pivotal attachment, the remote means for generating fluid pressure for the hydraulic lift cylinder is preferably constructed of a pump cylinder with a pump cylinder rod that is affixed to a retainer that has a pair of opposing extensions that each terminate into a separate guide frame, wherein each guide frame is slidably engaged to a guide rod forming a pair of guide rods, such that operationally the pump cylinder rod, the retainer, the extensions, and the guide frames all move in unison in reciprocating motion along the pair of fixed guide rods, each guide frame includes a yoke mount that has a tenth pivotal attachment to a yoke that is connected to a third link on a first end of the third link, wherein the third link has a second end that is connected to another yoke that has an eleventh pivotal attachment to a pivot arm, wherein the pivot arm has a twelfth pivotal attachment that extends to a pump handle, wherein operationally manual reciprocating movement of the pump handle translates to rotational movement at the twelfth pivotal attachment that further translates into the reciprocating motion to the pump cylinder rod to cause pumping in the pump cylinder that is in fluid communication with the lift cylinder (not shown) to ultimately facilitate the pump handle to manually control the lift cylinder (not shown), also shown is the beam, the beam slot, the beam outer surface, the slider roller assembly, and the inward extension of the roller slider assembly.

Further, FIG. 38 shows a lower perspective view primarily of the remote means for generating fluid pressure 695 as preferably mounted under the seat 675 and arm 320 of the first alternative embodiment of the creeper apparatus 500, further wherein positionally the twelfth pivotal attachment 690 shares a common axis 705 with the ninth pivotal attachment 345 and the sixth pivotal attachment 265, the remote means for generating fluid pressure 695 for the hydraulic lift cylinder 520 is preferably constructed of a pump cylinder 615 with a pump cylinder rod 620 that is affixed to the retainer 625 that has the pair of opposing extensions 630 that each terminate into the separate guide frame 635. Wherein each guide frame 635 is slidably engaged to the guide rod 640 forming the pair of guide rods 640, such that operationally the pump cylinder rod 620, the retainer 625, the extensions 630, and the guide frames 635 all move 645 in unison in reciprocating motion 645 along the pair of fixed guide rods 640, each guide frame includes a yoke mount 650 that has a tenth pivotal attachment 680 to a yoke 660 that is connected to the third link 665 on a first end 666 of the third link 665. Wherein the third link 665 has the second end 667 that is connected to another yoke 660 that has an eleventh pivotal attachment 685 to the pivot arm 670, wherein the pivot arm 670 has a twelfth pivotal attachment 690 that extends to the pump handle 525. Wherein operationally manual reciprocating movement of the pump handle 525 translates to rotational movement 655 at the twelfth pivotal attachment 690 that further translates into the reciprocating motion 645 to the pump cylinder 615 rod 620 to cause pumping in the pump cylinder 615 that is in fluid communication 700 with the lift cylinder 520 (not shown) to ultimately facilitate the pump handle 525 to manually control the lift cylinder 520 (not shown), also shown is the beam 60, the beam 60 slot 435, the beam 60 outer surface 400, the slider roller assembly 510, and the inward extension 445 of the roller slider assembly 510.

Figure 39:
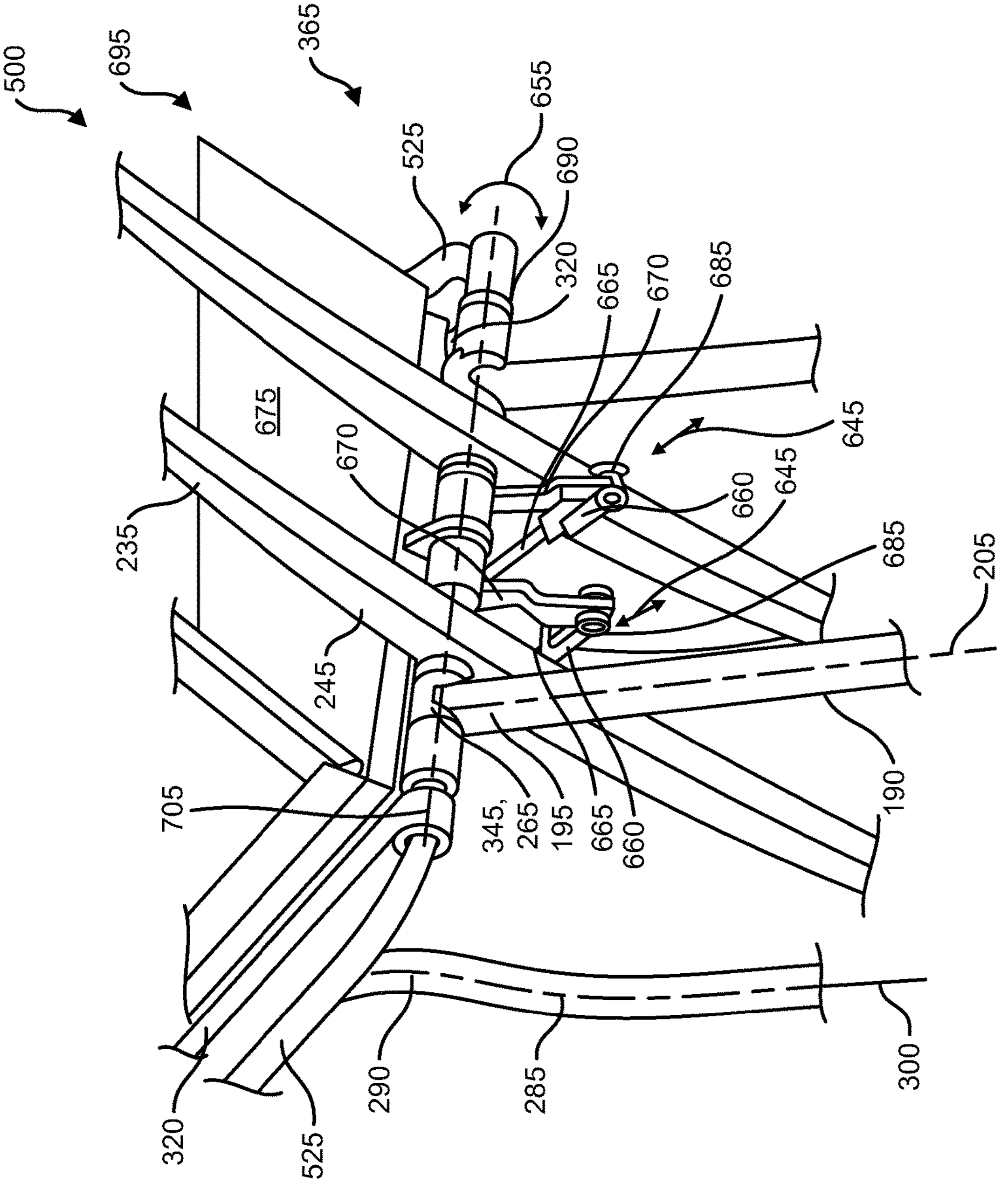
FIG. 39 shows a lower perspective view primarily of a portion of the remote means for generating fluid pressure as preferably mounted under the seat and arm of the first alternative embodiment of the creeper apparatus, further wherein positionally the twelfth pivotal attachment shares a common axis with the ninth pivotal attachment and the sixth pivotal attachment, the remote means for generating fluid pressure for the hydraulic lift cylinder shows in this FIG. 39 the third link the has a second end that is connected to another yoke that has an eleventh pivotal attachment to a pivot arm, wherein the pivot arm has a twelfth pivotal attachment that extends to the pump handle, wherein operationally manual reciprocating movement of the pump handle translates to rotational movement at the twelfth pivotal attachment that further translates into the reciprocating motion to the following not shown; pump cylinder rod to cause pumping in the pump cylinder that is in fluid communication with the lift cylinder to ultimately facilitate said pump handle to manually control said lift cylinder.

In addition, FIG. 39 shows a lower perspective view primarily of a portion of the remote means for generating fluid pressure 695 as preferably mounted under the seat 675 and arm 320 of the first alternative embodiment 500 of the creeper apparatus, further wherein positionally the twelfth pivotal attachment 690 shares a common axis 705 with the ninth pivotal attachment 345 and the sixth pivotal attachment 265, the remote means for generating fluid pressure 695 for the hydraulic lift cylinder 615 shows in this FIG. 39 the third link 665 that has a second end 667 that is connected to another yoke 660 that has an eleventh pivotal attachment 685 to the pivot arm 670, wherein the pivot arm 670 has a twelfth pivotal attachment 690 that extends to the pump handle 525. Wherein operationally, the manual reciprocating movement of the pump handle 525 translates to rotational movement 655 at the twelfth pivotal attachment 690 that further translates into the reciprocating motion 645 to the following not shown; pump cylinder 625 rod 620 to cause pumping in the pump cylinder 615 that is in fluid communication 700 with the lift cylinder 520 to ultimately facilitate the pump handle 525 to manually control the lift cylinder 520.

Broadly, in looking at FIGS. 1 to 7, the present invention is the creeper apparatus 50 that includes the base structure 55 that includes the beam 60 having the beam distal end portion 65 and an opposing beam proximal end portion 70 with the longitudinal axis 75 spanning therebetween, further the base structure 55 has a first extension 80 with the first proximal end portion 85 and the opposing first distal end portion 90 with the lengthwise axis 95 spanning therebetween, see FIGS. 1, 2, 3, and 6.

Wherein the first proximal end portion 85 extends from the beam proximal end portion 70 and a second extension 100 with a second proximal end portion 105 and an opposing second distal end portion 110 with the longwise axis 115 spanning therebetween, wherein the second proximal end portion 105 extends from the beam proximal end portion 70, wherein positionally the lengthwise axis 95 and the longwise axis 115 are oppositely positioned 120 to one another about the longitudinal axis 75 and the longitudinal 75, the lengthwise 95, and the longwise 115 axes are all positioned within the first plane 125, see FIGS. 1, 2, and 6.

Further included in the creeper apparatus 50, is a first caster wheel 130 having a first pivotal disposition 135 on the beam 60 distal end portion 65, a second caster wheel 140 having a second pivotal disposition 145 on the first distal end portion 90, and a third caster wheel 150 having a third pivotal disposition 155 on the second distal end portion 110, wherein operationally the first 130, second 140, and third 150 caster wheels enable the base structure 55 to omnidirectionally ambulate 165 along a surface 160, see in particular FIGS. 1, 2, 3, and 6.

Additionally included in the creeper apparatus 50, is a sleeve element 170 that is slidably engaged 175 along the longitudinal axis 75 to the beam 60 between the beam proximal 70 and beam distal end 65 portions, the sleeve element 170 having reciprocating movement 180 as between the beam proximal 70 and beam distal 65 end portions and the means 185 for imparting the reciprocating movement 180 in the sleeve element 170, see in particular FIGS. 4, 5, and 7, plus FIGS. 1, 2, and 3.

Plus the creeper apparatus 50, includes a first link member 190 having a first link first end portion 195 and an opposing first link second end portion 200 with a first link axis 205 therebetween, wherein the first link 190 second end portion 200 has a fourth pivotal attachment 210 to the first distal end portion 90, wherein the first link member 190 having a first link pivotal movement 225 in a second plane 215 perpendicular 220 to the first plane 125, and forming a range of acute angles 230 as between the first link axis 205 and the lengthwise axis 95, see FIGS. 1, 2, 3, and 6.

Also included the creeper apparatus 50, is a frame member 235 having a frame member primary end portion 240, a frame member mid-portion 245, and a frame member secondary end portion 250, with a frame member axis 255 spanning therebetween, wherein the frame member primary end portion 240 has a fifth pivotal attachment 260 to the sleeve element 170, further the frame member mid-portion 245 has a sixth pivotal attachment 265 to the first link first end portion 195. The frame member 235 having a frame member first pivotal movement 270 as between the frame member mid-portion 245 and the frame member secondary end portion 250 in the second plane 215, further the frame member 235 having a frame member second pivotal movement 275 as between the frame member primary end portion 240 and the frame member mid-portion 245 in the second plane 215, wherein the frame member first pivotal movement 270 is opposite 280 of the frame member second pivotal movement 275, see FIGS. 1 and 2.

Further included in the creeper apparatus 50, is a second link member 285 having a second link first end portion 290 and an opposing second link second end portion 295, with a second link axis 300 therebetween, wherein the second link second end portion 295 has a seventh pivotal attachment 305 to the first proximal end portion 85, wherein the second link member 285 having a second link pivotal movement 310 in the second plane 215 perpendicular 220 to the first plane 125 and forming a range of acute angles 315 as between the second link axis 300 and the longitudinal axis 75, again see FIGS. 1, 2, 3, and 6.

Continuing, for the creeper apparatus 50, included is an arm 320 having an arm first end portion 325 and an opposing arm second end portion 330 with an arm axis 335 spanning therebetween, wherein the arm first end portion 325 has an eighth pivotal attachment 340 to the second link first end portion 290 and the arm second end portion 330 has a ninth pivotal attachment 345 to the frame member mid-portion 245 in conjunction with the first link first end portion 195, the arm axis 335 stays substantially parallel 350 to the longitudinal axis 75 during the sleeve element 170 reciprocating movement 180.

Wherein operationally, the creeper apparatus 50 has a fold flat starting operational state 355 when the arm axis 335 and the frame axis 255 is juxtapose 360 to the beam 60 longitudinal axis 75 when the sleeve element 170 is at the beam distal end portion 65 and proceeding to a substantially upright terminal positional state 365 defined 380 by the frame member axis 255 being substantially perpendicular 375 to the longitudinal axis 75 and the arm axis 335 is at a maximum arm distance 370 from the beam 60 longitudinal axis 75 when the sleeve element 170 is at the beam 60 proximal end portion 70. Thus, resulting in a range of selectable arm axis 335 distances 385 from the beam 60 longitudinal axis 75 and a selectable range of the frame member axis 255 angles to the beam 60 longitudinal axis 75 as between the fold flat starting operational state 355 and the substantially upright terminal positional state 365, see FIGS. 1, 2, 3, and 6.

As an option for the creeper apparatus 50, wherein the sleeve element 170 is preferably constructed of an annular cross section 390 having an inner surface 395 that slidably engages 405 an outer surface 400 of the beam 60, wherein the annular cross section 390 is perpendicular 410 to the beam longitudinal axis 75, further the beam 60 is also an annular cross section 415 including a beam 60 inner surface 420 that defines a beam 60 void 425 along the beam 60 longitudinal axis 75 resulting in the beam 60 having a beam 60 surrounding sidewall 430.

In addition the beam 60 surrounding sidewall 430 has an extended slot 435 therethrough the beam 60 surrounding sidewall 430, wherein the extended slot 435 is parallel 440 to the beam 60 longitudinal axis 75, the sleeve element 170 inner surface 395 further includes a sleeve element inward extension 445 that is disposed 450 through the beam 60 slot

435 with the sleeve element 170 inward extension 445 proceeding 450 into the beam 60 void 425, with the sleeve element 170 inward extension 445 terminating in a threaded aperture 455 having a thread axial axis 460 that is parallel 465 to the beam 60 longitudinal axis 75, see in particular FIGS. 4, 5, and 7.

A further option for the creeper apparatus 50, is wherein the means 185 for imparting the reciprocating movement 180 in the sleeve element 170 is preferably constructed of a threaded rod 470 that is threadably engaged 475 to the threaded aperture 455, the threaded rod 470 has a threaded rod span axis 480 that is coincident 485 to the thread axial axis 460 and parallel to the beam 60 longitudinal axis 75.

Wherein operationally, a reversable rotation 490 of the threaded rod 470 about the threaded rod span axis 480 results in the sleeve element 170 reciprocating movement 180, wherein the reversable rotation 490 of the threaded rod 470 is created by a means 495 for imparting the reversable rotation 490 of the threaded rod 470, further operationally a ceasing of a rotation 490 of the threaded rod 470 results in the sleeve element 170 locking its slidable engagement 175, 405 position as between the beam 60 proximal 70 and distal 65 positions, see in particular FIGS. 4, 5, and 7, plus FIGS. 1, 2, and 3. The means 495 can be constructed of an electric motor, a hydraulic motor, an air motor, or any other suitable equivalent.

For the first alternative embodiment 500 of the creeper apparatus, see FIGS. 8 to 11 and FIGS. 16 to 39, the sleeve element 170 can be a roller slider assembly 510 that is constructed of an annular cross section having two side plates 565 and a top plate 570, the beam 60 is also constructed of an annular cross section 390 having an outer surface 400 and an opposing inner surface 420, wherein the inner surface 420 defines a beam void 425 that is along the beam 60 longitudinal axis 75 resulting in the beam 60 having a beam 60 surrounding sidewall 430, in addition the beam 60 surrounding sidewall 430 has an extended slot 435 therethrough the beam 60 surrounding sidewall 430, wherein the extended slot 435 is parallel 440 to the beam 60 longitudinal axis 75. Wherein the beam 60 annular cross section 390 is perpendicular 410 to the beam 60 longitudinal axis 75, see in particular FIGS. 20, 21, and 23. The roller slider assembly 510 side plates 565 include an upper roller slider 550 and a lower roller slider 545, wherein the upper 550 and lower 545 roller slides each have a roller interface 515, 551, 546 with the outer surface 400 of the beam 60, the roller slider assembly 510 lower roller slider 545 further includes an inward extension 445 that is disposed through the beam 60 slot 435 with the lower roller slider 545 inward extension 445 proceeding 450 into the beam 60 void 425, with the lower roller slider 545 inward extension 445 terminating in a dynamic leaf chain anchor 560 that projects into and is disposed within the beam 60 void 425, further the fifth pivotal attachment 260 is pivotally attached to the lower roller slider 545, see FIGS. 8 to 11, 16, 17, and FIGS. 20 to 23.

Further on the first alternative embodiment 500 of the creeper apparatus the means for imparting reciprocating movement in the roller slider assembly 510 is preferably constructed of a snatch block arrangement that includes a first caster mount 590 that extends into the beam 60 void 425 with a static leaf chain anchor 595 and a clevis 575 also disposed within the beam 60 void 425, wherein the clevis 575 includes a clevis block end 577 that is affixed to a rod 521 of a hydraulic lift cylinder 520 that utilizes a remote means 695 for generating fluid pressure for the hydraulic lift cylinder 520, further the clevis 575 has an opposing roller 580 disposed opposite of the clevis 575 block end 577, a leaf chain segment 555 having two free ends is attached to each of the dynamic leaf chain anchor 560 and to the static leaf chain anchor 595 wherein further the leaf chain 555 between the two free ends is looped about the clevis 575 roller 580, wherein the static leaf chain anchor 595, the dynamic leaf chain anchor 560, the leaf chain 555, and the clevis 575 are all disposed within the beam 60 void 425, see in particular FIG. 22, plus FIGS. 20, 21, and 23 to 26. Wherein operationally, a reciprocating movement 180 of the hydraulic lift cylinder 520 rod 521 that is imparted to the clevis 575 causes the leaf chain 555 to rotate about the clevis 575 roller 580 and by the nature of the static 595 and dynamic 560 leaf chain anchors, wherein the dynamic leaf chain anchor 560 with have movement along the beam 60 longitudinal axis 75 thus resulting in the roller slider assembly 510 having reciprocating movement 180 along the beam 60 longitudinal axis 75, further operationally a ceasing of a reciprocating movement 180 of the hydraulic lift cylinder 520 rod 521 results in the roller slider assembly 510 locking its slidable engagement 515 position as between the beam 60 proximal 70 and distal 65 positions, again see in particular FIG. 22, plus FIGS. 8 to 11, 20, 21, and 23 to 26.

Continuing on the first alternative embodiment 500 of the creeper apparatus, wherein the remote means for generating fluid pressure 695 for the hydraulic lift cylinder 520 is preferably constructed of a pump cylinder 615 with a pump cylinder 615 rod 620 that is affixed to a retainer 625 that has a pair of opposing extensions 630 that each terminate into a separate guide frame 635, wherein each guide frame 635 is slidably engaged to a guide rod 640 forming a pair of guide rods 640, see FIG. 8, and FIGS. 29 to 39. Operationally, the pump cylinder 615 rod 620, the retainer 625, the extensions 630, and the guide frames 635 all move 645 in unison in reciprocating motion 645 along the pair of fixed guide rods 640, each guide frame 635 includes a yoke mount 650 that has a tenth pivotal attachment 680 to a yoke 660 that is connected to a third link 665 on a first end 666 of the third link 665, wherein the third link 665 has a second end 667 that is connected to another yoke 660 that has an eleventh pivotal attachment 685 to a pivot arm 670, wherein the pivot arm 670 has a twelfth pivotal attachment 690 that extends to a pump handle 525, see in particular FIGS. 30, 35, and FIGS. 37 to 39. Wherein operationally, manual reciprocating movement 656 of the pump handle 525 translates to rotational movement 655 at the twelfth pivotal attachment 690 that further translates into the reciprocating motion 645 to the pump cylinder 615 rod 620 to pump the pump cylinder 615 that is in fluid communication with the lift cylinder 520 to ultimately facilitate the pump handle 525 to manually control the lift cylinder 520.

Continuing on the first alternative embodiment 500 of the creeper apparatus, wherein the remote means for generating fluid pressure 695 for the hydraulic lift cylinder 520 is preferably positionally disposed and mounted within the arm 320, wherein the arm 320 supports a seat surface 675 with the remote means for generating fluid pressure 695 for the hydraulic lift cylinder 520 being disposed underneath the seat surface 675, further wherein positionally the twelfth pivotal attachment 690 shares a common axis 705 with the ninth pivotal attachment 345 and the sixth pivotal attachment 265, see FIGS. 8 and FIGS. 29 to 39.

Continuing on the first alternative embodiment 500 of the creeper apparatus, it can further comprise a locking spring plunger 530 that is disposed within and therethrough the top plate 570 of the roller slider assembly 510, the locking spring plunger 530 also includes an extension 533 that has a selectable retracted state 532 and a selectable extended state 531, the beam 60 surrounding sidewall 430 further includes an aperture 61 that is disposed therethrough the beam 60 surrounding sidewall 430, wherein the beam 60 aperture 61 is positioned to receive the locking spring plunger 530 extension 533 in the extended state 531 to operationally lock the roller slider assembly 510 along the beam 60 against movement along the beam 60 longitudinal axis 75 to ultimately lock the seat surface 675 a selected height above the surface 160, see FIGS. 16 to 21, plus FIGS. 23, 28, and 29.

Continuing on the second alternative embodiment 535 of the creeper apparatus in referencing FIGS. 12 to 15 and FIGS. 16 to 21, 23, and 28, wherein the second alternative embodiment 535 of the creeper apparatus is the first alternative embodiment 500 of the creeper apparatus minus the pump cylinder 615 and the lift cylinder 520 and all the aforementioned elements associated with the pump cylinder 615 and the lift cylinder 520, thus a user of the second alternative embodiment 535 of the creeper apparatus manually lifts and lowers the second alternative embodiment 535 of the creeper apparatus being from and to the fold flat operational state 355 to the upright position state 365 and vis versa, while manually using the locking spring plunger 530 on the roller slider assembly 510 to lock the roller slider assembly 510 to the beam 60 along the longitudinal axis 75 to subsequently lock the seat surface 675 a manually selected height above the surface 160. The roller slider assembly 510 is preferably constructed of an annular cross section having two side plates 565 and a top plate 570, the roller slider assembly 510 side plates 565 include an upper roller slider 550 and a lower roller slider 545, wherein the upper 550 and lower 545 roller slides each have a roller interface 515, 546, 551 with the outer surface 400 of the beam 60, the roller slider assembly 510 further comprising a locking spring plunger 530 that is disposed within and therethrough the top plate 570 of the roller slider assembly 510, the locking spring plunger 530 also includes an extension 533 that has a selectable retracted state 532 and a selectable extended state 531, wherein the beam 60 aperture 61 is positioned to receive the locking spring plunger 530 extension 533 in the extended state 531 to operationally lock the roller slider assembly 510 along the beam 60 against movement 180 along the beam 60 longitudinal axis 75. Note that for the second alternative embodiment 535 of the creeper apparatus, the roller slider assembly 510 does not have the dynamic leaf chain anchor nor the inward extension 445 and further the beam does not have the slot 435.

Continuing on the second alternative embodiment 535 of the creeper apparatus, it preferably includes an arm 320 having an arm 320 first end portion 325 and an opposing arm second end portion 330 with an arm 320 axis 335 spanning therebetween, the arm 320 having a seat surface 675 disposed on top of the arm 320, wherein the arm 320 first end portion 325 has an eighth pivotal attachment 340 to the second link 285 first end portion 290 and the arm 320 second end portion 330 has a ninth pivotal attachment 345 to the frame member 235 mid-portion 245 in conjunction with the first link 190 first end portion 195, the arm axis 335 stays substantially parallel 350 to the longitudinal axis 75 during the roller slider assembly 510 reciprocating movement 180, see FIGS. 12 to 15. Wherein operationally, the second alternative embodiment 535 of the creeper apparatus has a fold flat starting operational state 355 when the arm 320 axis 335 and the frame member axis 255 is juxtapose to the beam 60 longitudinal axis 75 when the roller slider assembly 510 is at the beam 60 distal end portion 65 and selectably manually proceeding to a substantially upright terminal positional state 365 defined by the frame member axis 255 being substantially perpendicular 375 to the longitudinal axis 75 and the arm axis 335 is at a maximum arm distance 370 from the beam 60 longitudinal axis 75 when the roller slider assembly 510 is at the beam 60 proximal end portion 70, thus resulting in a range of manually selectable arm axis 335 distances 370 from the beam 60 longitudinal axis 75 and a manually selectable range of the frame member axis 255 angles 385 to the beam 60 longitudinal axis 75 as between the fold flat starting operational state 355 and the substantially upright terminal positional state 365. Wherein further operationally, the locking spring plunger 530 extension 533 in the extended state 531 that operationally locks the roller slider assembly 510 along the beam 60 against movement along the beam 60 longitudinal axis 75 results in ultimately manually locking the seat surface 675 at a selected height above the surface 160, see FIGS. 12 to 15 and FIGS. 16 to 21, 23, and 28.

CONCLUSION

Accordingly, the present invention of a creeper apparatus has been described with some degree of particularity directed to the embodiments of the present invention. It should be appreciated, though; that the present invention is defined by the following claims construed in light of the prior art so modifications or changes may be made to the exemplary embodiments of the present invention without departing from the inventive concepts contained therein.

The invention claimed is:

1. A creeper apparatus comprising:

(a) a base structure that includes a beam having a beam distal end portion and an opposing beam proximal end portion with a longitudinal axis spanning therebetween, further said base structure has a first extension with a first proximal end portion and an opposing first distal end portion with a lengthwise axis spanning therebetween, wherein said first proximal end portion extends from said beam proximal end portion and a second extension with a second proximal end portion and an opposing second distal end portion with a longwise axis spanning therebetween, wherein said second proximal end portion extends from said beam proximal end portion, wherein positionally said lengthwise axis and said longwise axis are oppositely positioned to one another about said longitudinal axis and said longitudinal, lengthwise, and longwise axes are all positioned within a first plane;

(b) a first caster wheel having a first pivotal disposition on said beam distal end portion;

(c) a second caster wheel having a second pivotal disposition on said first distal end portion;

(d) a third caster wheel having a third pivotal disposition on said second distal end portion, wherein operationally said first, second, and third caster wheels enable said base structure to omnidirectionally ambulate along a surface;

(e) a sleeve element that is slidably engaged along said longitudinal axis to said beam between said beam proximal and beam distal end portions, said sleeve element having reciprocating movement as between said beam proximal and beam distal end portions;

(f) a means for imparting said reciprocating movement in said sleeve element;

(g) a first link member having a first link first end portion and an opposing first link second end portion with a first link axis therebetween, wherein said first link second end portion has a fourth pivotal attachment to said first distal end portion, wherein said first link member having a first link pivotal movement in a second plane perpendicular to said first plane and forming a range of acute angles as between said first link axis and said lengthwise axis;

(h) a frame member having a frame member primary end portion, a frame member mid-portion, and a frame member secondary end portion, with a frame member axis spanning therebetween, wherein said frame member primary end portion has a fifth pivotal attachment to said sleeve element, further said frame member mid-portion has a sixth pivotal attachment to said first link first end portion, said frame member having a frame member first pivotal movement as between said frame member mid-portion and said frame member secondary end portion in said second plane, further said frame member having a frame member second pivotal movement as between said frame member primary end portion and said frame member mid-portion in said second plane, wherein said frame member first pivotal movement is opposite of said frame member second pivotal movement;

(i) a second link member having a second link first end portion and an opposing second link second end portion with a second link axis therebetween, wherein said second link second end portion has a seventh pivotal attachment to said first proximal end portion, wherein said second link member having a second link pivotal movement in said second plane perpendicular to said first plane and forming a range of acute angles as between said second link axis and said longitudinal axis; and (j) an arm having an arm first end portion and an opposing arm second end portion with an arm axis spanning therebetween, wherein said arm first end portion has an eighth pivotal attachment to said second link first end portion and said arm second end portion has a ninth pivotal attachment to said frame member mid-portion in conjunction with said first link first end portion, said arm axis stays substantially parallel to said longitudinal axis during said sleeve element reciprocating movement, wherein operationally said creeper apparatus has a fold flat starting operational state when said arm axis and said frame axis is juxtapose to said beam longitudinal axis when said sleeve element is at said beam distal end portion and proceeding to a substantially upright terminal positional state defined by said frame member axis being substantially perpendicular to said longitudinal axis and said arm axis is at a maximum arm distance from said beam longitudinal axis when said sleeve element is at said beam proximal end portion, thus resulting in a range of selectable arm axis distances from said beam longitudinal axis and a selectable range of said frame member axis angles to said beam longitudinal axis as between said fold flat starting operational state and said substantially upright terminal positional state.

2. A creeper apparatus according to claim 1 wherein said sleeve element is constructed of an annular cross section having an inner surface that slidably engages an outer surface of said beam, wherein said annular cross section is perpendicular to said beam longitudinal axis, further said beam is also an annular cross section including a beam inner surface that defines a beam void along said beam longitudinal axis resulting in said beam having a beam surrounding sidewall, in addition said beam surrounding sidewall has an extended slot therethrough said beam surrounding sidewall, wherein said extended slot is parallel to said beam longitudinal axis, said sleeve element inner surface further includes a sleeve element inward extension that is disposed through said beam slot with said sleeve element inward extension proceeding into said beam void, with said sleeve element inward extension terminating in a threaded aperture having a thread axial axis that is parallel to said longitudinal axis.

3. A creeper apparatus according to claim 2 wherein said means for imparting said reciprocating movement in said sleeve element is constructed of a threaded rod that is threadably engaged to said threaded aperture, said threaded rod has a thread rod span axis that is coincident to said thread axial axis and parallel to said beam longitudinal axis, wherein operationally a reversable rotation of said threaded rod about said thread rod span axis results in said sleeve element reciprocating movement, wherein said reversable rotation of said threaded rod is created by a means for imparting said reversable rotation of said threaded rod, further operationally a ceasing of a rotation of said threaded rod results in said sleeve element locking its slidable engagement position as between said beam proximal and distal positions.

4. A creeper apparatus according to claim 1 wherein said sleeve element is a roller slider assembly that is constructed of an annular cross section having two side plates and a top plate, said beam is also constructed of an annular cross section having an outer surface and an opposing inner surface, wherein said inner surface defines a beam void that is along said beam longitudinal axis resulting in said beam having a beam surrounding sidewall, in addition said beam surrounding sidewall has an extended slot therethrough said beam surrounding sidewall, wherein said extended slot is parallel to said beam longitudinal axis, wherein said beam annular cross section is perpendicular to said beam longitudinal axis, said roller slider assembly side plates include an upper roller slider and a lower roller slider, wherein said upper and lower roller slides each have a roller interface with said outer surface of said beam, said roller slider assembly lower roller slider further includes an inward extension that is disposed through said beam slot with said lower roller slider inward extension proceeding into said beam void, with said lower roller slider inward extension terminating in a dynamic leaf chain anchor that projects into and is disposed within said beam void, said fifth pivotal attachment is pivotally attached to said lower roller slider.

5. A creeper apparatus according to claim 4 wherein said means for imparting said reciprocating movement in said roller slider assembly is constructed of a snatch block arrangement that includes a first caster mount that extends into said beam void with a static leaf chain anchor and a clevis also disposed within said beam void, wherein said clevis includes a clevis block end that is affixed to a rod of a hydraulic lift cylinder that utilizes a remote means for generating fluid pressure for said hydraulic lift cylinder, further said clevis has an opposing roller disposed opposite of said clevis block end, a leaf chain segment having two free ends is attached to each of said dynamic leaf chain anchor and to said static leaf chain anchor wherein further said leaf chain between said two free ends is looped about said clevis roller, wherein said static leaf chain anchor, said dynamic leaf chain anchor, said leaf chain, and said clevis are all disposed within said beam void, wherein operationally a reciprocating movement of said hydraulic lift cylinder rod that is imparted to said clevis causes said leaf chain to rotate about said clevis roller and by the nature of said static and dynamic leaf chain anchors, wherein said dynamic leaf chain anchor with have movement along said beam longitudinal axis thus resulting in said roller slider assembly having reciprocating movement along said beam longitudinal axis, further operationally a ceasing of a reciprocating movement of said hydraulic lift cylinder rod results in said roller slider assembly locking its slidable engagement position as between said beam proximal and distal positions.

6. A creeper apparatus according to claim 5 wherein said remote means for generating fluid pressure for said hydraulic lift cylinder is constructed of a pump cylinder with a pump cylinder rod that is affixed to a retainer that has a pair of opposing extensions that each terminate into a separate guide frame, wherein each guide frame is slidably engaged to a guide rod forming a pair of guide rods, such that operationally said pump cylinder rod, said retainer, said extensions, and said guide frames all move in unison in reciprocating motion along said pair of fixed guide rods, each said guide frame includes a yoke mount that has a tenth pivotal attachment to a yoke that is connected to a third link on a first end of said third link, wherein said third link has a second end that is connected to another yoke that has an eleventh pivotal attachment to a pivot arm, wherein said pivot arm has a twelfth pivotal attachment that extends to a pump handle, wherein operationally manual reciprocating movement of said pump handle translates to rotational movement at said twelfth pivotal attachment that further translates into said reciprocating motion to said pump cylinder rod to cause pumping in said pump cylinder that is in fluid communication with said lift cylinder to ultimately facilitate said pump handle to manually control said lift cylinder.

7. A creeper apparatus according to claim 6 wherein said remote means for generating fluid pressure for said hydraulic lift cylinder is positionally disposed and mounted within said arm, wherein said arm supports a seat surface with said remote means for generating fluid pressure for said hydraulic lift cylinder being disposed underneath said seat surface, further wherein positionally said twelfth pivotal attachment shares a common axis with said ninth pivotal attachment and said sixth pivotal attachment.

8. A creeper apparatus according to claim 7 further comprising a locking spring plunger that is disposed within and therethrough said top plate of said roller slider assembly, said locking spring plunger also includes an extension that has a selectable retracted state and a selectable extended state, said beam surrounding sidewall further includes an aperture that is disposed therethrough said beam surrounding sidewall, wherein said beam aperture is positioned to receive said locking spring plunger extension in said extended state to operationally lock said roller slider assembly along said beam against movement along said beam longitudinal axis to ultimately lock said seat surface a selected height above the surface.

9. A creeper apparatus comprising:

(a) a base structure that includes a beam having a beam distal end portion and an opposing beam proximal end portion with a longitudinal axis spanning therebetween, said beam is also constructed of an annular cross section having an outer surface and an opposing inner surface, wherein said inner surface defines a beam void that is along said beam longitudinal axis resulting in said beam having a beam surrounding sidewall, wherein said beam annular cross section is perpendicular to said beam longitudinal axis, said beam surrounding sidewall further includes an aperture that is disposed therethrough said beam surrounding sidewall, further said base structure has a first extension with a first proximal end portion and an opposing first distal end portion with a lengthwise axis spanning therebetween, wherein said first proximal end portion extends from said beam proximal end portion and a second extension with a second proximal end portion and an opposing second distal end portion with a longwise axis spanning therebetween, wherein said second proximal end portion extends from said beam proximal end portion, wherein positionally said lengthwise axis and said longwise axis are oppositely positioned to one another about said longitudinal axis and said longitudinal, lengthwise, and longwise axes are all positioned within a first plane;

(b) a first caster wheel having a first pivotal disposition on said beam distal end portion;

(c) a second caster wheel having a second pivotal disposition on said first distal end portion;

(d) a third caster wheel having a third pivotal disposition on said second distal end portion, wherein operationally said first, second, and third caster wheels enable said base structure to omnidirectionally ambulate along a surface;

(e) a roller slider assembly that is constructed of an annular cross section having two side plates and a top plate, said roller slider assembly side plates include an upper roller slider and a lower roller slider, wherein said upper and lower roller slides each have a roller interface with said outer surface of said beam, said roller slider assembly further comprising a locking spring plunger that is disposed within and therethrough said top plate of said roller slider assembly, said locking spring plunger also includes an extension that has a selectable retracted state and a selectable extended state, wherein said beam aperture is positioned to receive said locking spring plunger extension in said extended state to operationally lock said roller slider assembly along said beam against movement along said beam longitudinal axis;

(f) a first link member having a first link first end portion and an opposing first link second end portion with a first link axis therebetween, wherein said first link second end portion has a fourth pivotal attachment to said first distal end portion, wherein said first link member having a first link pivotal movement in a second plane perpendicular to said first plane and forming a range of acute angles as between said first link axis and said lengthwise axis;

(g) a frame member having a frame member primary end portion, a frame member mid-portion, and a frame member secondary end portion, with a frame member axis spanning therebetween, wherein said frame member primary end portion has a fifth pivotal attachment to said roller slider assembly lower roller slider, further said frame member mid-portion has a sixth pivotal attachment to said first link first end portion, said frame member having a frame member first pivotal movement as between said frame member mid-portion and said frame member secondary end portion in said second plane, further said frame member having a frame member second pivotal movement as between said frame member primary end portion and said frame member mid-portion in said second plane, wherein said frame member first pivotal movement is opposite of said frame member second pivotal movement;

(h) a second link member having a second link first end portion and an opposing second link second end portion with a second link axis therebetween, wherein said second link second end portion has a seventh pivotal attachment to said first proximal end portion, wherein said second link member having a second link pivotal movement in said second plane perpendicular to said first plane and forming a range of acute angles as between said second link axis and said longitudinal axis; and (i) an arm having an arm first end portion and an opposing arm second end portion with an arm axis spanning therebetween, said arm having a seat surface disposed on top of said arm, wherein said arm first end portion has an eighth pivotal attachment to said second link first end portion and said arm second end portion has a ninth pivotal attachment to said frame member mid-portion in conjunction with said first link first end portion, said arm axis stays substantially parallel to said longitudinal axis during said roller slider assembly reciprocating movement, wherein operationally said second alternative embodiment of the creeper apparatus has a fold flat starting operational state when said arm axis and said frame axis is juxtapose to said beam longitudinal axis when said roller slider assembly is at said beam distal end portion and selectably manually proceeding to a substantially upright terminal positional state defined by said frame member axis being substantially perpendicular to said longitudinal axis and said arm axis is at a maximum arm distance from said beam longitudinal axis when said roller slider assembly is at said beam proximal end portion, thus resulting in a range of manually selectable arm axis distances from said beam longitudinal axis and a selectable range of said frame member axis angles to said beam longitudinal axis as between said fold flat starting operational state and said substantially upright terminal positional state, wherein further operationally said locking spring plunger extension in said extended state that operationally locks said roller slider assembly along said beam against movement along said beam longitudinal axis result in ultimately manually locking said seat surface at a selected height above the surface.

* * * * *